United States Patent
Andreou

(10) Patent No.: US 11,354,702 B2
(45) Date of Patent: *Jun. 7, 2022

(54) GENERATING INTERACTIVE ADVERTISING WITH CONTENT COLLECTIONS

(71) Applicant: Snap Inc., Santa Monica, CA (US)

(72) Inventor: Jacob Andreou, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/248,219

(22) Filed: Jan. 14, 2021

(65) Prior Publication Data
US 2021/0133800 A1 May 6, 2021

Related U.S. Application Data

(63) Continuation of application No. 15/582,251, filed on Apr. 28, 2017, now Pat. No. 10,949,872.

(51) Int. Cl.
*G06Q 30/00* (2012.01)
*G06Q 30/02* (2012.01)
*G06F 16/951* (2019.01)

(52) U.S. Cl.
CPC ....... *G06Q 30/0244* (2013.01); *G06F 16/951* (2019.01)

(58) Field of Classification Search
CPC .......................... G06Q 30/0244; G06F 16/951
See application file for complete search history.

(56) References Cited

U.S. PATENT DOCUMENTS 6,038,295 A 3/2000 Mattes
6,980,909 B2 12/2005 Root et al.
(Continued)

FOREIGN PATENT DOCUMENTS

CA 2887596 A1 7/2015
CN 109416805 3/2019
(Continued)

OTHER PUBLICATIONS

"International Application Serial No. PCT/US2017/039759, International Search Report dated Oct. 9, 2017", 2 pgs.
(Continued)

*Primary Examiner* — David J Stoltenberg
*Assistant Examiner* — Michael I Ezewoko
(74) *Attorney, Agent, or Firm* — Schwegman Lundberg & Woessner, P.A.

(57) ABSTRACT

Systems, devices, media, instructions, and methods are provided for presentation of media collections with automated interactive advertising. In one embodiment, a server system merges advertising data with interaction elements to create an advertising element, and communicates the advertising element to a client device with other pieces of content. In another embodiment, advertising data is received at a client device and merged at the client device with interaction elements to generate an advertising element. The advertising element is then displayed between content elements that are part of one or more content collections. In various embodiments, interaction data recorded at the device is used to manage the presentation of future advertising elements.

20 Claims, 42 Drawing Sheets

(56) References Cited

U.S. PATENT DOCUMENTS

| | | | |
|---|---|---|---|
| 7,173,651 | B1 | 2/2007 | Knowles |
| 7,411,493 | B2 | 8/2008 | Smith |
| 7,535,890 | B2 | 5/2009 | Rojas |
| 8,060,904 | B1 | 11/2011 | Evans et al. |
| 8,131,597 | B2 | 3/2012 | Hudetz |
| 8,199,747 | B2 | 6/2012 | Rojas et al. |
| 8,332,475 | B2 | 12/2012 | Rosen et al. |
| 8,682,722 | B1 | 3/2014 | Des Jardins et al. |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,104,669 | B1 | 8/2015 | Des Jardins et al. |
| 9,191,776 | B2 | 11/2015 | Root et al. |
| 9,204,252 | B2 | 12/2015 | Root |
| 9,282,353 | B2 * | 3/2016 | Davis ............... H04N 21/63345 |
| 9,443,227 | B2 | 9/2016 | Evans et al. |
| 9,489,661 | B2 | 11/2016 | Evans et al. |
| 9,491,134 | B2 | 11/2016 | Rosen et al. |
| 9,681,265 | B1 | 6/2017 | Davis et al. |
| 10,943,255 | B1 | 3/2021 | Andreou |
| 10,949,872 | B2 | 3/2021 | Andreou |
| 2002/0112249 | A1 | 8/2002 | Hendricks et al. |
| 2003/0146915 | A1 | 8/2003 | Brook et al. |
| 2008/0033814 | A1 | 2/2008 | Carignano |
| 2009/0300670 | A1 | 12/2009 | Barish |
| 2011/0093780 | A1 | 4/2011 | Dunn |
| 2011/0202598 | A1 | 8/2011 | Evans et al. |
| 2011/0247027 | A1 | 10/2011 | Davis et al. |
| 2012/0209924 | A1 | 8/2012 | Evans et al. |
| 2012/0299955 | A1 | 11/2012 | Fagans et al. |
| 2013/0249948 | A1 | 9/2013 | Reitan |
| 2014/0019261 | A1 | 1/2014 | Hegeman et al. |
| 2014/0129343 | A1 * | 5/2014 | Finster ............... G06Q 30/0269 705/14.66 |
| 2014/0215542 | A1 * | 7/2014 | Terpe ................. H04N 21/4126 725/112 |
| 2014/0278993 | A1 | 9/2014 | Massoudi et al. |
| 2016/0027061 | A1 | 1/2016 | Chakraborty et al. |
| 2016/0291914 | A1 | 10/2016 | Yu et al. |
| 2017/0206553 | A1 | 7/2017 | Lintermans et al. |
| 2017/0372364 | A1 | 12/2017 | Andreou |
| 2018/0315076 | A1 | 11/2018 | Andreou |
| 2021/0158389 | A1 | 5/2021 | Andreou |

FOREIGN PATENT DOCUMENTS

| | | |
|---|---|---|
| CN | 110800012 A | 2/2020 |
| JP | 2003140587 | 5/2003 |
| KR | 20100110289 | 10/2010 |
| WO | 2018005649 | 1/2018 |
| WO | WO-2018200986 A1 | 11/2018 |

OTHER PUBLICATIONS

"International Application Serial No. PCT/US2017/039759, Written Opinion dated Oct. 9, 2017", 5 pgs.

"U.S. Appl. No. 15/195,619, Restriction Requirement dated Nov. 26, 2018", 6 pgs.

"International Application Serial No. PCT/US2017/039759, International Preliminary Report on Patentability dated Jan. 10, 2019", 7 pgs.

"U.S. Appl. No. 15/195,619, Response Filed Jan. 28, 2019 to Restriction Requirement dated Nov. 26, 2018", 8 pgs.

"U.S. Appl. No. 15/195,619, Non Final Office Action dated Mar. 8, 2019", 14 pgs.

"U.S. Appl. No. 15/195,619, Response Filed Jun. 10, 2019 to Non Final Office Action dated Mar. 8, 2019", 13 pgs.

"U.S. Appl. No. 15/195,619, Final Office Action dated Sep. 4, 2019", 16 pgs.

"U.S. Appl. No. 15/195,619, Response filed Feb. 4, 2020 to Final Office Action dated Sep. 4, 2019", 13 pgs.

"Korean Application Serial No. 1020197002430, Notice of Preliminary Rejection dated Jul. 17, 2020", w/ English Translation, 17 pgs.

"Korean Application Serial No. 1020197002430, Response filed Sep. 17, 2020 to Notice of Preliminary Rejection dated Jul. 17, 2020", w/ English Claims, 22 pgs.

"U.S. Appl. No. 15/582,217, Notice of Allowance dated Oct. 6, 2020", 4 pgs.

"U.S. Appl. No. 15/195,619, Non Final Office Action dated Dec. 2, 2020", 21 pgs.

"U.S. Appl. No. 15/582,217, Corrected Notice of Allowability dated Feb. 12, 2021", 2 pgs.

"U.S. Appl. No. 15/582,251, Corrected Notice of Allowability dated Feb. 12, 2021", 2 pgs.

"Korean Application Serial No. 10-2019-7034716, Notice of Preliminary Rejection dated Feb. 9, 2021", w/ English Translation, 15 pgs.

U.S. Appl. No. 15/582,217, filed Apr. 28, 2017, Methods and Systems for Interactive Advertising With Media Collections.

U.S. Appl. No. 17/110,842, filed Dec. 3, 2020, Interactive Advertising With Media Collections.

U.S. Appl. No. 15/582,251, filed Apr. 28, 2017, Methods and Systems for Server Generation of Interactive Advertising With Content Collections.

"Korean Application Serial No. 10-2019-7034716, Response filed Apr. 9, 2021 to Notice of Preliminary Rejection dated Feb. 9, 2021", w/ English Claims, 24 pgs.

"European Application Serial No. 18789871.3, Communication Pursuant to Article 94(3) EPC dated Jul. 20, 2021", 10 pgs.

"U.S. Appl. No. 15/582,217, Final Office Action dated Oct. 21, 2019", 18 pgs.

"U.S. Appl. No. 15/582,217, Non Final Office Action dated Feb. 14, 2019", 17 pgs.

"U.S. Appl. No. 15/582,217, Notice of Allowance dated Oct. 2, 2020", 11 pgs.

"U.S. Appl. No. 15/582,217, Response filed Feb. 21, 2020 to Final Office Action dated Oct. 21, 2019", 13 pgs.

"U.S. Appl. No. 15/582,217,Response filed May 14, 2019 to Non Final Office Action dated Feb. 14, 2019", 13 pgs.

"U.S. Appl. No. 15/582,251, Final Office Action dated Oct. 21, 2019", 19 pgs.

"U.S. Appl. No. 15/582,251, Non Final Office Action dated Feb. 25, 2019", 18 pgs.

"U.S. Appl. No. 15/582,251, Notice of Allowance dated Oct. 7, 2020", 10 pgs.

"U.S. Appl. No. 15,582/251, Response filed Feb. 21, 2020 to Final Office Action dated Oct. 21, 2019", 12 pgs.

"U.S. Appl. No. 15/582,251, Response to Non Final Office Action dated Feb. 25, 2019", 12 pgs.

"European Application Serial No. 18789871.3, Extended European Search Report dated Feb. 7, 2020", 7 pgs.

"European Application Serial No. 18789871.3, Response filed Aug. 27, 2020 to Extended European Search Report dated Feb. 7, 2020", 21 pgs.

"International Application Seriai No. PCT/US2018/029846, International Preliminary Report on Patentability dated Nov. 7, 2019", 10 pgs.

"International Application Serial No. PCT/US2018/029846, International Search Report dated Jul. 11, 2018", 2 pgs.

"International Application Serial No. PCT/US2018/029846, Written Opinion dated Jul. 11, 2018", 8 pgs.

"Surprise!", [Online] Retrieved from the Internet: <URL: https://www.snap.com/en-US/news/post/surprise>, (Oct. 3, 2013), 1 pg.

Buscemi, Scott, "Snapchat introduces 'Stories', a narrative built with snaps", [Online] Retrieved from the Internet: <URL: https://9t05mac.com/2013/10/03/snapchat-introduces-stories-a-narrative-built-with-snaps/>, (Oct. 3, 2013), 2 pgs.

Coleman, Beth, "Hello Avatar", MIT Press, (2011), ix-79.

Edelman, Shimon, "Computing the Mind", Oxford University Press, (2008), 26-31 pgs.

(56) References Cited

OTHER PUBLICATIONS

Etherington, Darrell, "Snapchat Gets its Own Timeline With Snapchat Stories, 24-Hour Photo & Video Tales", [Online] Retrieved from the Internet: <URL: https://techcrunch.eom/2013/10/03/snapchat-gets-its-own-timeline-with-snapchat-stories-24-hour-photo-video-tales/>, (Oct. 3, 2013), 2 pgs.

Eyal, Nir, et al., "Hooked: Howto Build Habit-Forming Products", (2014), 167 pgs.

Fogg, BJ, et al., "Persuasive Technology: Using Computers to Change What We Think and Do", Morgan Kaufmann Publishers, pp. 191-208, (2003), 28 pgs.

Goffman, Erving, "Frame Analysis", Northeastern University Press, (1974), 1-39, 301-344.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

Lakoff, George, et al., "Metaphors We Live By", University of Chicago Press, (1980), ix-55.

Leyden, John "This SMS will self-destruct in 40 seconds", [Online] Retrieved from the Internet: <URL: http://www.theregister.co.uk/2005/12/12/steaithtext/>, (Dec. 12, 2005), 1 pg.

Sheffield, Tricia, et al., "The Religious Dimensions of Advertising", Palgrave Macmillan, pp. 133-144, (2006), 20 pgs.

Van Dam, Koen H, et al., "Modelling of Socio-Technical Systems", Springer Science and Business Media, (2012), v-73 (emphasis p. 36).

Wirth, Niklaus, "Algorithms plus Data Structures equal Programs", pp. xii-55, (1976), 41 pgs.

\* cited by examiner

CURATION TEAM

CURATOR NAME: OLLY DOE
EMAIL ADDRESS: OLLY@SC.COM
TIME ZONE: WEST COAST ▽
PERMISSION LEVEL: CURATOR ▽

OLLY'S STATS

- 234s — AVG CLEAR TIME (100)
- 5.6 — AVG FLAGGED SNAPS (100)
- 23:4 — FLAGGED: APPROVED SNAPS
- 23.3m — AVG FLAG WAIT
- 43.1m — AVG APPROVED WAIT
- 14.7m — AVG FLAG/APPROVE SPLIT
- 7.1s — AVG TIME BETWEEN FLAGS
- 9.7 — AVG SNAP/UPDATE
- 43.3s — AVG UPDATE LENGTH

OLLY'S ASSIGNED STORIES

| Story | Snaps Cleared | Last Updated |
|---|---|---|
| STANFORD (1283) 00:05:53 | 255(me) 12.5k (TOTAL) | 01/12/16 (DIANA DOE) |
| PURDUE (253) 00:05:53 | 245(me) 12.5k (TOTAL) | 01/12/16 (DIANA DOE) |
| DUKE (125) 00:05:53 | 2135(me) 12.5k (TOTAL) | 01/12/16 (DIANA DOE) |
| YALE (104) 00:05:53 | 255(me) 12.5k (TOTAL) | 01/12/16 (DIANA DOE) |
| MICHIGAN (104) 00:05:53 | 255(me) 12.5k (TOTAL) | 01/12/16 (DIANA DOE) |
| VANDERBILT (104) 00:05:53 | 255(me) 12.5k (TOTAL) | 01/12/16 (DIANA DOE) |
| BERKELEY (104) 00:05:53 | 255(me) 12.5k (TOTAL) | 01/12/16 (GREG DOE) |
| PUMPKINS (104) 00:05:53 | 0(me) 172.3k (TOTAL) | 01/12/16 (CHLOE DOE) |
| OREGON (1283) 00:05:53 | 255(me) 12.5k (TOTAL) | 01/12/16 (DIANA DOE) |

SAVE

GENERATING INTERACTIVE ADVERTISING WITH CONTENT COLLECTIONS

CLAIM OF PRIORITY

This application claims priority to and is a continuation of U.S. patent application Ser. No. 15/582,251, filed on Apr. 28, 2017, and entitled "Methods and Systems for Server Generation of Interactive Advertising with Content Collections," which in hereby incorporated by reference in its entirety.

BACKGROUND

In the modern Internet era, many news sources have fragmented, but core aspects of news gathering and presentation often remain associated with professional journalists gathering and sharing information in a way that is tied to an individual identity. While such practices have been able to support some news structures with valuable analysis, the process for generating stories where select professionals filter information and generate stories is time consuming and introduces significant delay between an event occurring and presentation of information to a news consumer. Additionally, presentation of ads along with news has long been a source of support for news creators.

BRIEF DESCRIPTION OF THE DRAWINGS

Various ones of the appended drawings merely illustrate example embodiments of the present disclosure and should not be considered as limiting its scope.

FIG. 2F-2H are example user interfaces to view operators working on media collections, according to some example embodiments.

DETAILED DESCRIPTION

Figure 1:
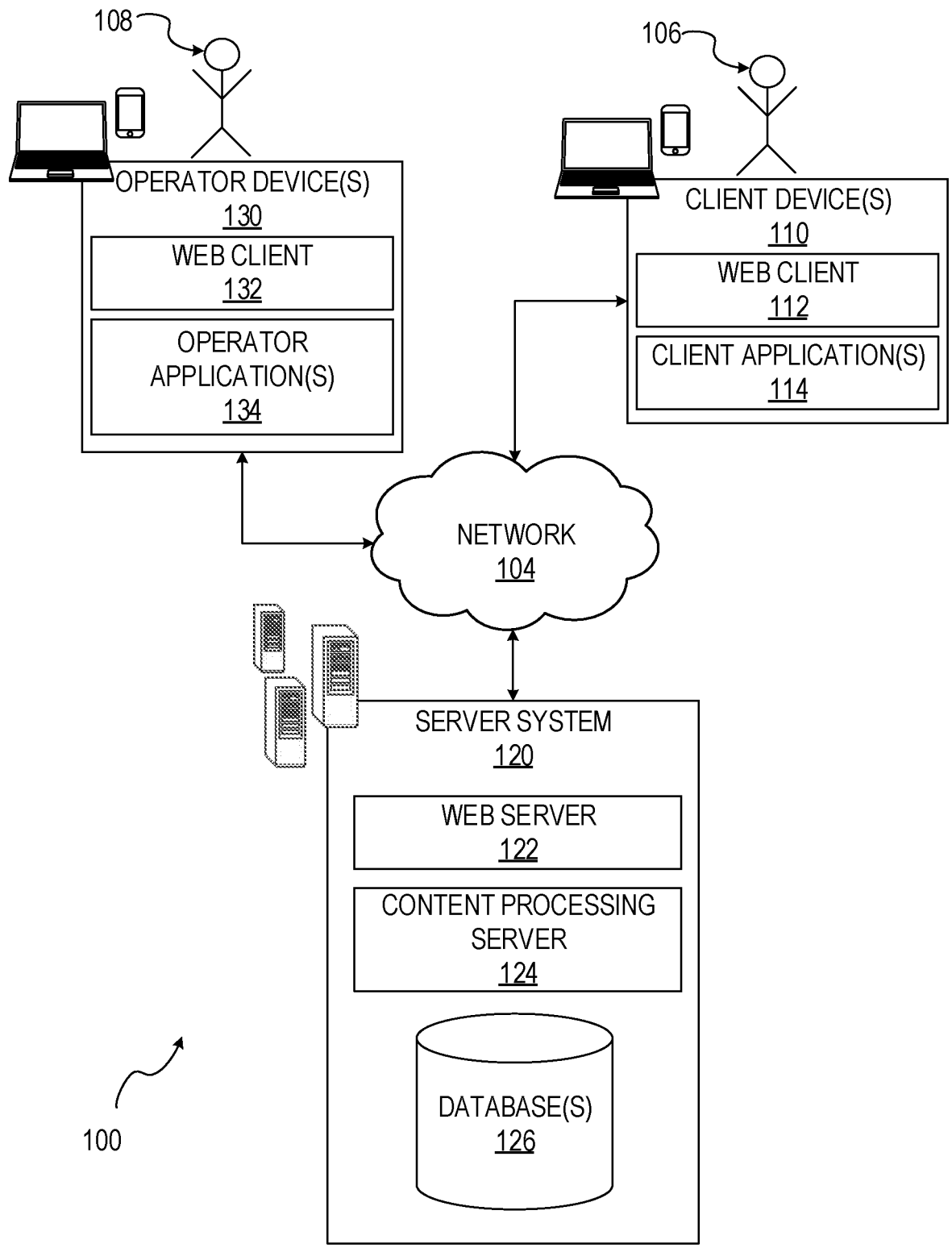
FIG. 1 is a block diagram illustrating a networked system, according to some example embodiments.

Systems and methods described herein relate to communication systems, and some embodiments particularly relate to advertisement systems with interactive elements that accompany computer-assisted generation, curation, and presentation of content collections generated from content received from other system users. While particular embodiments are described herein, it will be apparent that additional systems are possible within the scope of the present innovations other than the embodiments specifically described.

In some embodiments, advertisements are automatically inserted into content or media collections, and a record of user interactions with advertising elements is used to manage future presentation of advertising elements to users. In some embodiments, the interaction elements may be personalized to a user based on user selections. For example, some user accounts may be associated with personalized illustrations of a user and a user's friends. Such illustrations may be merged with or overlaid on advertising data to increase user engagement with the advertising data. Further, sensors on a device may receive input (e.g., motion/shake sensors, touchscreen sensors, camera sensors, etc.) that allow control of the interaction elements during display of advertising data. Interaction data may optionally and anonymously be collected and used to adjust the future presentation of advertisements to a user. For example, users with a high interaction score may be provided options to influence the frequency of advertising element presentations within content collections. Such options may, for example, increase a number of content elements presented between advertising elements, or may increase a minimum allowable time between presentation of advertising elements.

In one embodiment, a user elects to enable interactive advertising using avatar images associated with a communication system. As part of system use, a user's device requests a content collection from a server, and receives content elements and advertising data. After presentation of a number of images and video clips from the selected content collection, an advertisement is presented. During display of the advertisement, the user's avatar is presented on the display at the same time as the advertisement data. Depending on the advertisement, the avatar may be controllable around the edges of the advertisement, or throughout the advertisement. User inputs such as motion of the user's device (e.g., shaking), camera controls, or certain touchscreen inputs may result in different effects on the avatar. In some embodiments, a touchscreen tap on a display area is reserved to enable ad skipping. Some embodiments may also allow presentation of other users' avatars during display of the advertising data. This may be based on other users' (e.g., friends') history of having viewed the advertisement, and may show how the friends' avatars were controlled during the friends' viewing of the advertisement. In other embodiments, other interaction elements besides user avatars may be used. In some embodiments, the interaction elements are further customized to interact with the advertising data as described below, while in other systems, the interaction elements are simple overlays or border elements that do not interact with the advertising data being presented when the advertising interaction elements are present. Depending on whether the user's account settings allow interaction data to be recorded or not, a history of how the user engages with an advertisement and any interaction elements may be recorded. In some embodiments, this data may be shared with "friend" accounts. In some embodiments, this data may be used to balance presentation of advertising elements to a particular user or user account. For example, a user account that regularly skips advertising elements using a tap-to-skip input may be presented with advertising elements more frequently, while a user that engages with an advertising element may be presented with advertising elements less frequently, or may be given extra options to control presentation of advertising elements.

Content collections presented with interactive advertising elements may be generated and presented in a variety of ways. Curators or operators may gather together content, such as photos, video, audio, text, metadata, and other media content, from content messages to put together one or more media collections or stories. These media collections may be based on a certain geolocation, event, topic, common user interest, product, etc. A content curator may modify the automatic advertisement integration with content collections based on identification of coherent groups of content to prevent the content groupings from being interrupted by advertisements which may not be related to the content. The content messages may be sent by users (e.g., users in a particular geolocation, users attending a particular event, users sharing a particular interest, etc.) using client devices. A server system may receive tens of thousands of content messages (if not more) for each media collection that need to be reviewed by the system or a curator to choose what content to include in one or more media collections. These media collections may be referred to as "content collections", "stories", "media collections", or any other such grouping of content elements. Moreover, many media collections may be time sensitive or "live" stories (e.g., only available for a certain window of time, such as a 24 hour period, during a particular event, etc.). Accordingly, methods and systems are described that provide tools to assist a system and curator to quickly curate such a high volume of content messages into media collections for immediate, ongoing, or periodic posting, as well as for integrating advertising with such media collections. The curation may additionally match certain types of advertising with certain collections, and may also match certain types of interaction elements with certain collections.

In one example embodiment, systems and methods are provided for receiving, at a server computer, content messages from various content sources (e.g., smartphone users), each content message comprising media content or content elements (e.g., images, video clips, etc.) For each of the content messages received, the media content is associated with the predetermined media collection, and the content message is stored in a database. In some embodiments, the plurality of content messages are displayed on an operator device with other content messages associated with the media collection. In some embodiments, a predetermined trigger related to the media collection may be activated, and in response, an identifier of the media collection is updated from a first indicator to a second indicator. This update notifies a user of the change (e.g., with a display alert or update) and indicates that an action needs to be taken on the media collection. The content in the database is sorted into a presentation order either automatically, or by an operator of a curation tool. In some embodiments, advertising elements including interaction elements are automatically inserted into the presentation order, and the content elements and advertising elements are sent to client devices to be displayed in the presentation order when the client devices request the media collection. In various embodiments, curation selection of content elements may be automatically integrated with advertising elements in a variety of ways as described in detail below.

In one embodiment, a media collection may be directed to recent basketball games, and may include content elements from content messages (e.g., video clips up to 10 seconds long or images presented for up to 10 seconds) related to a basketball game that is in progress. The media collection may have advertising that is automatically inserted between content elements of the content collection at predetermined periodic spacing, and the advertising may have interaction elements associated with the content of the collection. For example, an advertising element (e.g., video, image, audio, network link, etc.) may be inserted between content elements every five minutes, between every 15 pieces of content, or in some other automated format. The interaction element may be a fixed hoop with a basketball controllable by motion sensors within the device, or an interactive avatar wearing sports attire and bouncing a basketball. When particular events of interest occur during the basketball game, a server may receive content messages that include new information not currently in the media collection. This may include content for a particularly interesting play, or an ending play with a final score. These content messages are stored in a database, and a trigger (e.g., a spike in content messages or a time since the last review of related content messages) may create an alert indicating that the media collection should be reviewed for an update based on the content messages received. Such an alert may be placed on the display of a curator that is associated with the media collection. When the curator adjusts the content collection, the curator may identify groups of content elements within the collection that block the automatic presentation of advertising elements before, after, or between certain content elements.

For example, while a basketball game is ongoing, a media collection may include highlight clips of the game, and may allow advertising elements between any content elements that show game highlights. When the game ends, different content elements showing the final moments of the game, a final score, and post-game comments may be received as separate content elements that can be grouped as part of a media collection. A content curator may identify these content elements as related in a way that should not be interrupted by advertising, and can add structures to the media collection using a curation tool to create continuous groups of content elements that prevent the automatic insertion of ads between these content elements.

Similarly, in another embodiment, a content collection including multiple clips from multiple different basketball games may be curated to have content elements from individual games grouped together and identified to prevent ads between content elements from a single game, but to allow advertising elements between clips from different games. The advertising elements for such curated collections may also have curated interaction elements selected by a curator to be associated with the content. A collection of cat videos, for example, may have advertisements with an interactive element including an animated and controllable cat avatar with an animated ball of yarn. Video clips from a dog show may be associated with advertisements having interactive elements of different animated dogs. The actual selection may be curated by a system operator or selected automatically in different embodiments.

In another embodiment, a media collection is associated with recent content from a particular geographic area. As content elements are received from users, they are automatically placed into a content collection. The best individual content elements are sorted for presentation on user devices that request the media collection. This sorting may be based on operator curation, or a combination of both automatic selection and operator curation. The content and the order of the content displayed to a user changes over time as new content elements are received and older content elements are removed. In some media collections, the content elements (e.g., images or video clips) are unrelated, other than being recent and captured within the geographic area. For such media collections, advertising is inserted at set points within the collection as it is displayed on a user device (e.g., after a certain number of pieces of content or a certain viewing time). Some content elements, however, may show different perspectives of the same event, exact location, or may be otherwise related. A content curator can identify these content elements as related, and delay or block presentation of an advertising element between these content elements. After these elements of the content collection are displayed to a user viewing the collection, advertising placement resumes as the user continues watching the content collection.

In some embodiments, advertising elements may be automatically integrated with content elements based on engagement scores. Such scores may be generated from recordings of how a user controls the interaction elements, actual display times for content and advertising, or combinations of such metrics. Presentation orders for content elements and advertising elements may be adjusted based on a target ratio of advertising to content compared with an actual display time of advertising versus content, modified by a value associated with advertisement interactions. In embodiments which allow skipping of advertising, shorter times between advertising elements and longer sequences of ad elements may be used to increase the ratio of advertising to content actually displayed on a client device. Similarly, when a user interacts with one or more advertising elements for an extended period, the time until a next advertising element is displayed may be extended, or fewer advertising elements may be used in the next continuous block or blocks of advertising elements.

FIG. 1 is a block diagram illustrating a networked system 100, according to some example embodiments. System 100 includes one or more client devices 110. System 100 further includes one or more operator devices 130, a server system 120, and a network 104 that is used to convey communications between client devices 110, operator device(s) 130, and the server system 120. For example, the networked system 100 may be a messaging system where clients may communicate and exchange data within the networked system 100. In some embodiments, for example, the client device 110 may capture ephemeral content using a web client 112 or client application 114. The ephemeral content is not directly storable on client device 110 for longer than a threshold period of time, and is either communicated to server system 120 within the threshold period of time as part of a content message, or remove from the client device 110. Each ephemeral content element (e.g., an individual video clip or image) may also be associated with a display time or deletion trigger, such that each piece of content is associated with a limited display time. In some embodiments, video clips have a maximum run-time, and images have a maximum display time. This display time or deletion trigger may be stored as metadata with the content element as communicated as a content message from client devices 110 to server system 120. In some embodiments, the content messages are received at server system 120, and the content elements and any associated metadata are stored in databases 126. Content elements having metadata associating the content element with a particular media collection (e.g., within a geographic area, associated with a content tag describing similar content, capture time, etc.) are sorted into a presentation order. Another client device 110 may request to view a media collection, and the ordered content elements are sent from the server system 120 to the requesting client device 110, along with any advertising elements and associated interaction elements inserted by the server system 120, content processing server 124, or an operator device 130.

The client device(s) 110 may comprise, but is not limited to, a mobile phone, desktop computer, laptop computer, portable digital assistants (PDAs), smart phones, tablet, phablet ultra-books, network-enabled camera, netbooks, multi-processor systems, microprocessor-based or programmable consumer electronics, game consoles, set-top boxes, computers in vehicles, or any other communication device that a user may utilize to access the networked system 100.

The client device 110 may include a camera device for capturing content, or may be coupled to a separate camera device that is used to capture the content (e.g., video, photographs, audio, etc.) prior to sending to the server system 120 or other client devices 110. Some embodiments may include wearable devices such as a pendant with an integrated camera that is coupled to a client device 110. Other embodiments may include other associated devices with an integrated camera that may be wearable, such as a watch, eyeglasses, clothing, such as a hat or jacket with integrated electronics, a clip-on electronic device, or any other such devices that may communicate or be integrated with a client device 110.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more applications 114 (also referred to as "apps") such as, but not limited to, a web browser, messaging application, electronic mail (email) application, an e-commerce site application, a mapping or location application, a news or media application, and the like. In some embodiments, one or more applications 114 may be included in a given one of the client device 110, and configured to locally provide the user interface and at least some of the functionalities with the application 114 configured to communicate with other entities in the system 100 (e.g., operator device(s) 130, server system 120, etc.), on an as-needed basis, for data and/or processing capabilities not locally available (e.g., access to various information, to authenticate a user 106, to verify a method of payment, to retrieve/synchronize footprints, etc.). Conversely, one or more applications 114 may not be included in the client device 110, and then the client device 110 may use its web browser to access the one or more applications hosted on other entities in the system 100 (e.g., operator device(s) 130, server system 120, etc.).

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touchscreen input or alphanumeric input) to the client device 110 and the input may be communicated to other entities in the system 100 (e.g., operator device(s) 130, server system 120, other client device(s) 110, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

An operator device(s) 130 may include, but is not limited to, a mobile phone, desktop computer, laptop computer, portable digital assistants (PDAs), smart phones, tablet, phablet ultra-books, network-enabled camera, netbooks, multi-processor systems, microprocessor-based or programmable consumer electronics, game consoles, set-top boxes, computers in vehicles, or any other communication device that a user or operator 108 may utilize to access the networked system 100.

The operator device(s) 130 may access the various data and applications provided by other entities in the system 100 via a web client 132 (e.g., a browser, such as the Internet Explorer® browser developed by Microsoft® Corporation of Redmond, Wash. State) or one or more operator applications 134. The operator device(s) 130 may include one or more operator application(s) 134 (also referred to as "apps") such as, but not limited to, a web browser, messaging application, media curation tool, electronic mail (email) application, an e-commerce site application, a mapping or location application, a news or media application, and the like. In some embodiments, one or more applications 134 may be included in a given one of the operator device(s) 130, and configured to locally provide the user interface and at least some of the functionalities with the application 134 configured to communicate with other entities in the system 100 (e.g., client devices 110, server system 120, etc.), on an as-needed basis, for data and/or processing capabilities not locally available (e.g., access to various information, to authenticate a user 106 or operator 108, to verify a method of payment, to retrieve/synchronize footprints, etc.). Conversely, one or more applications 134 may not be included in the operator device(s) 130, and then the operator application 134 may use its web browser to access the one or more applications hosted on other entities in the system 100 (e.g., server system 120, etc.).

One or more operators 108 may be a person, a machine, or other means of interacting with the operator device 130 (e.g., a user such as a curator or operator). In example embodiments, the operator 108 may not be part of the system 100, but may interact with the system 100 via the operator device 130 or other means. For instance, the operator 108 may provide input (e.g., touchscreen input or alphanumeric input) to the operator device 130 and the input may be communicated to other entities in the system 100 (e.g., client device(s) 110, server system 120, etc.) via the network 104. In this instance, the other entities in the system 100, in response to receiving the input from the operator 108, may communicate information to the operator device 130 via the network 104 to be presented to the operator 108. In this way, the operator 108 may interact with the various entities in the system 100 using the operator device 130.

The client device(s) 110 and the operator device(s) 130 are connected to the server system 120 via a network 104. The network 104 may include any combination of wired and wireless connections. This may include cellular access networks, access point interfaces to the internet, or any other such networks 104 or network elements. For example, a client device 110 may interface with network 104 using a Long Term Evolution (LTE) cellular network to communicate with server system 120. Or a client device 110 may use a Wi-Fi access point to interface with network 104 and communicate with server system 120.

Server system 120 may be one or more computing devices as part of a service or network computing system. In certain embodiments, particularly embodiments with large numbers of client devices 110 interfacing with a server system 120 from widely different locations all over the globe, server system 120 may be a distributed network of server computers that are similarly widely distributed, and which communicate with each other via network 104. The server system 120 may include a web server 122, and a content processing server 124, that may be communicatively coupled with one or more databases 126. Databases 126 may be storage devices that store information such as data related to content messages, media collections, etc.

The content processing server 124 may provide functionality to perform computer-assisted media collection generation, curation, advertisement insertion, and presentation from received content (as examples). The content processing server 124 may access one or more databases 126 to retrieve stored data to use in computer-assisted media collection generation, curation, advertisement insertion, and presentation from received content. In some embodiments, content collections are processed to identify content categories, and to match content with interaction elements and/or advertising data associated with the content categories. In some embodiments, advertising data is processed to identify interaction points where an interaction element may be structured to interact with the advertising data instead of merely acting as an overlay on the display as the advertising is presented. For example, lines within an advertising video may be structured as boundaries or "walls" that limit or guide movement of an interaction element. Such walls may be identified by processing the advertising data at the server system 120 before it is communicated to a client device 110 with content data.

Figure 17:
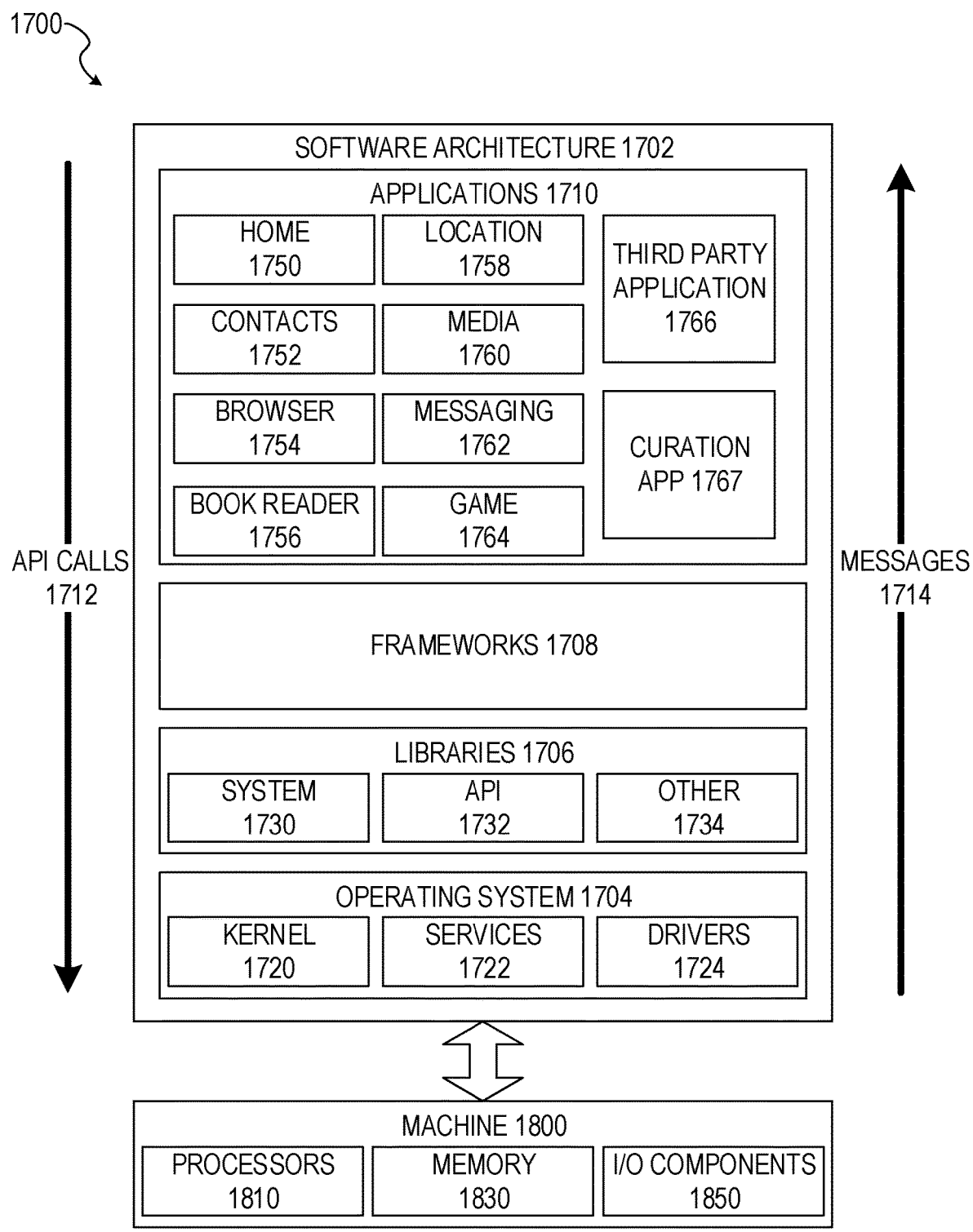
FIG. 17 is a block diagram illustrating an example of a software architecture that may be installed on a machine, according to some example embodiments.
Figure 18:
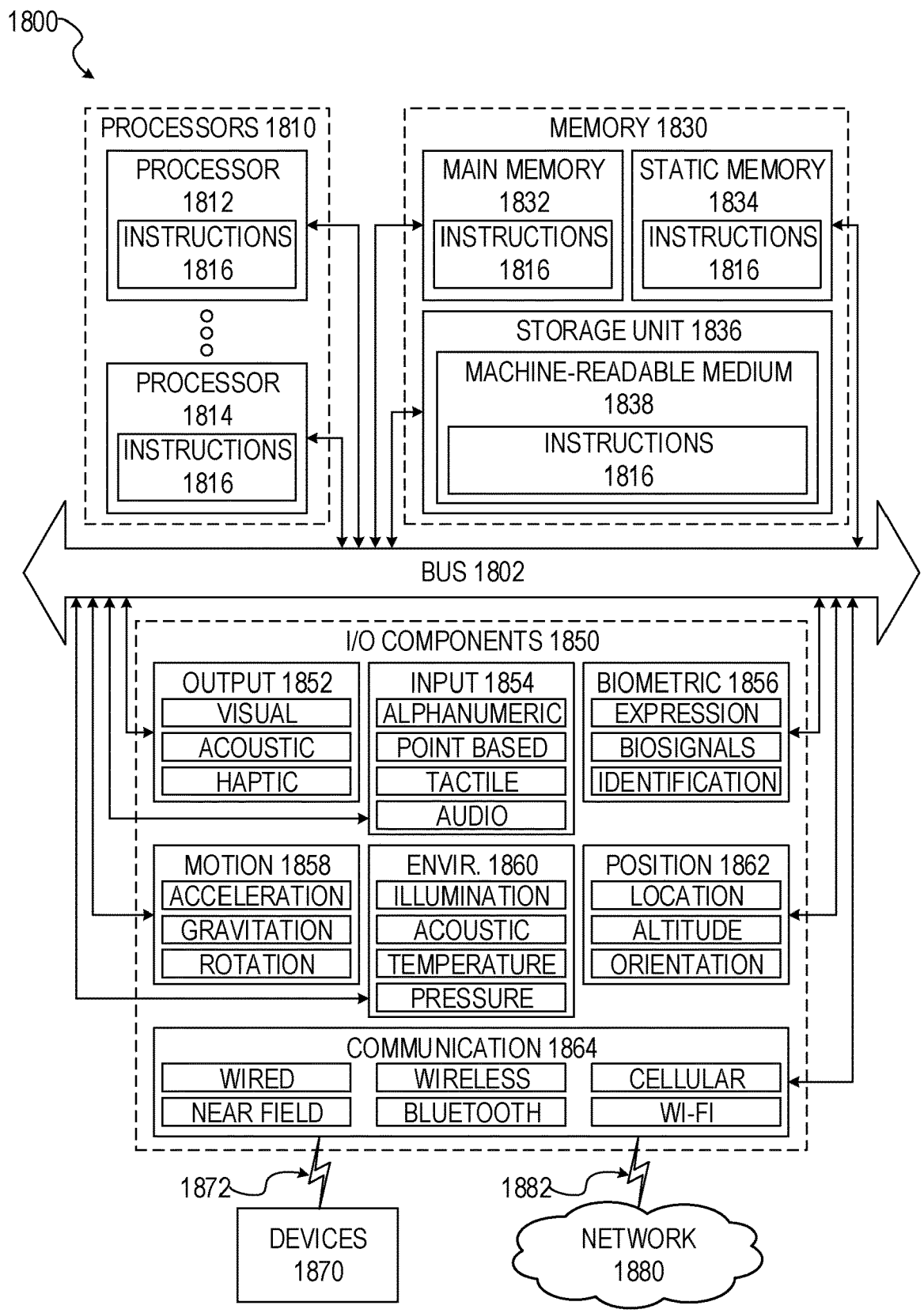
FIG. 18 illustrates a diagrammatic representation of a machine in the form of a computer system within which a set of instructions may be executed for causing the machine to perform any one or more of the methodologies discussed herein, according to an example embodiment.

In some embodiments, client devices 110, operator device(s) 130, and any elements of server system 120 and network 104, may be implemented using elements of software architecture 1700 or machine 1800 described in FIGS. 17 and 18.

Networked system 100 may be used in communication of content messages from client devices 110 to a server system 120, and communication of media collections from the server system 120 to the client devices 110. A client device 110 may communicate content messages to server system 120, and a client device 110 may receive media collections from server system 120. In addition to this functionality of the embodiments described herein, client device 110 may additionally receive private pieces of content and communications from other users 106, and may convey a personal story or media collection to server system 120, with the personal story or media collection including images and/or video from content messages generated by client device 110, another device coupled to client device 110, or other users 106. Similarly, client device 110 sends content messages and receives stories or media collections, and may additionally perform other actions.

In one example embodiment, an operator application 134 may include a media curation tool. The media curation tool may allow an operator 108 to create new media collections, view a list of media collections, view a plurality of content items or content messages associated with a predetermined media collection, curate content into media collections for immediate, ongoing, or periodic posting, etc. The plurality of media content may be received by server system 120 in a plurality of content messages from a plurality of users 106 (e.g., via client devices 110).

Figure 2A:
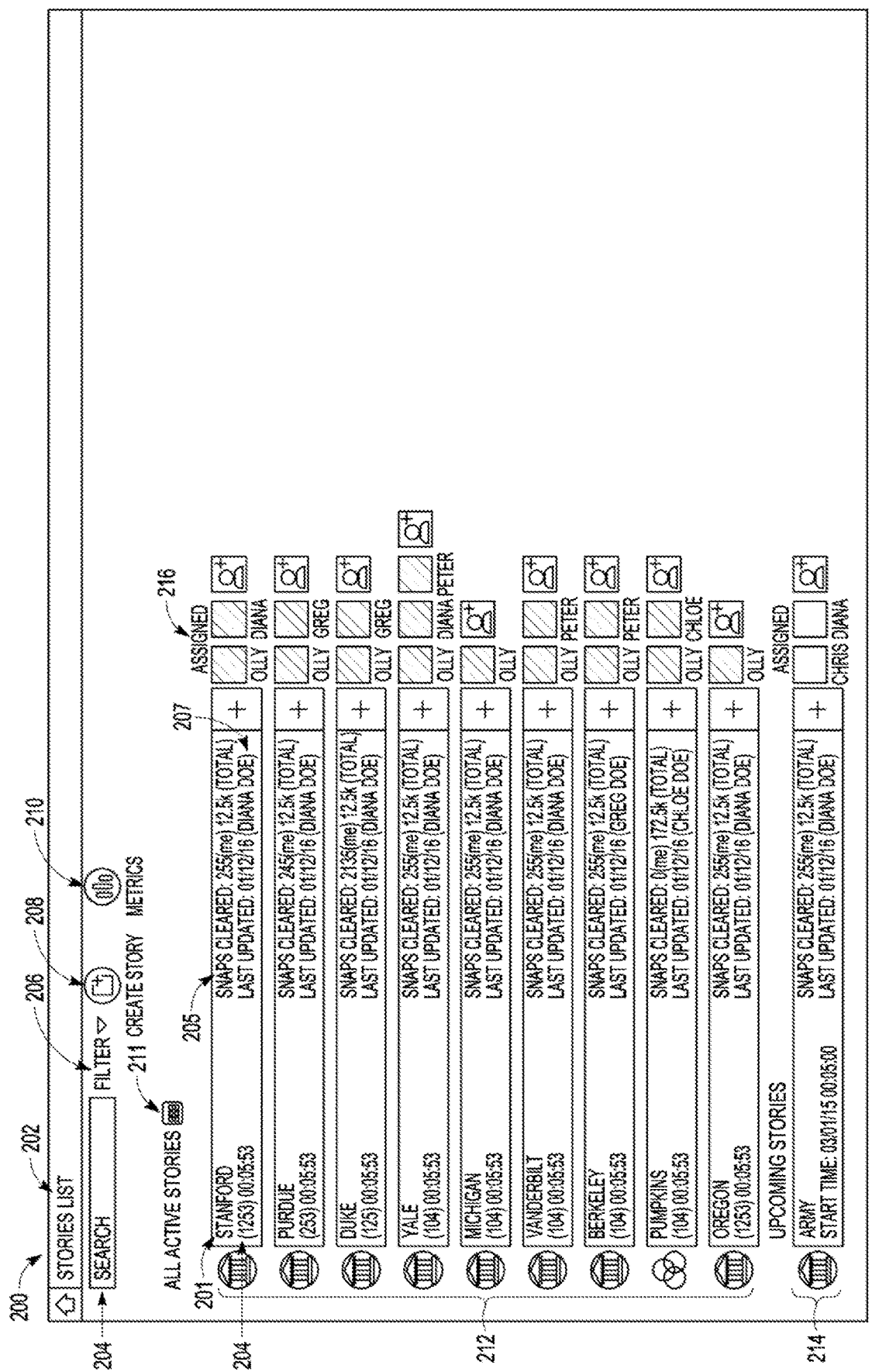
FIG. 2A is an example user interface for viewing a list of media collections, according to some example embodiments.

Using the curation tool, an operator 108 may be able to view a list of all of the media collections that are active, planned, or archived. For example, using the curation tool, the operator 108 may provide an indication to view a list of media collections (e.g., press a button, select an option, click on an icon, etc.). An example user interface 200 is shown in FIG. 2A. The example user interface 200 may display a list of media collections (e.g., stories list 202). The user interface 200 may allow an operator 108 to search for a particular media collection, by providing an area 204 for an operator 108 to enter search criteria. For example, the operator 108 may enter a media collection identifier, a media collection name, keywords, etc. The user interface 200 also provides a mechanism 206 to filter the results/list of media collections by various criteria. For example, an operator 108 may filter the media collections by location, campus, event, time zone, live event, etc.

The list of media collections may include a list of all active media collections 212 and a list of upcoming media collections 214. Each list may include an indication of what operators or curators 216 are assigned to each media collection. There may be one or more operators 108 assigned to each media collection. The user interface 200 also allows the operator 108 to add or remove operators 108 for each media collection. Each media collection may have a title 201, a number of content items or content messages 203 that are in the queue for that media collection, a number of content items that have been cleared 205 (viewed, reviewed, etc.), and the last time the media collection was updated 207. Upcoming media collections 214 may also include information about when they are scheduled to go "live."

The media collections may also indicate a status by an indicator such as color or other method. For example, media collections that do not need immediate attention may have a first indicator (e.g., a green color), media collections that need attention may have a second indicator (e.g., a red color), and media collections that are incomplete (e.g., do not have a geofence, need approval, do not have a thumbnail, etc.) may have a third indicator (e.g., a yellow color). The server system 120 may set or update a status indicator based on a predetermined trigger, as explained below. An operator 108 may select any of the media collections to go to a detailed view for a particular media collection.

Figure 2B:
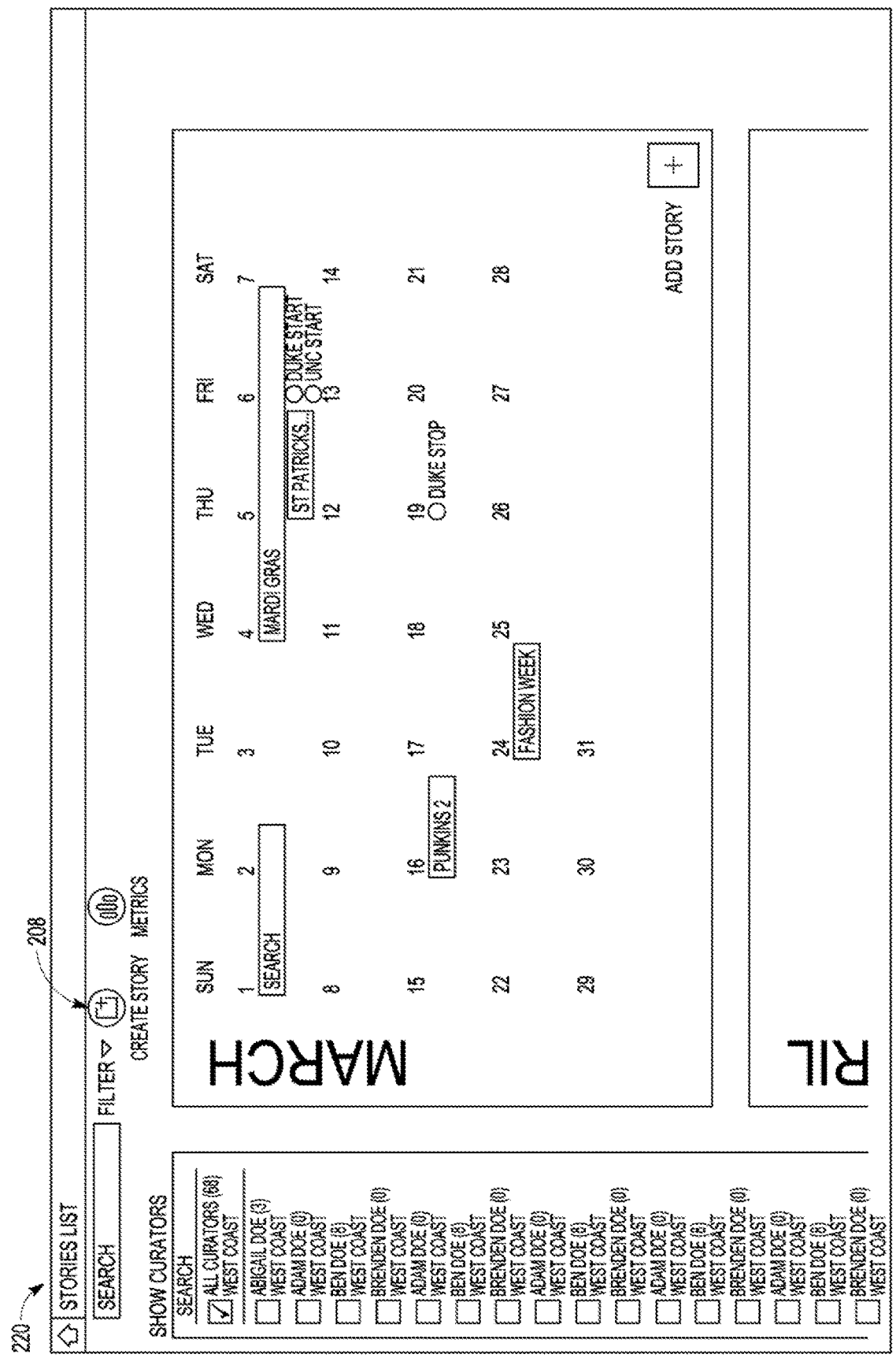
FIG. 2B is an example user interface for viewing a calendar view of media collections, according to some example embodiments.

The user interface 200 may also provide a mechanism 210 for the operator 108 to view metrics associated with one or more media collections, one or more operators 108, etc. The user interface 200 may also provide a mechanism 211 for accessing a calendar view of the media collections. A calendar view 220 of the media collections is shown in FIG. 2B. In the calendar view 220, an operator 108 may see live media collections laid out in a monthly view.

Figure 2C:
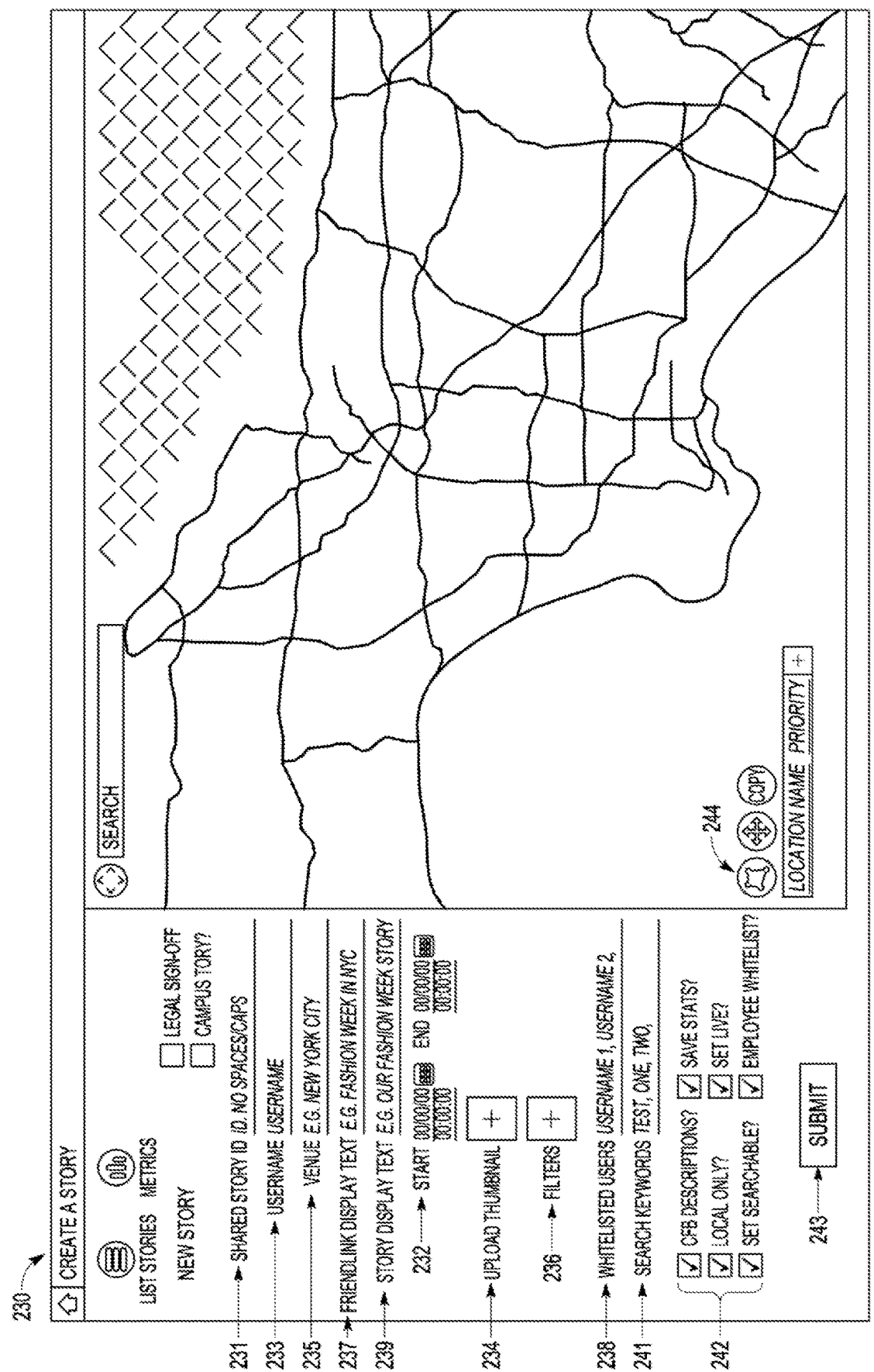
FIG. 2C-2D are example user interfaces for creating a media collection, according to some example embodiments.
Figure 2D:
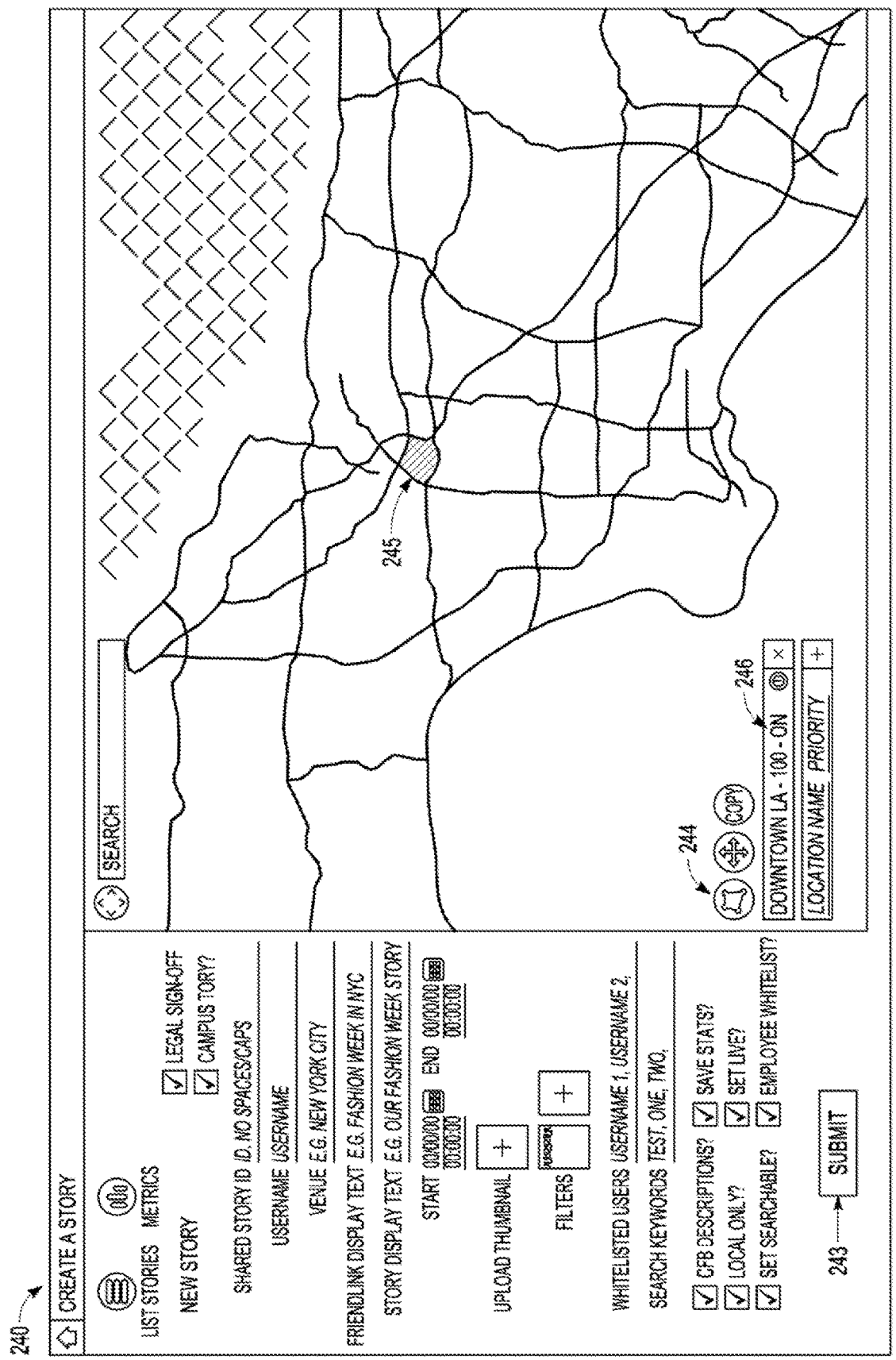
Figure 2E:
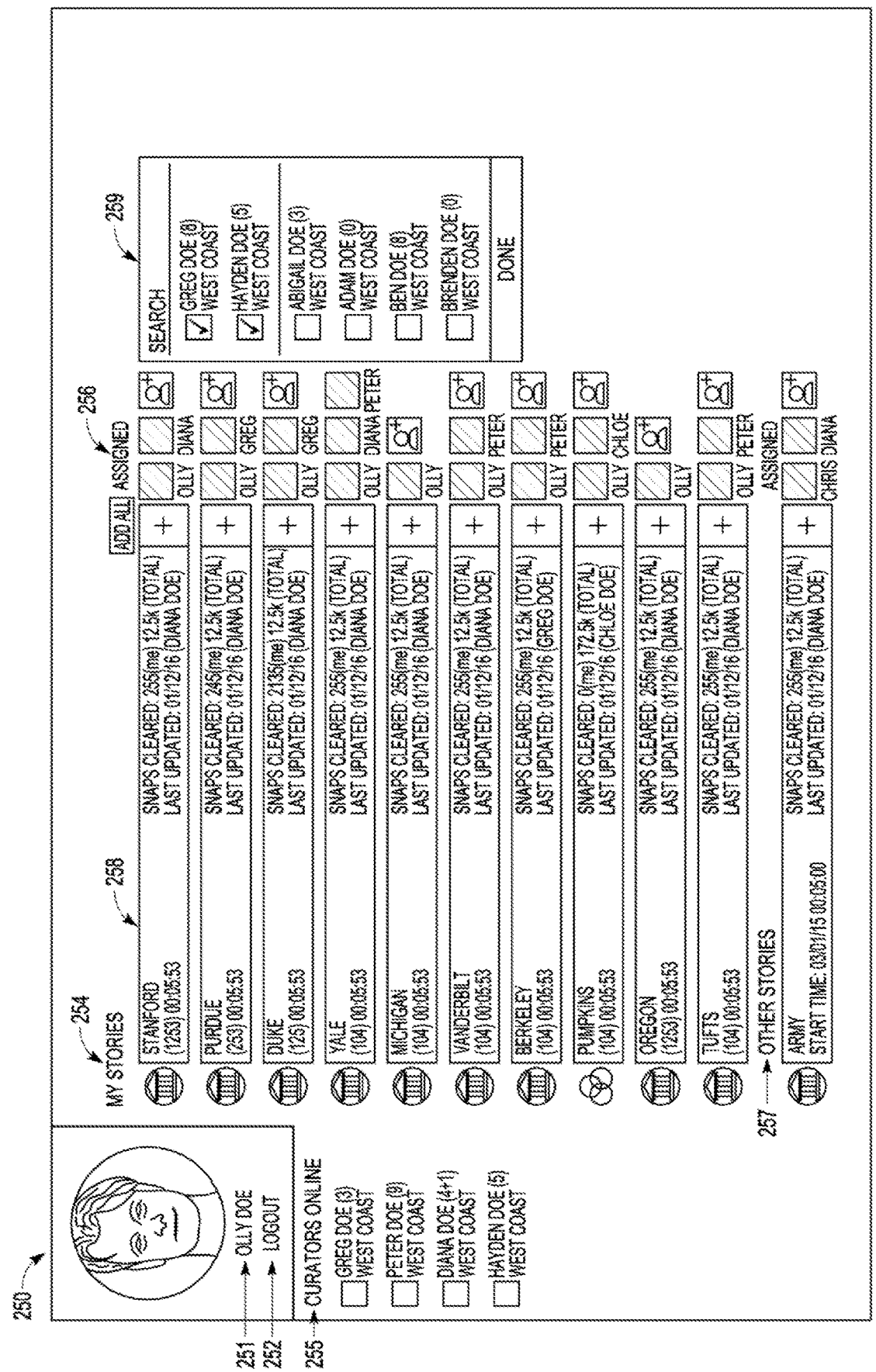
FIG. 2E is an example user interface for viewing a list of media collections, according to some example embodiments.

An operator 108 may also view a list of the media collections assigned to the operator 108 only, as shown in example interface 250 in FIG. 2E. The interface 250 may display the name 251 of the operator 108, a logout button 152, a picture 253 of the operator 108, a list of the media collections 254 that the operator 108 is currently working on, a list 255 of other operators 108 that are currently online (e.g., working on media collections), what operators 108 are working on each media collection 256, and other media collections 257.

Each media collection list item (e.g., media collection list item 258) may include information about the media collection. For example, the media collection list item may include a name of the media collection (e.g., Stanford, Purdue, etc.), a number of content items or content messages in the queue for that media collection (e.g., 1253, 253, 104, etc.), a time since the last update was pushed live or content items or content messages were added to the queue (e.g., 00:05:53), the amount of content items or content messages cleared or reviewed/curated (e.g., an amount for the operator 108 (e.g., 255, 245, 2135 etc.) and a total amount (e.g., 12.5 k, 172.5 k, etc.), and a last updated time stamp and by whom it was updated (e.g., Jan. 12, 2016 (D. Boone)). The operator 108 may also be able to add an operator 108 to a media collection, for example, using a drop-down box 259 as shown in example interface 250.

Figure 2F:
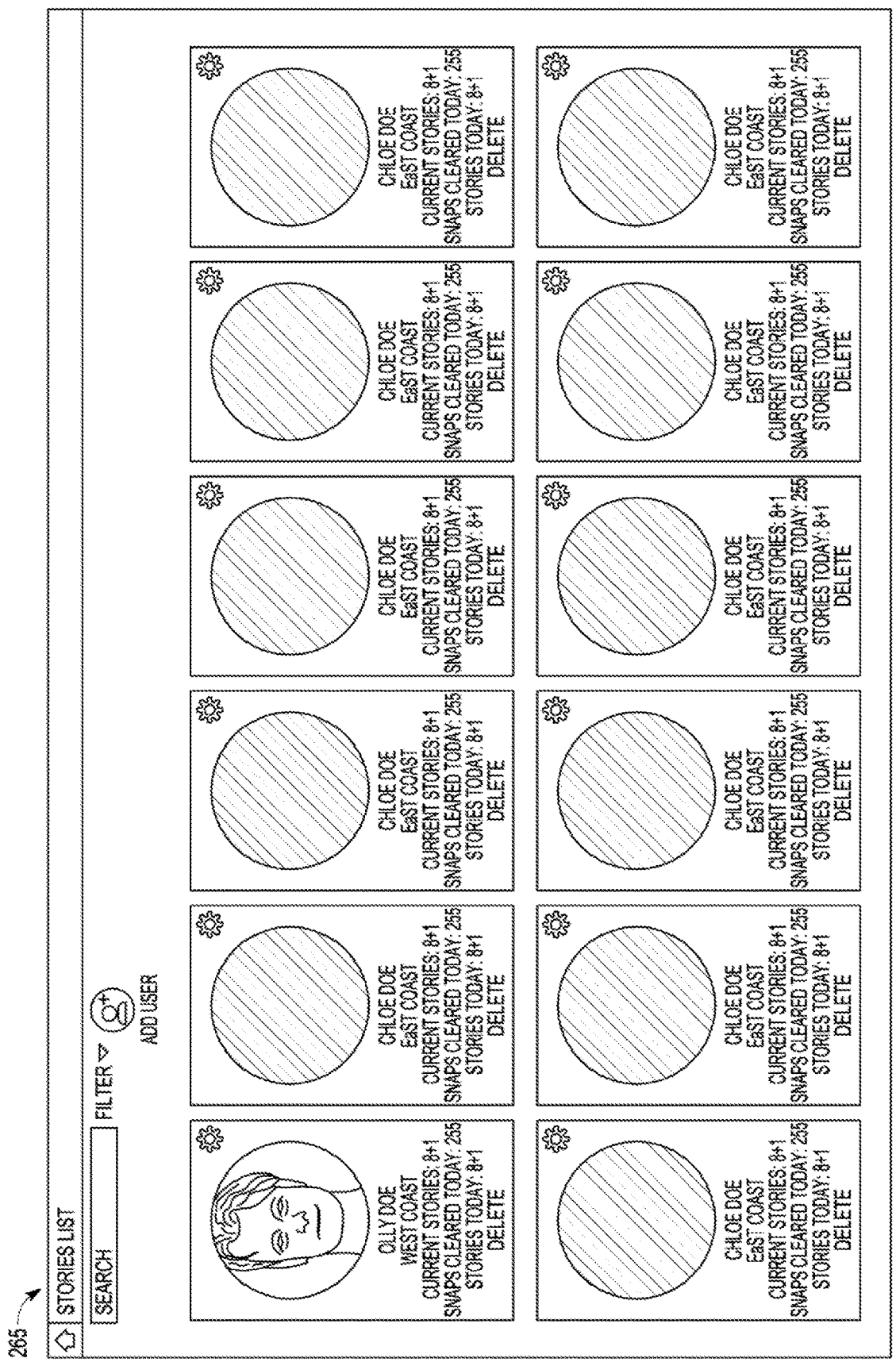
Figure 2H:
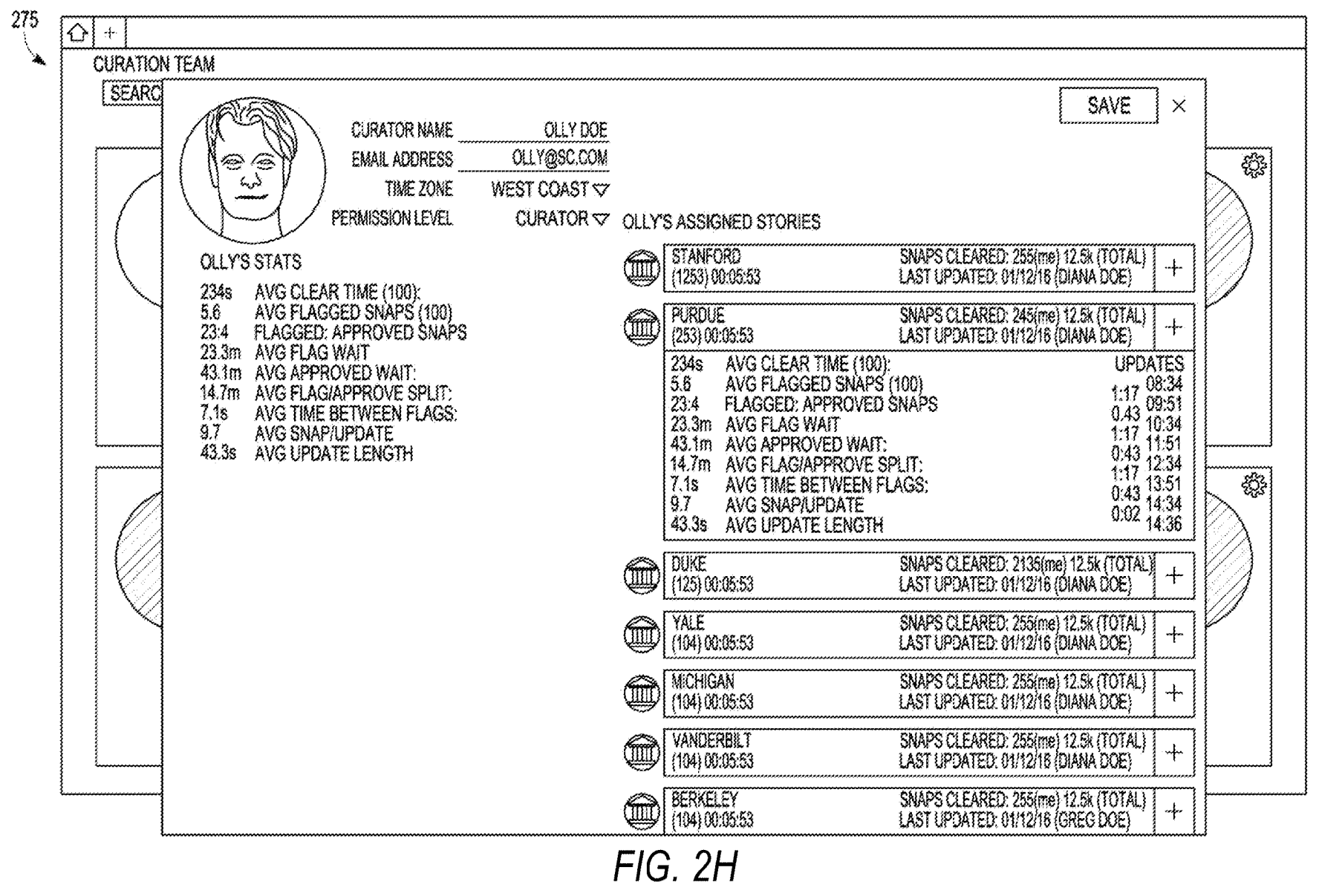

The operator 108 may be further provided with a mechanism to view all operators 108 currently working on media collections, as shown in interface 265 of FIG. 2F. The interface 265 may provide a photograph of the operator 108, a location of the operator 108 (e.g., west coast, east coast, etc.), a number of media collections the operator 108 is working on, the number of content items or content messages cleared or reviewed/curated for the day, media collections worked on for the day, etc. The operator 108 may view further details for each operator 108 as shown in interface 275 in FIG. 2G. For example, interface 275 may include various metrics for the operator 108, such as the average time it takes to clear 100 content items or content messages, average number of flagged (e.g., selected) content items or content messages per 100 content items or content messages, ratio of flagged to approved content items or content messages, average time a flagged content item or content message has been in the queue before it is flagged, average time an approved content item or content message has been in the queue before it is activated, average time it takes for an approved content item or content message to go from flagged to approved, average time between flagging two separate content items or content messages, average length of each updated number of content items or content messages per update, number of media collection seconds per update, etc. The operator 108 may also be able to view metrics specific to a media collection (with similar metrics as described above), as shown in interface 285 of FIG. 2H.

The operator 108 may further be provided with a mechanism to create a new media collection (e.g., via a selectable "create story" icon 208 as shown in FIGS. 2A and 2B). A user interface 230 such as the one shown in FIG. 2C may be provided to the operator 108 to create a new media collection. The user interface 230 may allow the operator 108 to input various information related to the new story or media collection. For example, the operator 108 may input a media collection identifier (ID) 231, username 233, location or venue 235 (e.g., city, state/country, various locations, etc.), friendlink display text 237 (e.g., "Fashion Week in NYC"), media collection display text 239 (e.g., "Our Fashion Week Story"), a start time and end time 232 (e.g., when the collection fence will open and close). The operator 108 may also be able to input a type of media collection (not shown). Some examples of types of media collections may be worldwide (e.g., appears to every user 106), public local (e.g., appears to local users 106 and other outputs), private local (e.g., only appears to local users 106), employee whitelist (e.g., only appears to employees such as an operator 108 or curator for a particular media collection).

The operator 108 may also be able to upload a thumbnail 234 that may be associated with the media collection and displayed in various media output displays (e.g., apps, websites, etc.). The operator 108 may be able to choose from a selection of predetermined thumbnails or create a new thumbnail. The operator 108 may also select or add filters 236 and/or intro animations to be associated with the media collection. The operator 108 may also include whitelisted users 238 and search for keywords 241 to be associated with the media collection. There may be additional information 242 that may be selected by the operator 108. For example, if the operator 108 has selected public local or private local for the media collection type, a check box may appear that can be selected to indicate that a collection fence is different from a broadcast fence. If the operator 108 selects this option (e.g., checks this box) then the operator 108 may be prompted to draw more than one geofence. Other additional information 242 may include an option to show the media collection on a website, show the media collection in a search or media forum (e.g., Google Now, Google search, etc.), and show media collections in a browser. If the operator 108 selects to show the media collection in one of these options, the operator 108 may be prompted to input additional information such as a description of the media collection (e.g., text box to input a description of the media collection), color for the media collection, etc.

The operator 108 may also be able to draw a geofence (e.g., a virtual fence over a geographic area) on a map to associate a particular location with the media collection. For example, the operator 108 may select a geofence drawing button 244 and then create a polygon 245 to indicate the location to associate with the media collection, as shown in FIG. 2D. After drawing the polygon 245, the operator 108 may be able to name and prioritize the geofence and then finalize it. An indication of the geofence 246 may be displayed to the operator 108. Additional geofences may be created by the operator 108, if desired. A media collection may have more than one geofence associated with the media collection. A geofence may be deleted by selecting the geofence and indicating that it should be deleted (e.g., pressing a particular button). The operator 108 may also move the geofence around on the map to another location, or copy and paste the geofence to another location. A geofence may be used, for example, to determine eligibility of a user 106 to submit a content item or content message for a particular media collection. For example, if a user 106 is determined to be within the geofence for the media collection, the user 106 may be eligible to submit content items or content messages for that media collection.

After the operator 108 finishes entering information to create the new media collection, the operator 108 may submit the information. For example, the operator 108 may select a submit option 243 (FIG. 2C) and the operator device 130 may send a request to server system 120 to create a new media collection with the information. Server system 120 may receive and evaluate the request and information and create a new media collection and store the associated information in one or more databases 126. The server system 120 may generate a message indicating a new media collection has been created and publish the collection (e.g., make the collection available on one or more communication platforms) or send it to one or more operator devices 130 for additional management or adjustment before publication.

Either as part of the above generation of a collection, or independently of such a process, the system may also prepare advertising elements for presentation along with the content in a media collection. In various embodiments, the advertising elements may be integrated as a piece of content within a media/content collection. In other embodiments, the advertising elements may be separately selected or personalized for a particular user account or client device. In some embodiments, an operator 108 may identify advertising elements that are particularly appropriate or inappropriate for a given content collection. For example, an advertising element associated with dog food may be blocked from a media collection associated with cats, and an advertising element associated with cat food may be given priority by an interface presented to operator 108. In other embodiments, such preferences are selected automatically by machine categorization and matching of the advertising elements and content elements within a collection. Additionally, interaction elements associated with advertising data may similarly be matched based on categorization of the interaction elements.

Figure 3A:
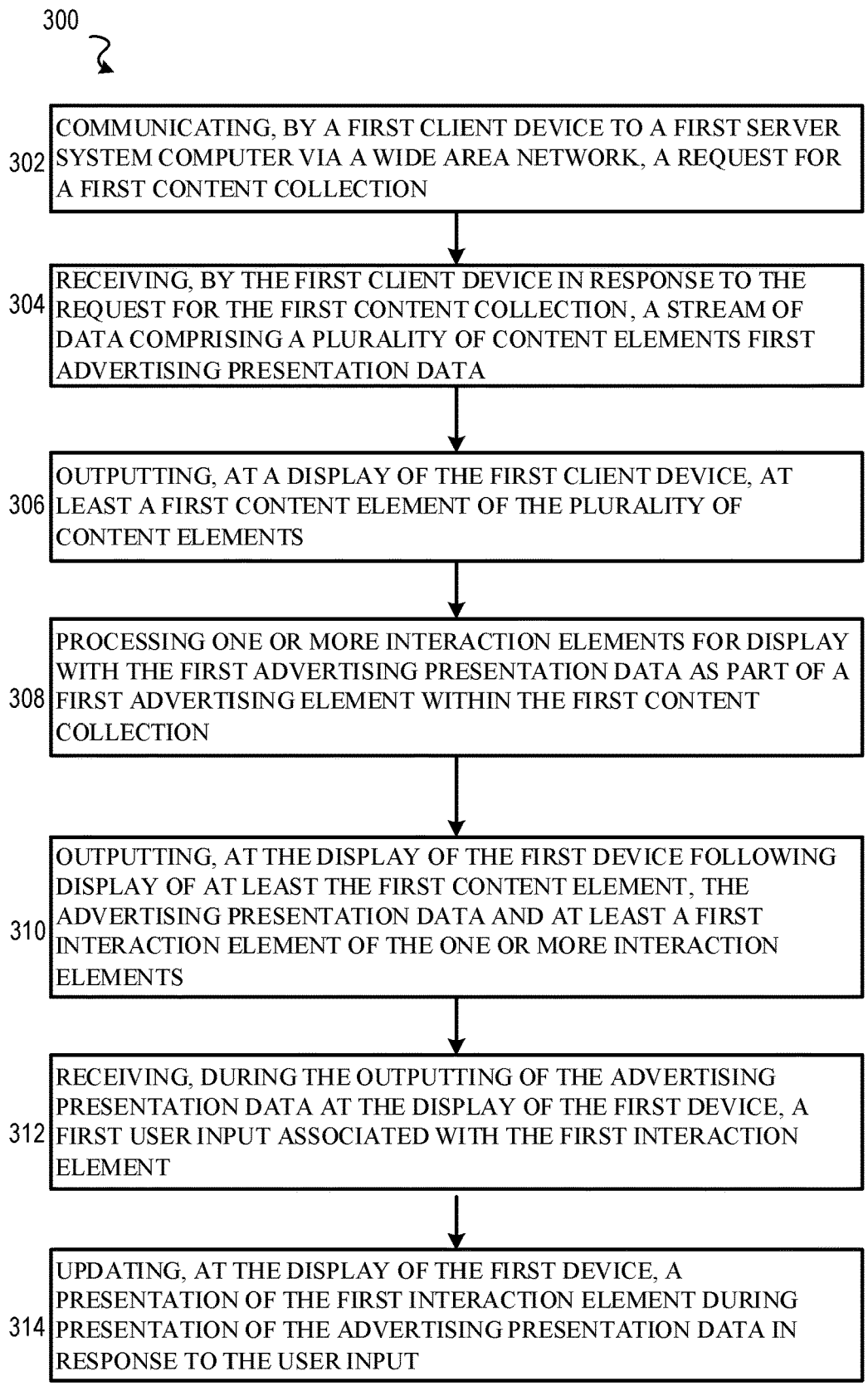
FIG. 3A is a flow chart illustrating aspects of a method, according to some example embodiments.

FIG. 3A is a flowchart illustrating aspects of a method 300, according to some example embodiments. In some embodiments, method 300 is performed by circuitry of a device such as client device 110 or machine 1800. In other embodiments, method 300 is implemented as a computer-readable storage medium comprising instructions that, when executed by one or more processors of a device, cause the device to perform the operations of method 300. Additionally, while particular operations are described for method 300, it will be apparent that similar methods may operate with intervening or repeated operations.

As described above, after a collection is created, it will be made available by one or more communication platforms. These may be web-based platforms, or application-based platforms. When a collection is published, it becomes available for selection and download or streaming to a client device 110. A user interface on a client device 110 may, for example, include a list of collection names, or a list of users associated with collections that are selectable from a particular client device. The available collections may be based on a location of the client device 110, a social graph or set of connections between a user account associated with the client device 110 and other user accounts within the communication platform associated with the collection, or via other means. The user interface may provide the description added by an operator, or category information automatically generated by the system.

In operations 302-306, a client device initiates and begins outputting a portion of a collection. Operation 302 involves communicating, by a first client device (e.g., client device 110) to a first server system (e.g., server system 120) computer via a wide area network (e.g., network 104), a request for a first content collection. In some embodiments, the content collection comprises a set of images and video clips, with the images each having an associated display time less than a threshold time, and each video clip having a duration less than the threshold time. In response to the request in operation 302, in operation 304 the first client device receives a stream of data comprising a plurality of content elements and first advertising presentation data. The advertising presentation data may comprise one or more images or video clips with audio data. In some embodiments, interaction elements are also received with the advertising presentation data as an advertising element unit. In other embodiments, some aspects of the interaction elements are managed locally at the client device. In operation 306, the first client device outputs, at a display of the first client device, at least a first content element of the plurality of content elements.

In operation 308, one or more interaction elements for display with first advertising presentation data are processed at the first client device. Regardless of whether the interaction elements are associated with the advertising data at the server system or at the client device, because the interaction elements are dynamic elements responsive to inputs at the client device, processing is used at the client device to finalize the interaction elements. Additional details associated with interaction elements are particularly described below with respect to FIGS. 8A-E.

After one or more pieces of content (e.g., content elements of a collection) have been presented at the first client device in operation 306 and the interaction elements are ready for output following operation 308, then operation 310 involves outputting, at the display of the first device following display of at least the first content element, the advertising presentation data and at least a first interaction element of the one or more interaction elements. During operation 310, operation 312 involves receiving, during the outputting of the advertising presentation data at the display of the first device, a first user input associated with the first interaction element, and operation 314 involves updating, at the display of the first device, a presentation of the first interaction element during presentation of the advertising presentation data in response to the user input.

These operations thus describe advertising data being presented at a display of a client device with interaction elements. The advertising data includes images or video clips that are displayed, and audio that is output via speakers of the client device. While the advertising content is being output, the interaction elements are also displayed and updated in response to user inputs. For example, detection at motion sensors of a "shake" input may cause motion or animated responses in the presented interaction elements. Inputs to control an interaction element may be associated with a score that is updated during the output of the advertising content.

When the advertising content ends based on a completed presentation or an input is received at the client device to end the presentation of the advertising content (e.g., a tap input on a touchscreen outputting the advertising content), then the interaction content is also removed from the device output. Following the end of the advertising content, additional content elements for a collection are presented, or content from a next content collection are presented, depending on whether the previous content collection was completed before the advertising content was displayed.

Figure 3B:
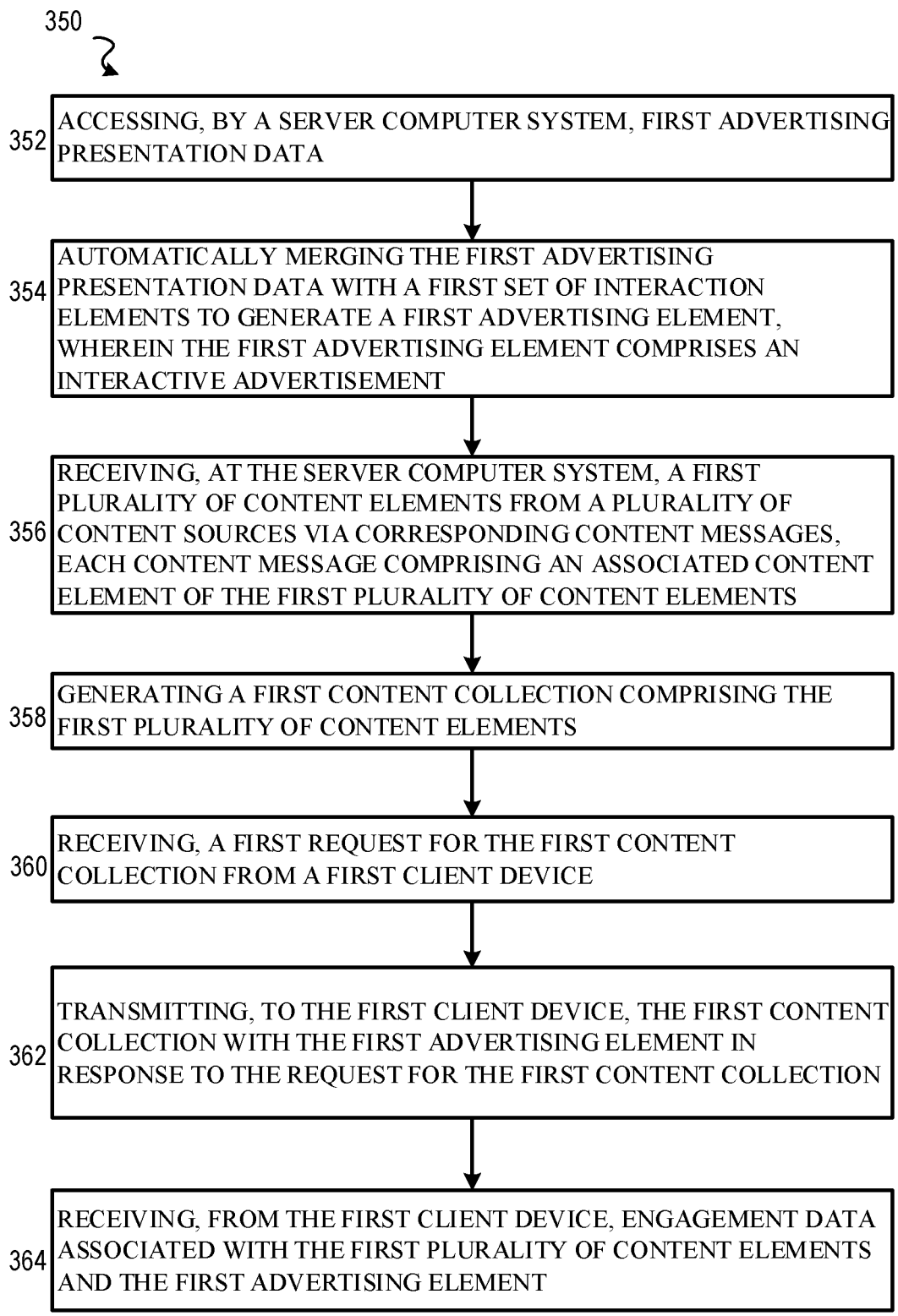
FIG. 3B is a flow chart illustrating aspects of a method, according to some example embodiments.

FIG. 3B is a flowchart illustrating aspects of a method 350, according to some example embodiments. In some embodiments, method 350 is performed by circuitry of a device such as a computer of server system 120 or a machine 1800. In other embodiments, method 350 is implemented as a computer-readable storage medium comprising instructions that, when executed by one or more processors of a device, cause the device to perform the operations of method 350. Just as above for method 300, while particular operations are described for method 350, it will be apparent that similar methods may operate with intervening or repeated operations. Additionally, method 350 may be performed by a server computer in communication with a client device performing method 300.

Operation 352 of method 350 involves accessing, by a server computer system, first advertising presentation data. In various embodiments, advertising presentation data may be received at the server system from another device, or may be loaded into the server system by an operator 108. Operation 354 then involves automatically merging the first advertising presentation data with a first set of interaction elements to generate a first advertising element, wherein the first advertising element comprises an interactive advertisement. In some embodiments, this merging involves identifying a content category associated with a content collection, and matching interaction elements for the advertising data to be presented with a content collection to the category of the content collection. In some embodiments, this merging involves identifying a content category associated with the advertising data, and selecting interaction elements based on the category of the advertising data.

For example, in one embodiment, a content collection selected by a user may be associated with a plurality of categories, such as "nature", "animals", "birds", and "rainbows." The system may further have a number of different sets of advertising data that may be presented to users at a given time. Each set of advertising data may have one or more associated categories. Similarly, the system may have access to a number of different sets of interaction elements, with each set of interaction elements having one or more associated categories. A first set of interaction elements may be associated with sports and basketball. A second set of interaction elements may be associated with animals, nature, and birds. A third set of interaction elements may be associated with animals, cats, and pets. The system may select advertising data and associated interaction elements based on a variety of inputs. In some embodiments, this may be based on preferences or user history for an individual user account. Such history may include prior interaction data, preference inputs for certain categories, or system settings with data provided by a user for category preferences. In other embodiments, the selection may be based on anonymous preference data aggregated from system users. In other embodiments, these selections may be made by an operator 108 using a management system for generating content/media collections.

Once the particular advertising data and interaction elements are selected, different systems may merge the advertising data and interaction elements in different ways. In some embodiments, the interaction elements comprise images or animations that are transmitted to a client device with the advertising data. Such systems may additionally transmit logic or interaction rules describing how the interaction elements function during presentation of the advertising data. This may include software for control of the interaction elements based on sensors or input devices at a client device. In some embodiments, particular interaction elements may be limited to devices with known functionality or performance requirements based on information about the client device received at the server system. In other embodiments, merging of interaction elements with advertising data simply involves identifying an interaction element type, and communicating this identification to the client device, with additional processing and merging of the interaction elements and controls managed at the client device.

Operation 356 then involves receiving, at the server computer system, a first plurality of content elements from a plurality of content sources via corresponding content messages, each content message comprising an associated content element of the first plurality of content elements. Such content elements may be received as part of a communication platform that allows users to communicate ephemeral images or video clips to other users, or to a system for inclusion in a content collection. Content collections are then generated in operation 358. In some embodiments, some content collections are associated with individual users, with pieces of content from a user added to that user's content collection and then deleted from the system and the user's content collection within a threshold time period after the content is received at the server system 120. In other embodiments, a content collection includes content from multiple different users and different associated user devices based on a geographic area, a content category associated with the details of the images or video clips, or any other such categorization. In some embodiments, content elements may be received from dozens, hundreds, or thousands of different users, with different combinations of automated filtering or operator selection to generate content collections using a limited selection of the received content elements.

For example, a plurality of users 106 may send a plurality of content messages related to a particular event (e.g., music concert, sports event, street fair, expo, etc.), a geolocation (e.g., concert venue, sports arena, city, neighborhood, state, etc.), a subject or topic (e.g., popular song, product, weather, etc.), a common user interest (e.g., shared interest in sports, music, clothing, celebrities, products, activities, etc.), etc. The content messages may be created and sent by a plurality of client devices 110. For example, a user 106 may take a picture, record a video, incorporate text or a media overlay (e.g., filter) with a picture, video, etc., and send the content message to another user 106 or to server system 120 to be associated with one or more predetermined media collections (or to create a new media collection). Content messages may include additional information such as a timestamp indicating the time the content was created or sent, a username, etc. The timestamp may be used to sort the content chronologically or determine any expiration day/time of a content message. The username may be used to identify the users 106, identify users 106 contributing good content to be flagged as a good contributor, identify users 106 who may be spammers so they can be muted, etc.

For each of the plurality of content messages received by the server system 120 (e.g., by content processing server 124), the content processing server 124 may associate the content in the content message with one or more predetermined media collections. For example, an indication of one or more media collections may be included in the content message, and the content processing server 124 may utilize the indication to associate the content with the one or more media collections. In another example, the content processing server 124 may determine an associated media collection based on the content in the content message (e.g., via text recognition, object recognition, audio foot print, etc.). The content processing server 124 may store the content message associated with the one or more media collections. In some embodiments, advertising elements and interaction elements may be associated with particular media collections based on a content type of the media collection, a location of the media collection, or some other characteristic associated with the media collection or metadata from content messages or content elements of the media collection.

A first request for the first content collection from a first client device is received in operation 360, and operation 362 involves transmitting, to the first client device, the first content collection with the first advertising element in response to the request for the first content collection.

Optionally, operation 364 then involves receiving, from the first client device, engagement data associated with the first plurality of content elements and the first advertising element. In some systems, to preserve user anonymity, no such data is collected. In some embodiments, user data is collected based on an opt-in communication from a client device associated with a user account. In some embodiments, engagement data is aggregated with data from other users to prevent a communication system from tracking individual user operation histories.

For systems that receive engagement data, the data may include information on whether advertising data was presented for the full duration of the available advertising presentation, or if an ad skip input was received at a device. Engagement data may include details on user inputs associated with interaction elements. In systems where interaction elements are associated with a game having a scoring element, the engagement data may include score information that is used for future interaction elements. In some systems, a running score may be kept, such that scores from different interaction elements associated with different advertising data are accumulated over time. In some systems, this score data or other such interaction data may be shared with other users based on user permissions, so that other users' devices associated with a user's social graph may receive score data for their friends' accounts as part of interaction elements provided to devices of different users. Additional details on engagement data in various embodiments is described below.

Figure 4A:
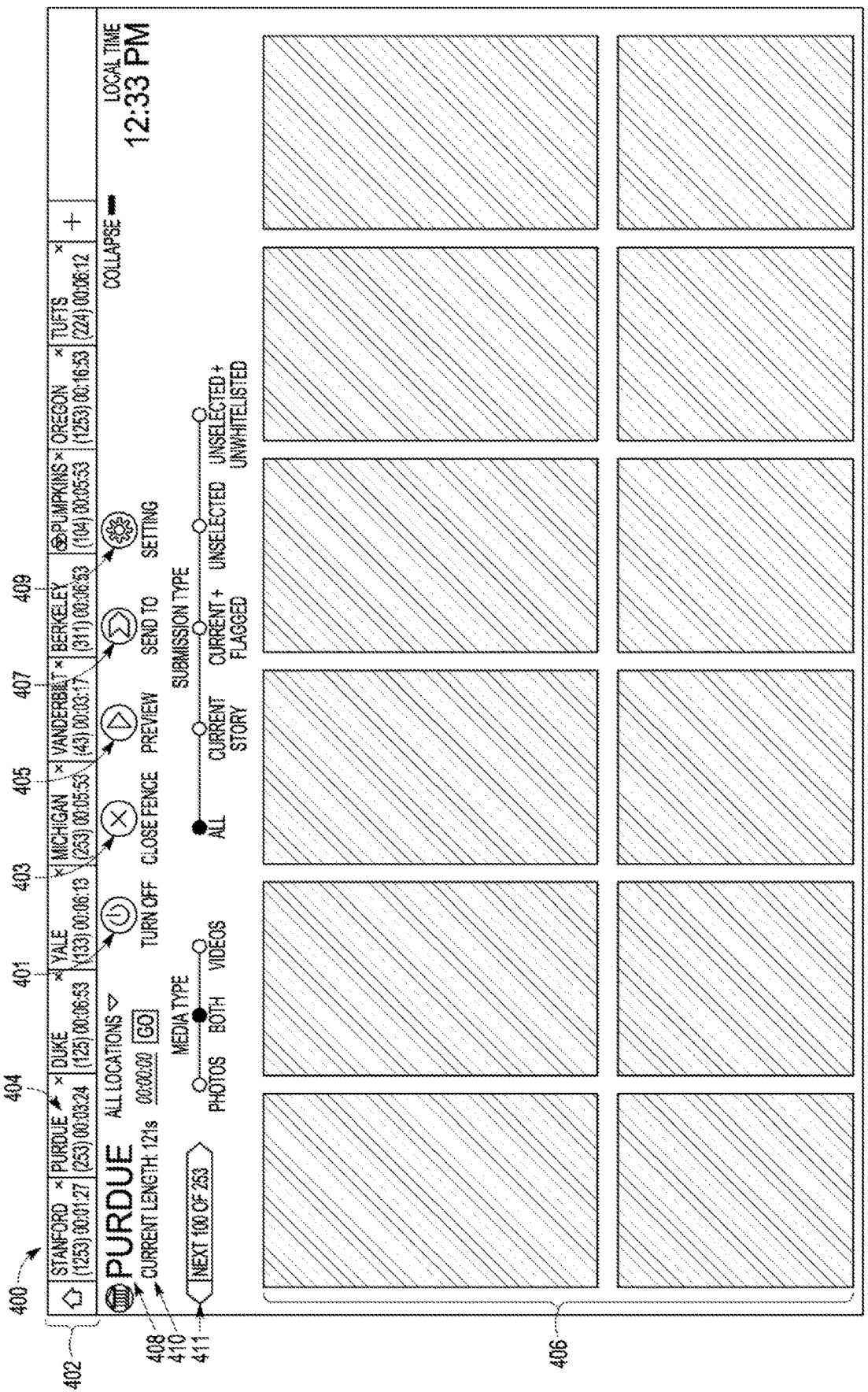
FIG. 4A-4E are example user interfaces to review and curate content for media collections.

In some embodiments, content messages are managed and integrated with collections, advertising data, and interaction data by operator systems. For example, in some embodiments, content messages received from client devices are filtered by image processing to eliminate low quality content, and the remaining content is displayed on an operator device 130. For example, an operator 108 may use an interface in a web browser or in an application 134, such as the user interface 400 shown in FIG. 4A, to review and curate content for one or more media collections. In the example interface 400, the operator 108 is viewing/curating ten different media collections, as shown in the tool bar 402. The media collections in example interface 400 are associated with college campuses (e.g., Stanford, Purdue, Duke, Yale, Michigan, Vanderbilt, Berkeley, Oregon, Tufts). At any time, an operator 108 may be viewing or curating one or more media collections. Media collections may be ongoing stories (e.g., ongoing stories associated with a college campus, celebrity, music band, product, activity, etc.) or may be live stories associated with a live event (e.g., concert in progress, game in progress, black Friday, social event, etc.).

Each media collection may have an identifier associated with the media collection. The identifier (e.g., identifier 404) may include the name of the media collection, a number of content items or content messages in the queue (e.g., to be reviewed/curated), a local time of the specific story, a time which may indicate a time since the media collection was last updated by an operator 108 or a time of the most recent approved content item or content message, and a status indicator. Media collections may be removed or added to the interface 400 by the operator 108 or server system 120.

A status indicator in the identifier of the media collection may include a color, a flashing tab, etc. For example, the identifier of the media collection (e.g., identifier 404) may appear green (e.g., a first indicator) when the media collection does not require immediate attention, red (e.g., a second indicator) when the media collection does require immediate attention, or yellow (e.g., a third indicator) when a media collection is incomplete.

The server system 120 may set or update an identifier of a media collection based on a trigger. For example, the server system 120 (e.g., content processing server 124) may determine a predetermined trigger has been activated. The predetermined trigger may be a predetermined amount of time (e.g., 30 seconds, 1 minute, 15 minutes, 1 hour, 1 day, etc.) that has passed since the content items or content messages associated with the media collection have been viewed on the operator device 130, a predetermined number of content items or content messages that have not been viewed on the operator device 130, a predetermined amount of time that has passed since any content associated with the media collection has been pushed live to be viewed by users 106, etc. In some embodiments, receipt of new advertising data may operate as a trigger. If the content processing server 124 determines that a predetermined trigger has been activated, it will then update an identifier of the media collection from a first indicator to a second indicator.

For example, the content processing server 124 may determine that a predetermined amount of time (e.g., five minutes, fifteen minutes, one hour, one day, etc.) has passed since the content items or content messages associated with the media collection have been viewed on the operator device 130. The content processing server 124 may change the indicator from green (e.g., a first indicator) to red (e.g., a second indicator) to alert the operator 108 to the fact that the media collection needs immediate attention. This may be particularly important when an operator 108 is curating multiple media collections and for live media collections (e.g., events in progress) where timeliness may be important. For example, a concert may be only two hours long and so an operator 108 may not want to let more than a few minutes pass before updating content in a media collection related to the concert.

The operator 108 may select the identifier to view content to be reviewed and curated for a particular media collection. For example, the currently selected media collection identifier 404 in example interface 400 is "Purdue". Once a media collection is selected, information specific to the selected media collection may be displayed. For example, for the selected "Purdue" media collection, information displayed may include the name 408 of the media collection, the current length 410 of the media collection (e.g., the number of content messages or content items in the live or published version of the media collection), the location within the media collection (e.g., a particular geofence within the media collection, or all locations within the media collection), etc. There may be other mechanisms for performing additional functionality, such as a button 401 to turn the media collection on or off (e.g., turning a media collection on may push the selected media collection or story live). Other functionality may include a button 403 to open or close a geofence, a button 405 to preview the media collection in a video player, a button 407 to send the current media collection to a user 106 or list of users, and advanced settings 409 with additional options. In some embodiments, such settings 409 include a list of available sets of advertising data and/or sets of available interaction data. An operator may use such settings 409 to associate particular sets of interaction or advertising data, or particular categories of advertising data and interaction data, with a collection based on the observed content of the collection. Because the content of a collection may change over time as new content elements are received and old or lower quality content elements are removed, triggers to update such associations may be present in a system.

Additional examples of advanced settings 409 may include filters to filter out content items or content messages of certain types by selecting various filters. For example, types that can be filtered out may include videos, photos, approved content items or content messages, flagged content items or content messages, whitelisted content items or content messages, unselected content items or content messages (e.g., not approved, flagged, or whitelisted), etc. Filtering may only effect the current queue.

The operator 108 may also filter a media collection by: location, if there is more than one location within the media collection; default content item or content message length; how many content items or content messages will be displayed on a page; how often the number of content items or content messages in the queue are updated; how may content items or content messages the operator 108 can go back when selecting an undo button; all submissions; current media collection only, or current plus flagged, unselected, unselected plus whitelisted, etc.

Figure 4B:
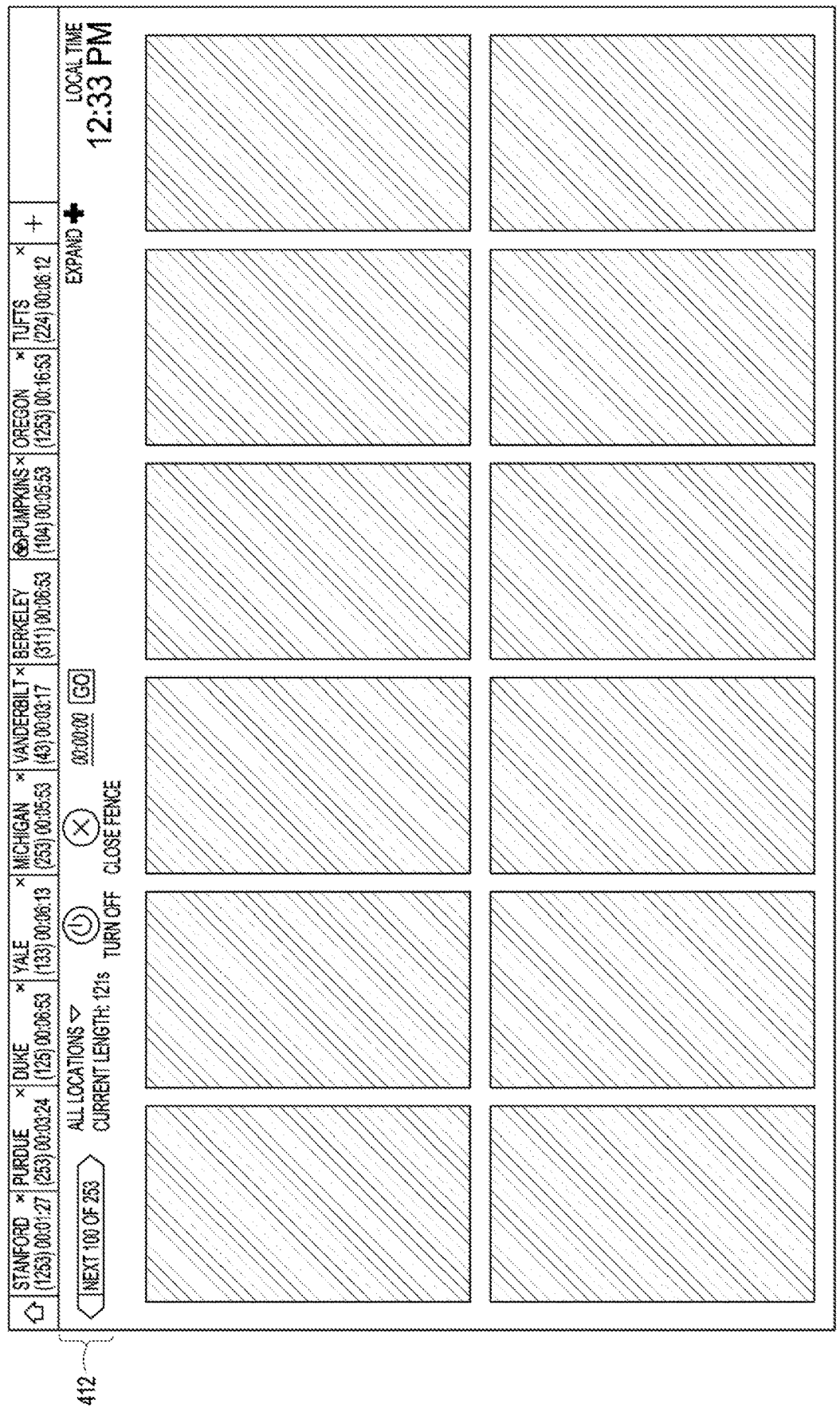

The interface 400 may further include a mechanism for loading the next content items or content messages in the queue. For example, there may be a button 411 that may be selected by the operator 108 to get the next 100 content items or content messages. FIG. 4B shows a collapsed view 412 of the information provided for the selected media collection.

Figure 4C:
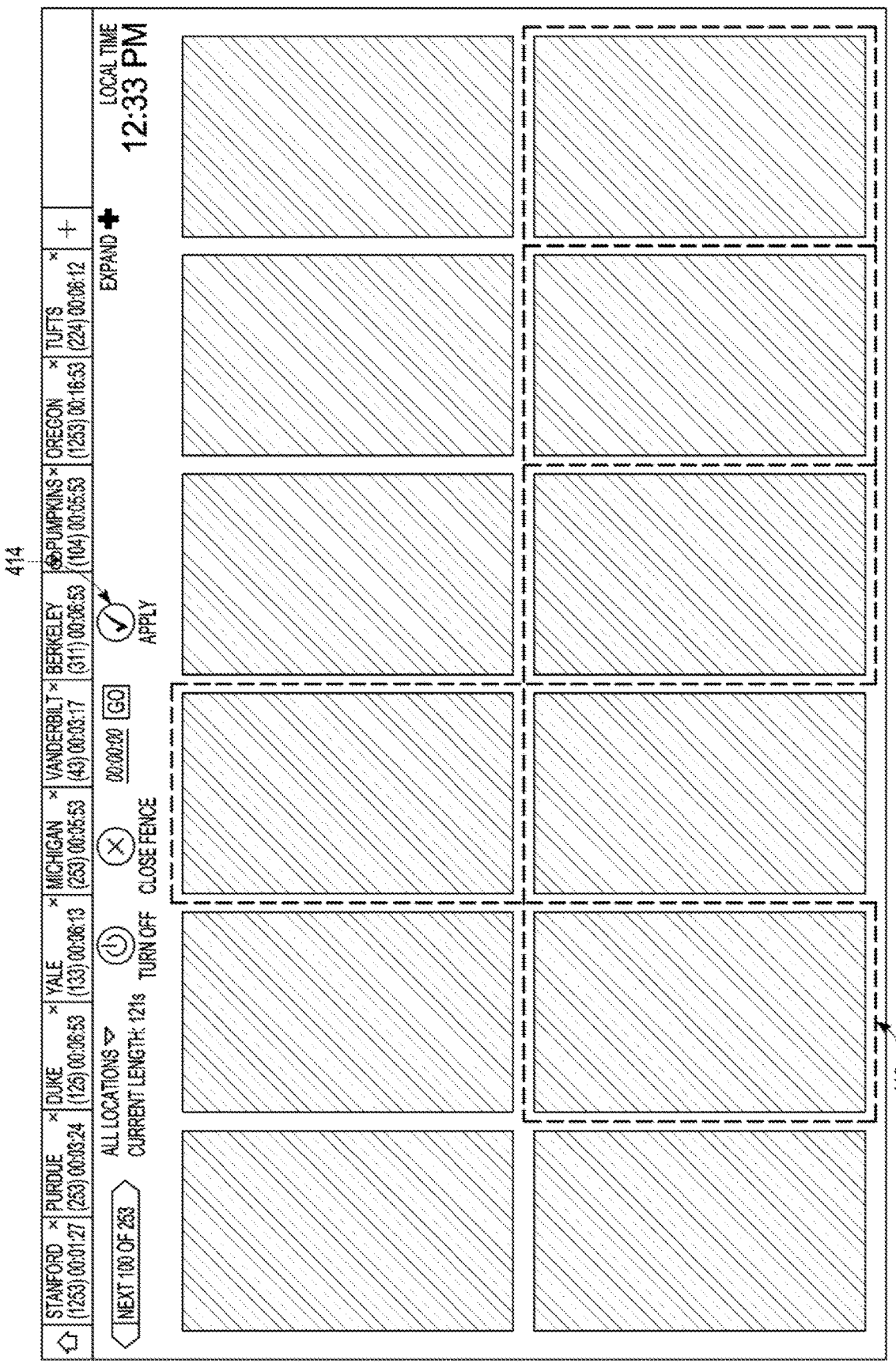
Figure 4D:
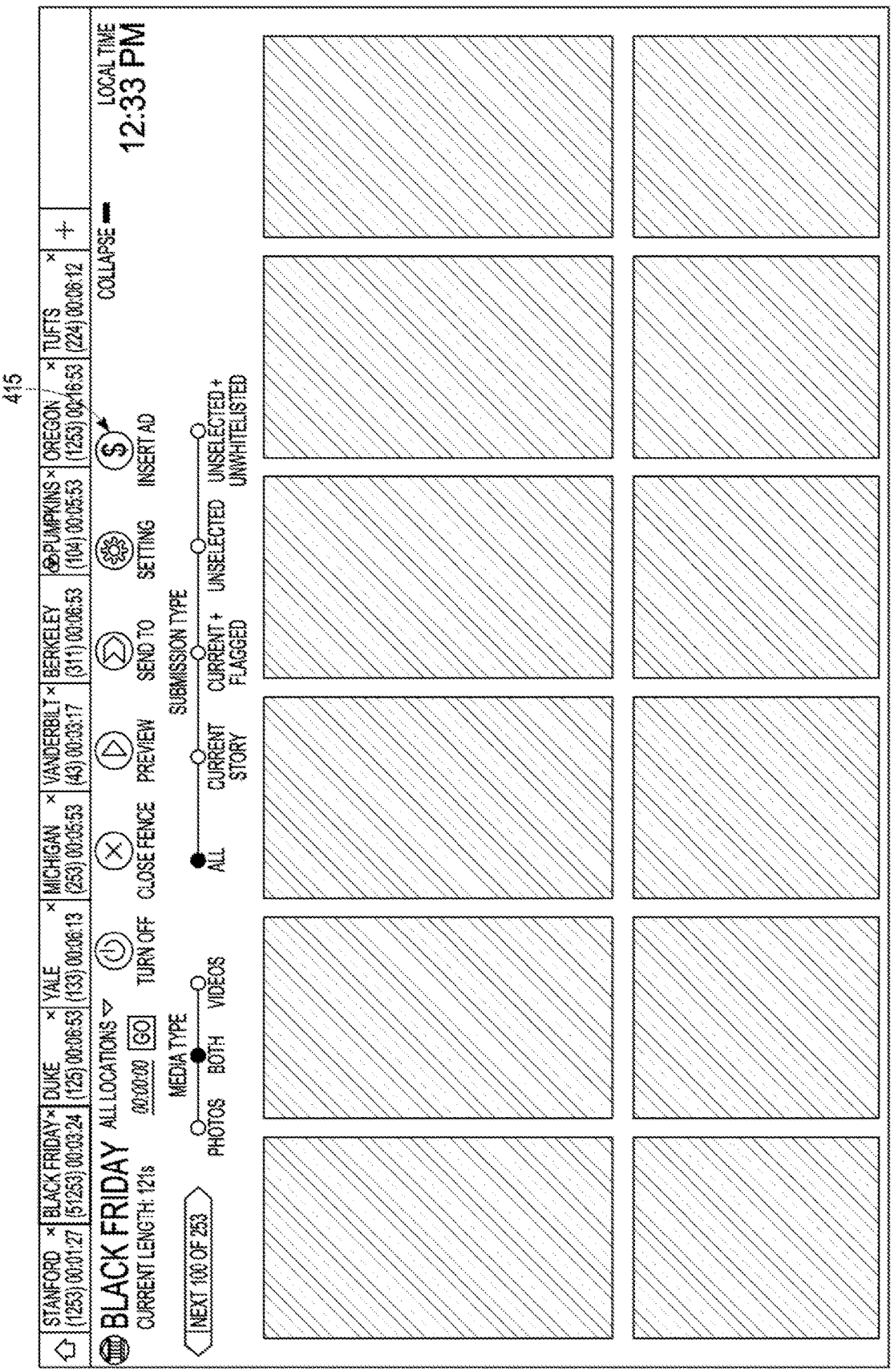
Figure 4E:
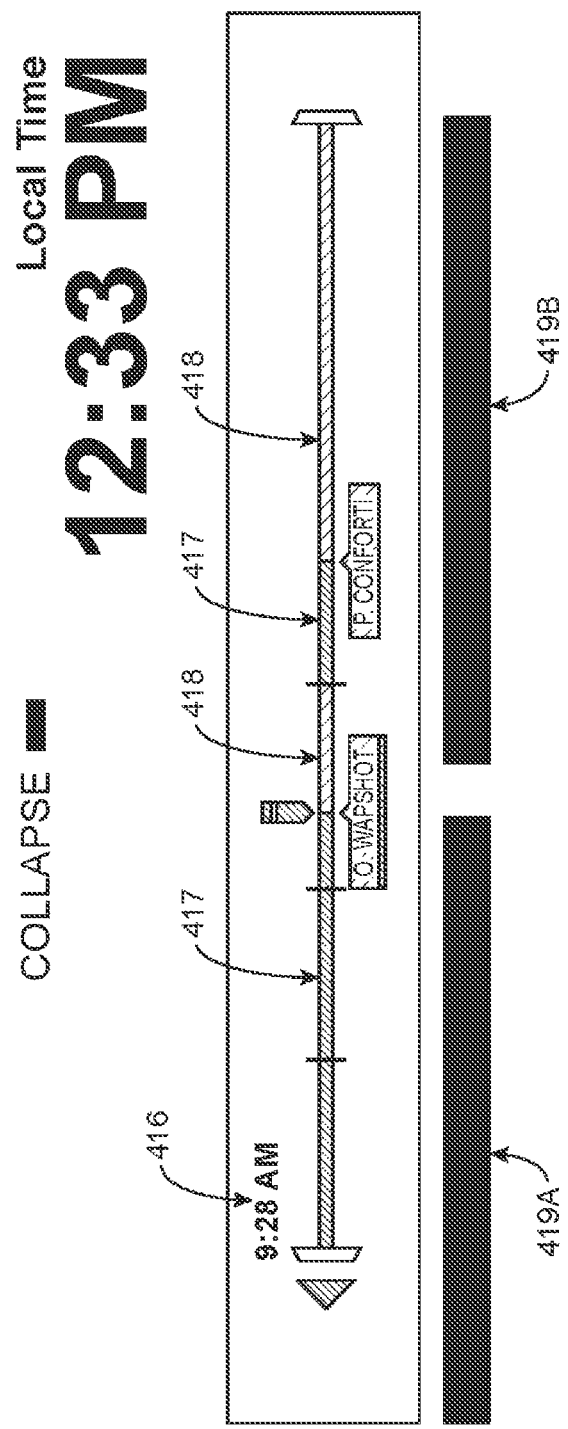

The operator 108 may be able to view a timeline, such as the example timeline 416 shown in FIG. 4E. The timeline 416 may show the progress of operator 108, relative to the rest of the media collection. For example, content items or content messages that have been viewed by the operator 108 may be shown in a first color (e.g., blue) 417 or other indication, and content items or content messages that have not yet been viewed may be represented by a second color (e.g., grey) 418 or other indication. Published content items or content messages (or chapters) may also be represented (e.g., by a bar 419A or 419B).

An operator 108 may also have the option of adding an advertisement to the media collection. For example, an operator 108 may be able to select to add an ad via a button 415 as shown in FIG. 4D. A list of ads may be displayed to the operator 108 (e.g., in a separate window) and the operator 108 may select and drag and drop one or more ads to be included in the media collection. Ads may also appear automatically after chapters are published, when appropriate (e.g., based on an amount of time that has passed in the media collection or since the last ad was displayed in the media collection).

While viewing the content items or content messages for a media collection, the operator 108 may select individual content items or content messages to show that the individual content items or content messages have been approved for pushing live (e.g., "published" to be viewed by users 106 as part of the media collection), as shown in FIG. 4C. A visual indication may be displayed when the individual content item or content message is selected or approved (e.g., it may be highlighted, flash on and off, greyed out, etc.). Once the operator 108 selects the content items or content messages to be approved, the operator 108 may indicate that the selected content items or content messages should be applied, for example, by selecting a "apply" button 414. There may be a number (not shown) that appears next to the apply button 414 that indicates how many approved content items or content messages will be applied. Selecting the apply button 414 will cause the current chapter (e.g., the approved content items or content messages) to be pushed live. For example, the selection of content items or content messages is sent to the server system 120, where it may be received by server system 120 (e.g., content processing server 124) and included in the selection of content in the media collection and made available to users 106 to view as part of the media collection. Once the approved content items or content messages are applied, the visual indication may change to indicate they have gone live (e.g., the color may change, etc.).

An operator 108 may view and edit individual content items or content messages. For example, a tool may be provided to stabilize shaky video, strip a media overlay or filter off of a content item or content message (e.g., a media overlay that has inappropriate content, covers a key feature or object in the content item or message, etc.), block a particular user 106, report a content item or content message, trip a photograph or video length, etc.

In some embodiments, an operator 108 selects previously generated advertising content to be pushed with the media collection. In some embodiments, a particular order or position within display of content elements is selected by the operator 108. In some embodiments, an operator 108 identifies a position between other content messages as an advertising position in a presentation order, with the particular advertising content to be selected automatically for a particular requesting user that is viewing the media collection. In various embodiments, an interface for selecting advertising and pushing the advertising as part of a media collection is similar to the interface for selecting content as part of the media collection.

In other embodiments, including advertising within the presentation of a media collection is done by automatically inserting the advertising between other selected content items. In some such embodiments, an operator 108 selects or otherwise identifies groups of content items or content elements to be presented sequentially without interruption by advertising content. When a presentation order for pushing content to a client device, e.g., the client device 110, is determined with automatic inclusion of advertising elements, the continuous presentation groups identified by operator 108 are used to adjust the placement of automatic advertising within the media collection as presented on the client device 110. In some embodiments, as new content messages are received and new content added to some media collections, older content elements and continuous presentation groups are presented later and later in the presentation of the media collection, with newer content elements presented at the beginning. In such embodiments, automatic insertion of advertising content is used to maintain present advertising according to system rules while maintaining the grouped presentation of the continuous presentation group even as the position of the continuous presentation group in a media collection changes.

As mentioned above, the server system 120 may receive tens of thousands (or more) of content messages from a plurality of client devices 110 containing media content from a plurality of users 106. It may be very difficult, if not impossible, for an operator 108 to review and curate so many messages for one or more media collections. Moreover, many media collections may relate to a live event where reviewing, curating, and pushing content items or content messages live for a media collection may need to be done in a very timely manner. Accordingly, in some embodiments the curation tool described above provides a number of mechanisms and filters to curate content items or content messages related to one or more media collections, either in a completely automated fashion, or in conjunction with an operator 108. Additionally, in some embodiments such processing may automatically categorize content elements used for a collection (e.g., using machine vision to identify elements in an image and categorize the image based on identified portions of the image). Such categorizations may then be used to generate categories for collections that individual content elements are part of.

Figure 5:
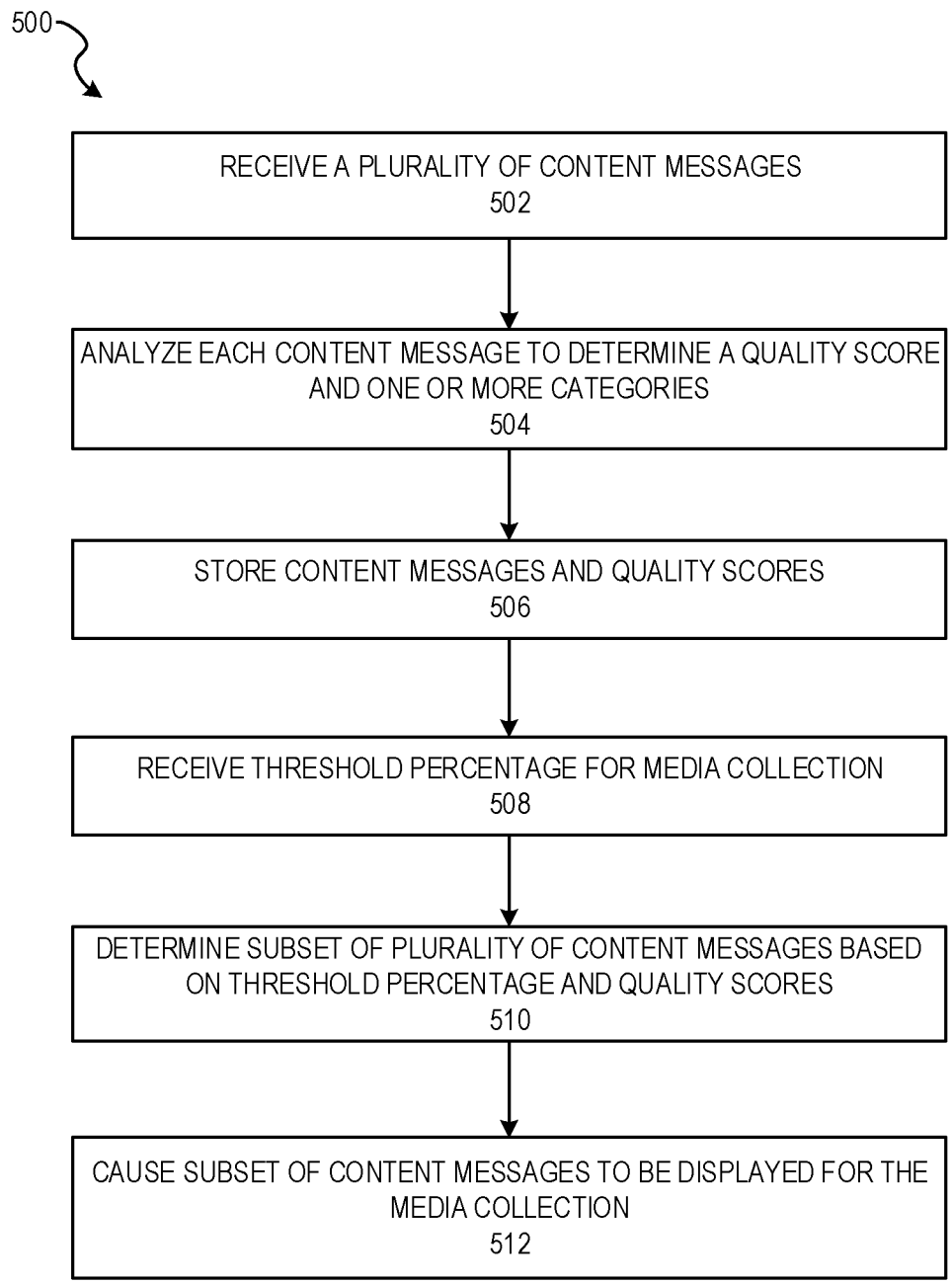
FIG. 5 is a flowchart illustrating aspects of a method, according to some example embodiments.

The curation tool may further provide a mechanism for an operator 108 to filter out a certain percentage of content items or content messages to automate some of the review and curation process so that the operator 108 may be able to efficiently review and curate content items or content messages in a timely manner. FIG. 5 is a flowchart illustrating aspects of a method 500, according to some example embodiments. For illustrative purposes, method 500 is described with respect to networked system 100 of FIG. 1. It is to be understood that method 500 may be practiced with other system configurations in other embodiments.

At operation 502, the server system 120 (e.g., at content processing server 124) may receive a plurality of content messages from a plurality of content sources. The content messages may comprise media content (e.g., photos, video, audio, text, etc.) and may be associated with one or more media collections.

For example, a plurality of users 106 may send a plurality of content messages related to a particular event (e.g., music concert, sports event, street fair, expo, etc.), a geolocation (e.g., concert venue, sports arena, city, neighborhood, state, etc.), a subject or topic (e.g., popular song, product, weather, etc.), a common user interest (e.g., shared interest in sports, music, clothing, celebrities, products, activities, etc.), etc. The content messages may be created and sent by a plurality of client devices 110. For example, a user 106 may take a picture, record a video, incorporate text or a media overlay (e.g., filter) with a picture, video, etc., and send the content message to another user 106 or to server system 120 to be associated with one or more predetermined media collections (or to create a new media collection). Content messages may include additional information such as a timestamp indicating the time the content was created or sent, a username, etc. The timestamp may be used to sort the content chronologically or determine any expiration day/time of a content message. The username may be used to identify the users 106, identify users 106 contributing good content to be flagged as a good contributor, identify users 106 who may be spammers so they can be muted, etc.

For each of the plurality of content messages received by the server system 120 (e.g., by content processing server 124), the content processing server 124 may analyze each of the plurality of content messages to determine a quality score for each of the plurality of content messages, as shown in operation 504. The quality score may be determined based on a number of different factors. For example, the content processing server 124 can analyze the media content in the content message to determine the quality of the audio, photographs, videos, text, or other content. If the quality of the media content is low (e.g., lower resolution, shaky video, blurry text, unclear audio, etc.), the content message is given a lower score than for media content with a higher quality. The images are further analyzed to identify categories for the content. Such categories may be based on a location identified by the content message, a time associated with capture of the content, or image elements within the content. For example, images including trees, cats, a basketball, or other such elements may be categorized based on machine vision identifying these elements within the image.

Some example factors that may be used to determine a quality score include an explicit content likelihood (e.g., probability that images or videos contain explicit content such as nudity, drug use, profanity, etc.), underexposure (e.g., very dark or completely black images or videos), overexposure (e.g., too bright images or videos), noise level (e.g., images or videos that look to grainy as a result of being taken in low light conditions with a low-end camera), shaky camera (e.g., when camera is too shaky when taking a video), blurry media content (e.g., images and video that look too blurry), low quality compression (e.g., removes content messages with excessive compression artifacts), audio quality, areas within an event (e.g., if too many content messages showing a particular area in an sports arena or a particular play in a game, may be scored lower), content messages that are all black and white, etc.

A combination of different factors may result into a single quality score. For example, quality score may range from 0 to 1, with 0 being the lowest quality and 1 being the highest quality. A content message of lower quality may be scored with a 0 or 0.1. A content message of higher quality may be scored a 0.9 or 1. The factors may be combined into a single quality score using heuristics and/or using machine language based on operator 108 behavior. The content processing server 124 may optionally sort all of the content messages for a media collection by quality score.

A quality score, in some embodiments, is based on a detailed exposure analysis of an image or a sample of frames in a video clip. For example, a histogram of luminance may be calculated, and a quality may be assigned to the image or video based on a correlation of the histogram with a quality score. Such a correlation may be based on a table or function associating certain histogram patterns with selected quality scores, or may be generated in any other such manner. For video where multiple sample frames are analyzed, an average of scores for each frame may be used to select a score, a worst score for an individual frame of all the analyzed frames may be used, or any such combination or function of multiple scores or selections of scores may be used.

In some embodiments, a motion-blur estimation of an image or of selected video clips is used as a part of the quality score. Such motion blur estimation may, for example, be based on a calculation of energy gradients on detected edges, or other such motion estimations. For video clips, identifying video frames with motion blur above a threshold amount may trigger analysis of additional sample frames to determine how much of the video is impacted by motion blur, or to identify when a shakiness of a camera sensor impacts an entire video. In certain embodiments, a system may use a threshold for video motion or "shakiness" to filter out videos with camera motion or shake above the threshold. In other embodiments, a shakiness or motion score may simply modify an overall quality score. In other embodiments, both a hard threshold as well as an input to an overall quality score may be used.

In some embodiments, images or sample video frames may be analyzed for compression artifacts or other image processing artifacts that indicate a lower image quality or errors introduced into an image due to various compression or communication problems. Such artifacts may include image ringing, image contouring, staircase noise along curving edges, posterizing artifacts, or block boundary artifacts. Videos may be analyzed for additional video-based compression artifacts such as block boundary artifacts associated with motion compensation or mosquito noise that may be identified by analysis of selected frames of a video. The presence of such compression artifacts and the intensity of any identified compression artifacts may be used to modify or select a quality score for an image or video clip. In addition to such information loss associated with compression or lossy transmission, images and video frames may also be analyzed for other types of noise. For example, variance in smooth or uniform regions of an image may be analyzed for noise artifacts, such as noise associated with a low quality or malfunctioning camera sensor, low quality or dirty optics of a camera, or any other such source of noise that may lower, corrupt, or modify the data in the image.

Audio data is also used for quality scoring of video clips in some embodiments. In such embodiments, various audio metrics such as dynamic range, noise levels, language clarity or language recognition data, or any other such audio-based information, may be used to select an audio quality score or to impact an overall quality score. Different audio data metrics, in some embodiments, are used based on a determined audio environment. For example, a video clip with speech may be assessed differently than a clip with music, or video clips with different types of music may be assessed differently. Additionally, audio spotting to identify objectionable audio content (e.g., taboo spoken language or explicit music lyrics) can be used for a quality score or a quality threshold flag in some embodiments.

In addition to quality scores based on image quality, some scores may be based on image content. For example, as mentioned above, image processing may be used to identify objectionable content such as nudity or taboo language within an image or video clip. In some embodiments, a preferred orientation (e.g., landscape or portrait) may be used for quality scoring. Some systems may additionally use image recognition to identify desirable content. For example, in some systems, images of animals or images of objects associated with a party environment are identified as desirable. The presence of such images within video frames or pictures may be used to increase an overall quality score, or to generate a content score. In some embodiments, image or video content may additionally be used to associate certain advertising elements with a media collection, or with certain content elements. Advertising elements in a position close in a presentation order to a certain content element having identified image content types may be used to select the particular advertising element to be positioned in a slot of a presentation order.

Feedback or machine learning is used in certain embodiments to select or set a quality score. Such systems may use neural networks to extract features identified as preferred or interesting to system users. For example, in some embodiments, images selected by system users for inclusion in one or more stories may be selected for a learning set. Some or all images and video frames from the learning set may have features extracted and analyzed using a feed-forward artificial neural network such as a convolutional neural network to identify desirable elements of the images, and to automatically assign an interestingness score to future images received based on the neural network generated with the learning set. Feature maps used within such neural networks may be based on any analysis metric described herein, including image quality features and image content features. In some embodiments, learnable filters may be selected and automatically updated based on a database of images from image processing services used for content analysis of images or video frames. In other embodiments, any other such sources may be used for learnable filters. Such analysis may be applied to both image elements of content as well as to audio elements of videos.

Other feedback mechanisms may be used in various embodiments. For example, in some embodiments, a content source, user, or account associated with generating an image or video clip may have associated history data. In some embodiments, association of a content source with a history of content selected by system users or associated with high quality ratings may be used as an input to a quality score, or may be used as a quality flag. Various content source metrics such as the quality history, number of images sent, number of system followers or interconnections, or other such metrics may be used.

In some embodiments, multiple different quality scores may be associated with each individual piece of media content, so that an image may have an exposure quality score, a noise quality score, a motion quality score, a compression quality score, a resolution quality scores, an audio quality score, a content score, or any other such separate quality scores. In such embodiments, an overall quality score based on any combination of such individual quality scores may also be provided. Further, as mentioned above, some or all such quality scores may individually be used to reject certain pieces of media content automatically, with only the images or videos that exceed all thresholds being presented to a system user. Such a system may have any number of thresholds based on separate quality scores or multiple different combinations of different quality scores. In some embodiments, such thresholds may be variable to present a target number of images and/or videos to a system user. Similarly, different types of images or video clips may be assessed differently, such that weights may be applied to different images differently based on content, location, time, proximity in location or time to a holiday or news event, overall environment, or other such information. The metrics and weights for any of the above, in some embodiments, are applied differently to a selfie taken inside than to concert footage taken outdoors at night.

Once quality scores and content categories are generated, some embodiments may further generate associations between content elements and advertising data or interaction elements already present at the server system. These associations are then used when a client device requests a content collection, to select advertising data and interaction elements to be sent to a client device with data for a content collection.

In operation 506, the content processing server 124 may store the plurality of content messages, along with the quality score for each of the plurality of content messages, in one or more databases 126. The quality score may be stored as metadata associated with the content message. The content processing server 124 may optionally sort all of the content messages by quality score.

Figure 6:
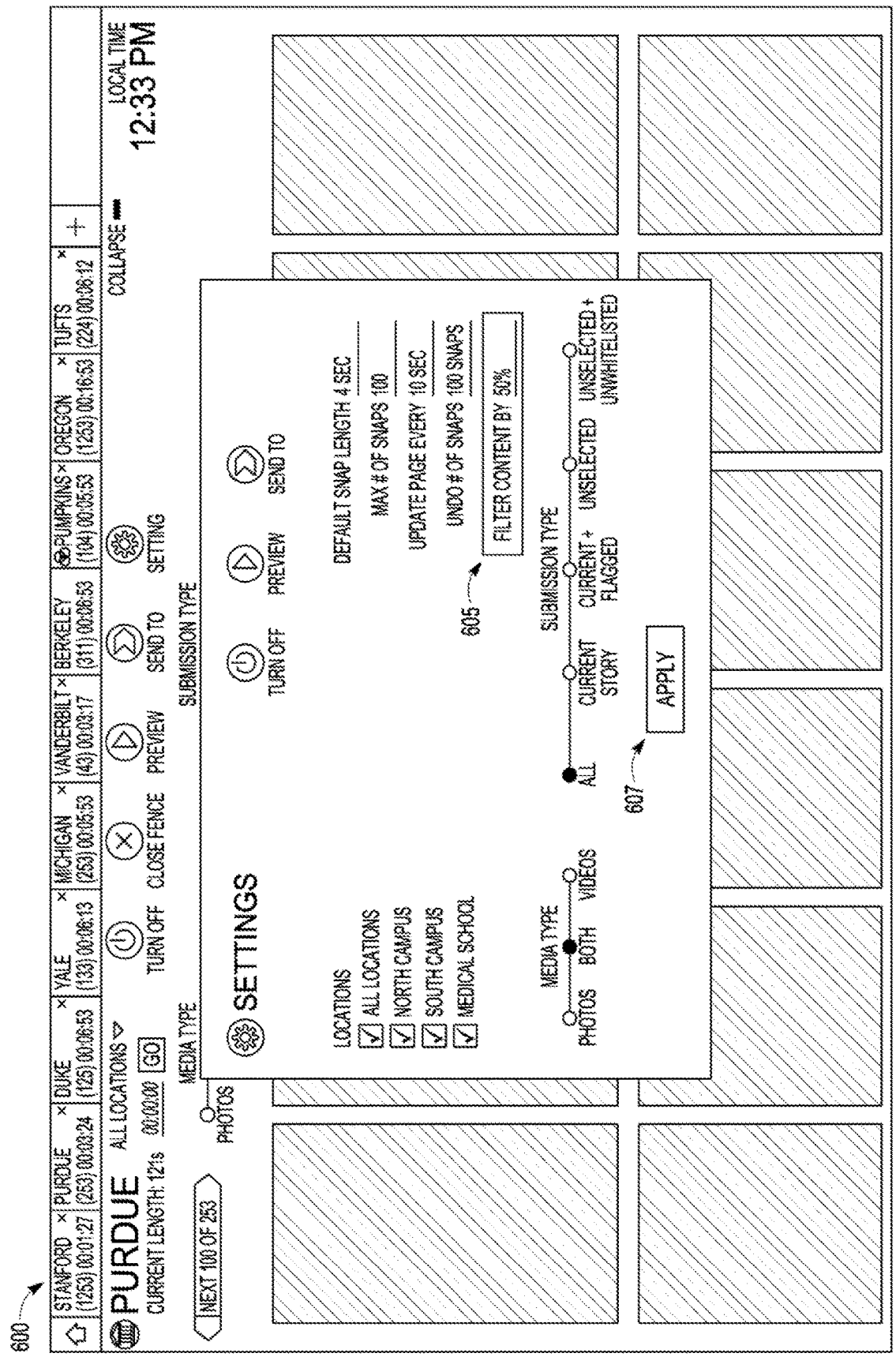
FIG. 6 is an example user interface for filtering content, according to some example embodiments.

In operation 508, the content processing server 124 may receive, from an operator device 130, a threshold percentage for a media collection. For example, the operator 108 may be provided with an interface, such as the interface 600 shown in FIG. 6, to provide a threshold percentage 605 by which to filter the content in the media collection. For example, the operator 108 may only want to receive the top quality content messages (e.g., due to a large volume of content messages in the queue/media collection). The operator 108 may enter a percent (e.g., 50%) and submit the threshold percentage to the content processing server 124 (e.g., via the "APPLY" button 607).

In operation 510, the content processing server 124 may determine a subset of the plurality of content messages associated with the media collection to be made available to the operator 108 (e.g., via an operator device 130) based on the threshold percent received by the operator device 130 and the quality score for each of the plurality of messages. For example, the content processing server 124 may determine the top 50% of the content messages in the media collection based on the quality score for each of the plurality of messages (e.g., the top 50% of highest scoring content messages). In other embodiments, such a subset is simply managed or further filtered by the logic of the system to automatically generate a collection with no operator review.

In operation 512, the content processing server 124 may cause only the subset of the plurality of content messages associated with the media collection to be displayed on the operator device 130 for the media collection. For example, if the content processing server 124 has received 10,000 content messages, and the threshold was set to 30%, the content processing server 124 may only cause 3000 content messages to be displayed on the operator device 130.

Since the content processing server 124 may be continuously receiving a plurality of content messages, the content processing server 124 may re-compute the subset of the plurality of content messages for a media collection periodically. For example, after causing the initial subset of content messages to be displayed on the operator device 130, the content processing server 124 may determine a subset of newly received content processing messages (e.g., since the last subset was determined) after a predetermined number of content messages have been received (e.g., 100, 1000, etc.) or after a predetermined amount of time (e.g., 30 seconds, 10 minutes, 30 minutes, 1 hour, etc.). Moreover, the operator 108 may change the threshold value from a first value (e.g., 50%) to a second value (e.g., 30%). The content processing server 124 may receive the new threshold value and use the new threshold value to determine the subset of the plurality of content messages received going forward. In addition, or in the alternative, the content processing server 124 may also adjust the value of a subset that was already made available to the operator device 130 (e.g., may cause more content messages to be displayed on the operator device 130 if the operator 108 increased the threshold percentage value).

Input from an operator 108 may be used to improve the quality score algorithm. For example, an operator 108 may be able to mark or otherwise indicate when a content message is low-quality. The server system 120 may also track each time an operator 108 flags or accepts a content message, or indicates a content message is related to a particular breaking news story, etc. For example, the content processing server 124 may analyze content messages that were accepted by operators 108 and content messages that were not accepted by operators 108, and use this data to create a model to determine a probability that an operator 108 would accept a particular content message. This factor (e.g., probability of operator acceptance) may be used as a factor in computing the quality score for the content message.

In another example embodiment, a client application 114 may be provided that includes a media collection creation and curation tool for an end user 106. The tool may allow the user 106 to create new media collections, view a list of media collections, view a plurality of content items or content messages associated with a predetermined media collection, select and/or curate content into media collections for immediate, ongoing, or periodic posting, etc. The plurality of media content may have been received by server system 120 in a plurality of content messages from a plurality of users 106 (e.g., via client devices 110). For example, a user 106 may wish to create a new media collection associated with a personal event, such as a wedding reception, child's birthday party, family vacation, etc. The user 106 may use a client device 110 to establish an account, create new media collections (e.g., one for his wedding reception, one for his niece's birthday party, one for an upcoming family vacation, etc.), view existing media collections, to view content messages (e.g., from friends and family) associated with media collections, and to select and/or curate content messages to be included in one or more media collections.

Figure 7A:
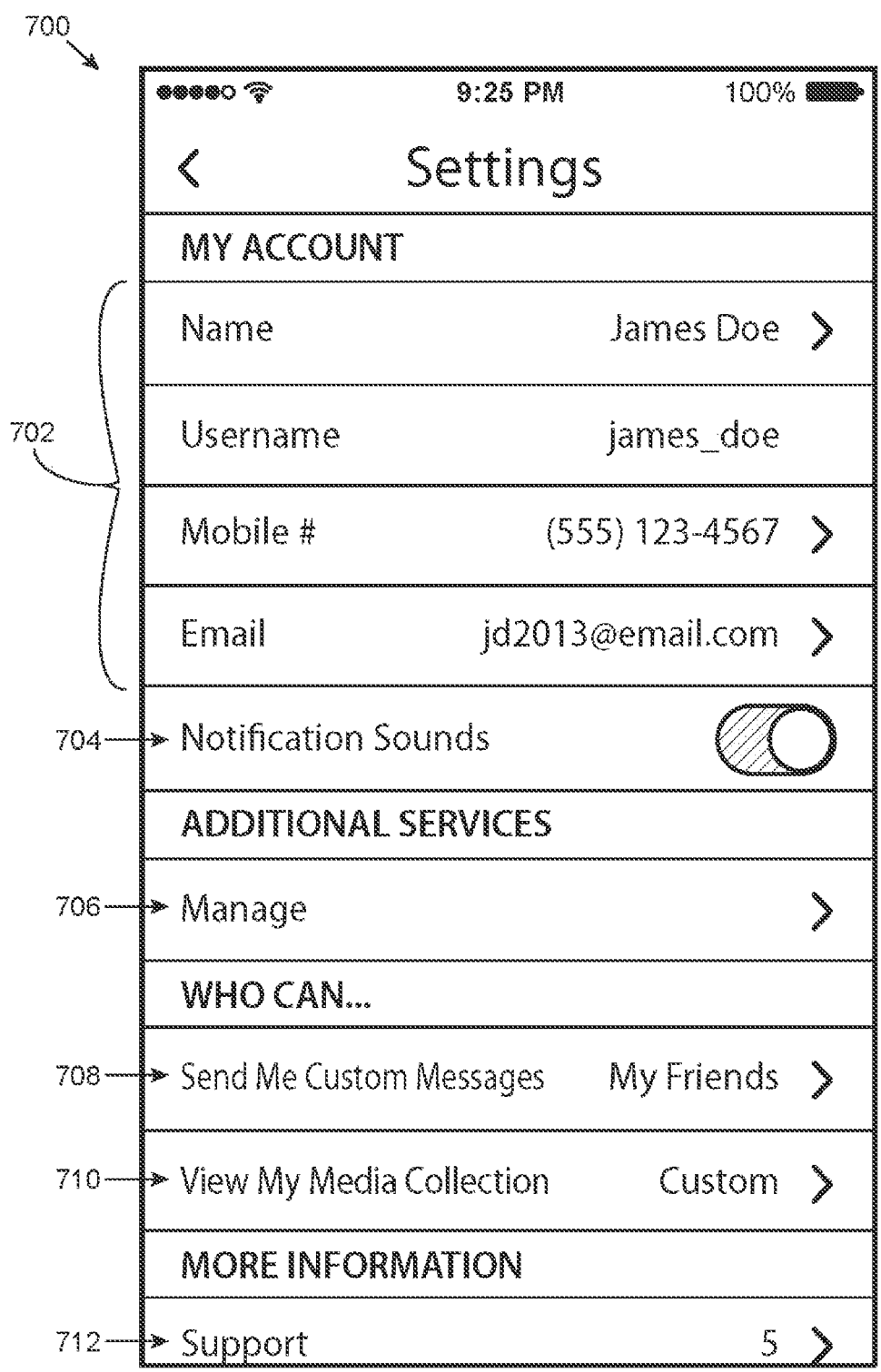
FIG. 7A is an example interface for account settings, according to some example embodiments.

A user 106 may first provide identifying information to establish an account to create new media collections, view existing media collections, to view content messages associated with media collections, and to select and/or curate content messages to be included in one or more media collections. For example, the client device 110 may cause an interface to be displayed on the client device 110, such as the interface 700 shown in FIG. 7A. Some examples of identifying information 702 may include the user 106's name, a username, a mobile phone number, email. Other identifying information 702 may include a home address, a work address, an alternate email address, an alternate phone number, etc. In some example embodiments, the interface 700 may also allow the user 106 to set notification sounds 704 on or off, manage additional services 706, specify who can send the user 106 content messages 708, view his own one or more media collections 710, and get help or support 712.

The user 106 may then submit the identifying information 702 (and any other information) to establish his account. The client device 110 may receive the identifying information 702 from the user 106 and send the identifying information 702 to the server system 120 to establish an account. The server system 120 may receive the identifying information 702 and authenticate the identifying information 702 (e.g., confirm that there are no existing accounts with the same information, make sure the information is legitimate, etc.). Once the server system 120 has confirmed that the account may be established, the server system 120 may create a new account and store the identifying information 702 associated with the account in one or more databases 126. The server system 120 may send a notification to the client device 110 that the account has been established. The client device 110 may display a message to the user 106 that the account was established.

Figure 7B:
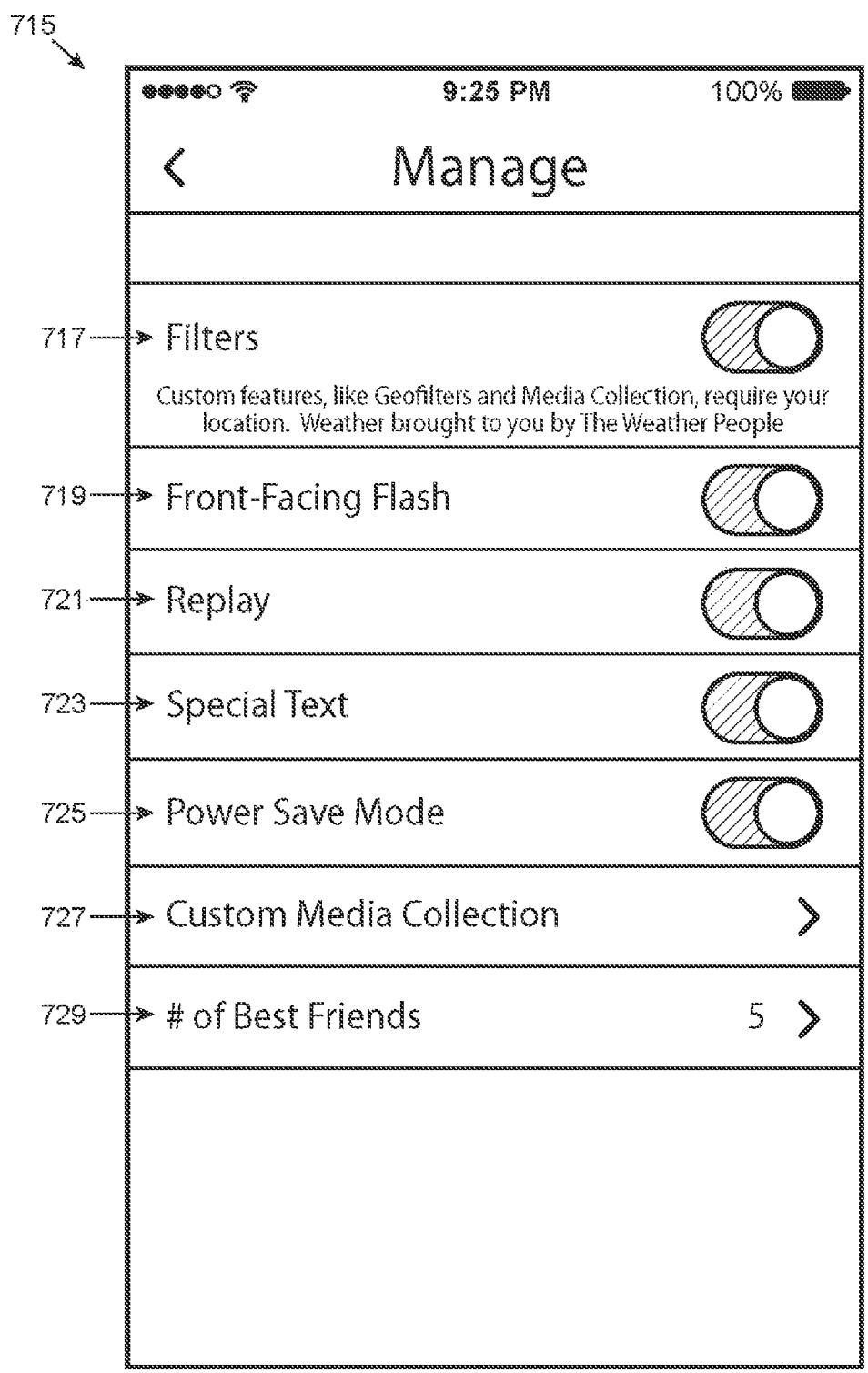
FIG. 7B is an example interface for managing an account, according to some example embodiments.

The application 114 on the client device 110 may provide a mechanism for the user 106 to manage various aspects of his account. For example, the client device 110 may display an interface 715 as shown in FIG. 7B. The user 106 may be able to manage filters 717 (e.g., media overlays), manage camera settings for capturing images such as front-facing flash 719, and other features, such as replay 721, special text 723, power save mode 725, number of best friends 729, etc.

The interface 715 may further allow the user 106 to create a new personal media collection using a menu item 727. The user 106 may select an option to create a new personal media collection (e.g., press or swipe menu item 727). The client device 110 may detect that the user 106 has selected to create a new personal media collection and request or allow a user 106 to enter various parameters associated with the media collection.

Figure 7C:
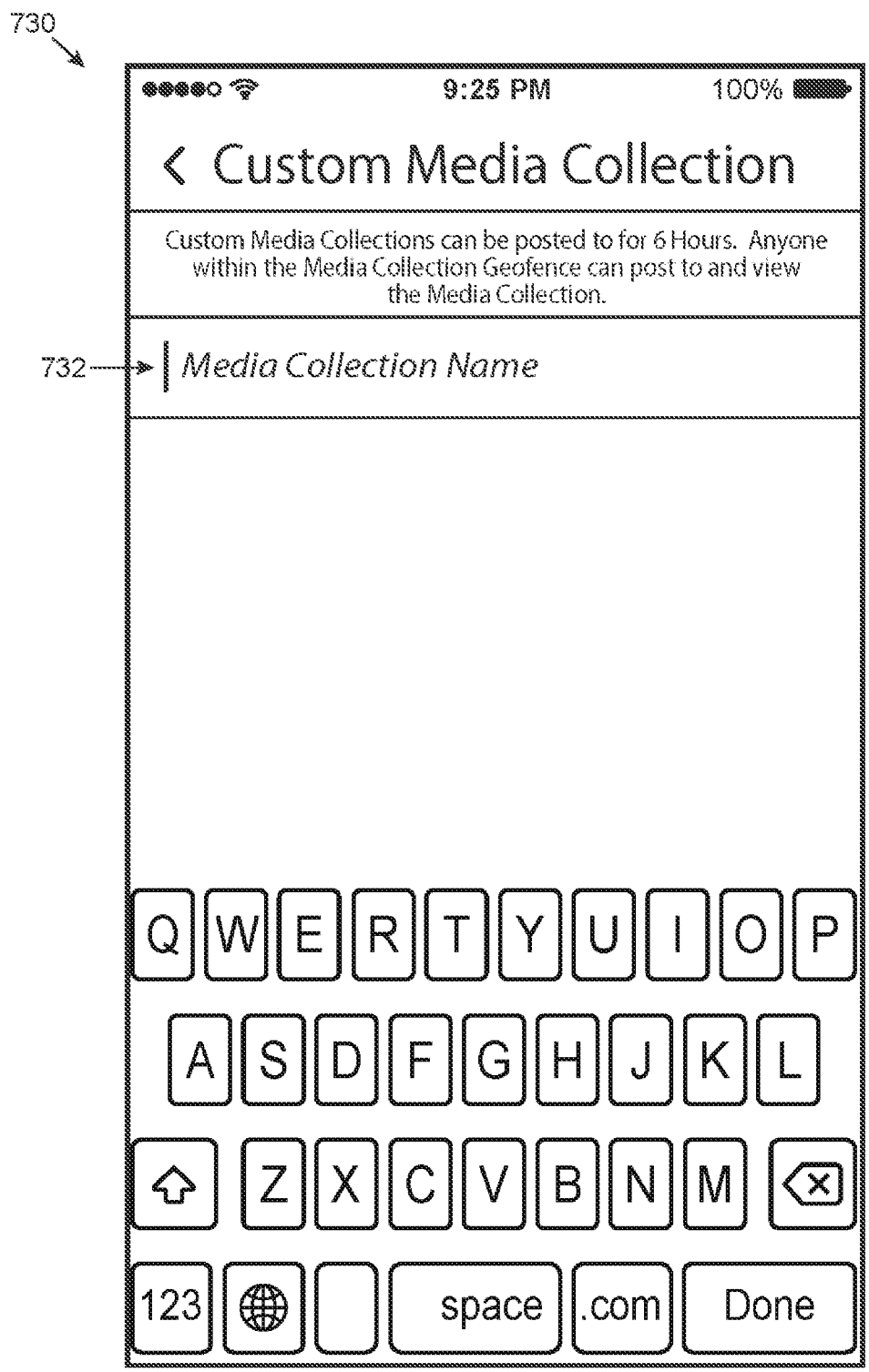
FIG. 7C-7H are example interfaces for creating a new media collection, according to some example embodiments.

One parameter may be a name for the personal media collection. For example, the client device 110 may display an interface such as interface 730, as shown in FIG. 7C, to request a name 732 for the media collection.

Figure 7D:
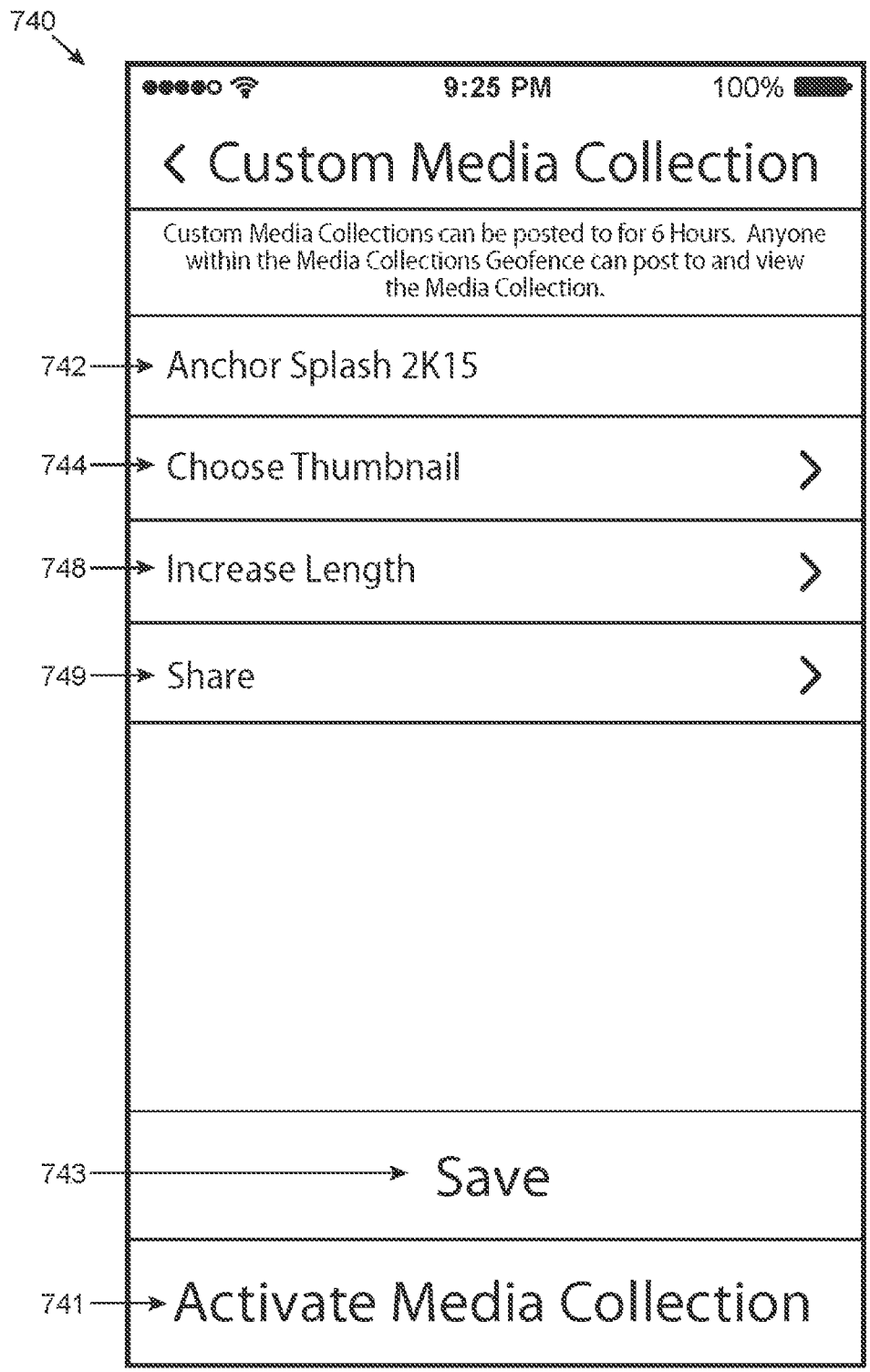

The user 106 may be able to enter additional parameters for the media collection, as shown in FIG. 7D. For example, the client device 110 may display an interface such as interface 740 to request additional parameters from the user 106 and allow the user 106 to enter the additional information 742 associated with the example media collection titled "Anchor Splash 2K15." An additional parameter may include choosing a thumbnail 744 to associate with the media collection (e.g., a custom thumbnail created by the user 106, or a default composite of images in the media collection, etc.).

Figure 7E:
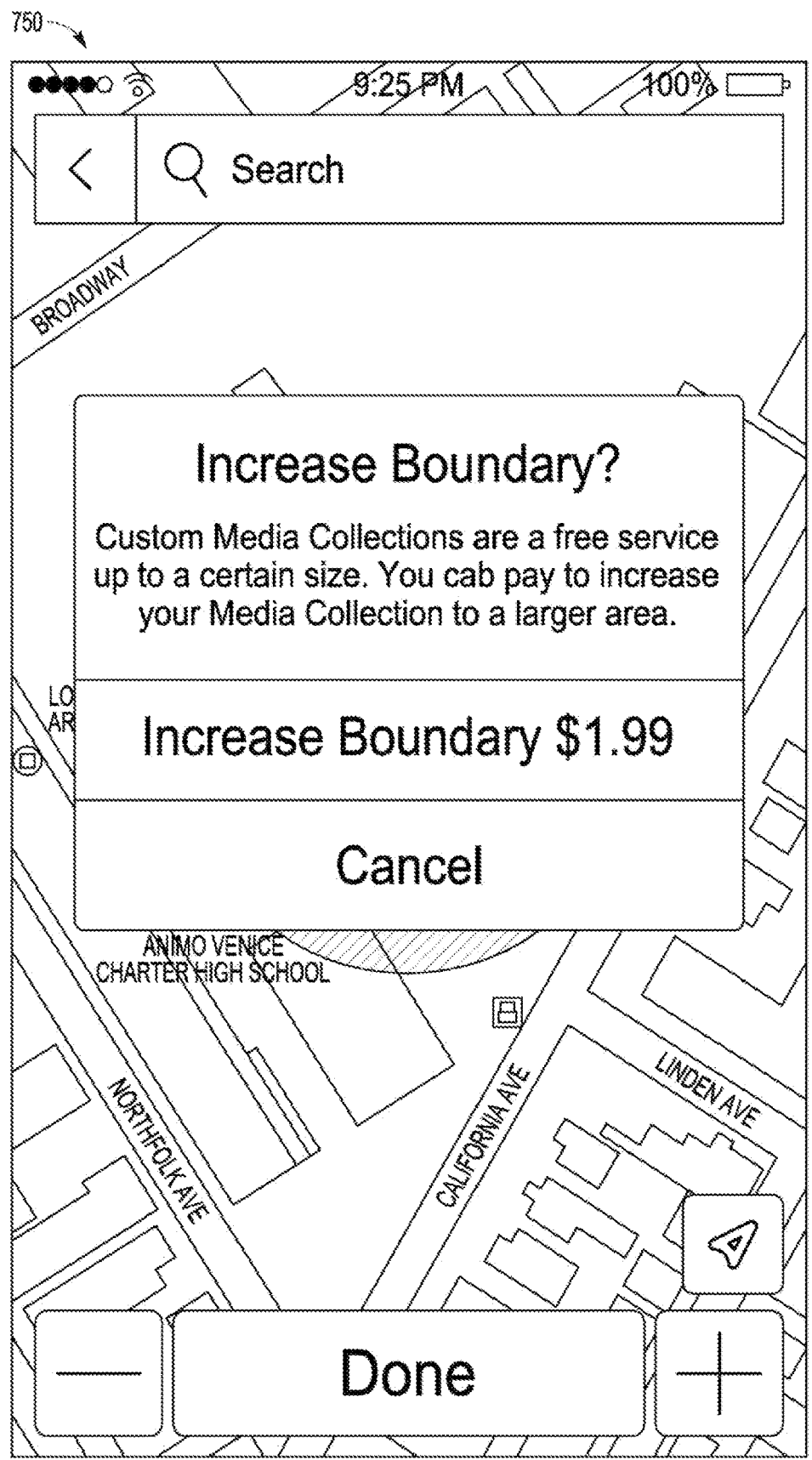
Figure 7F:
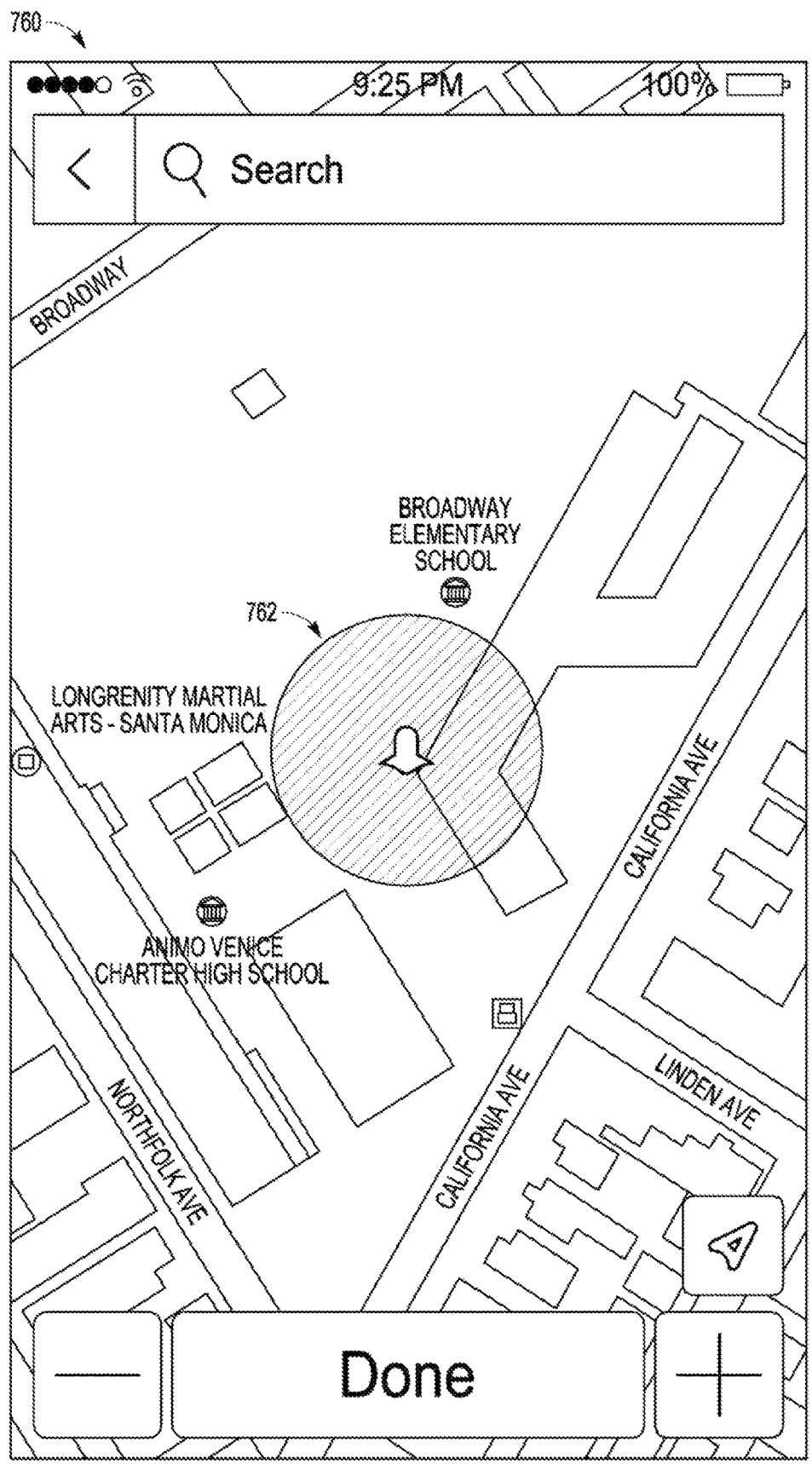
Figure 7G:
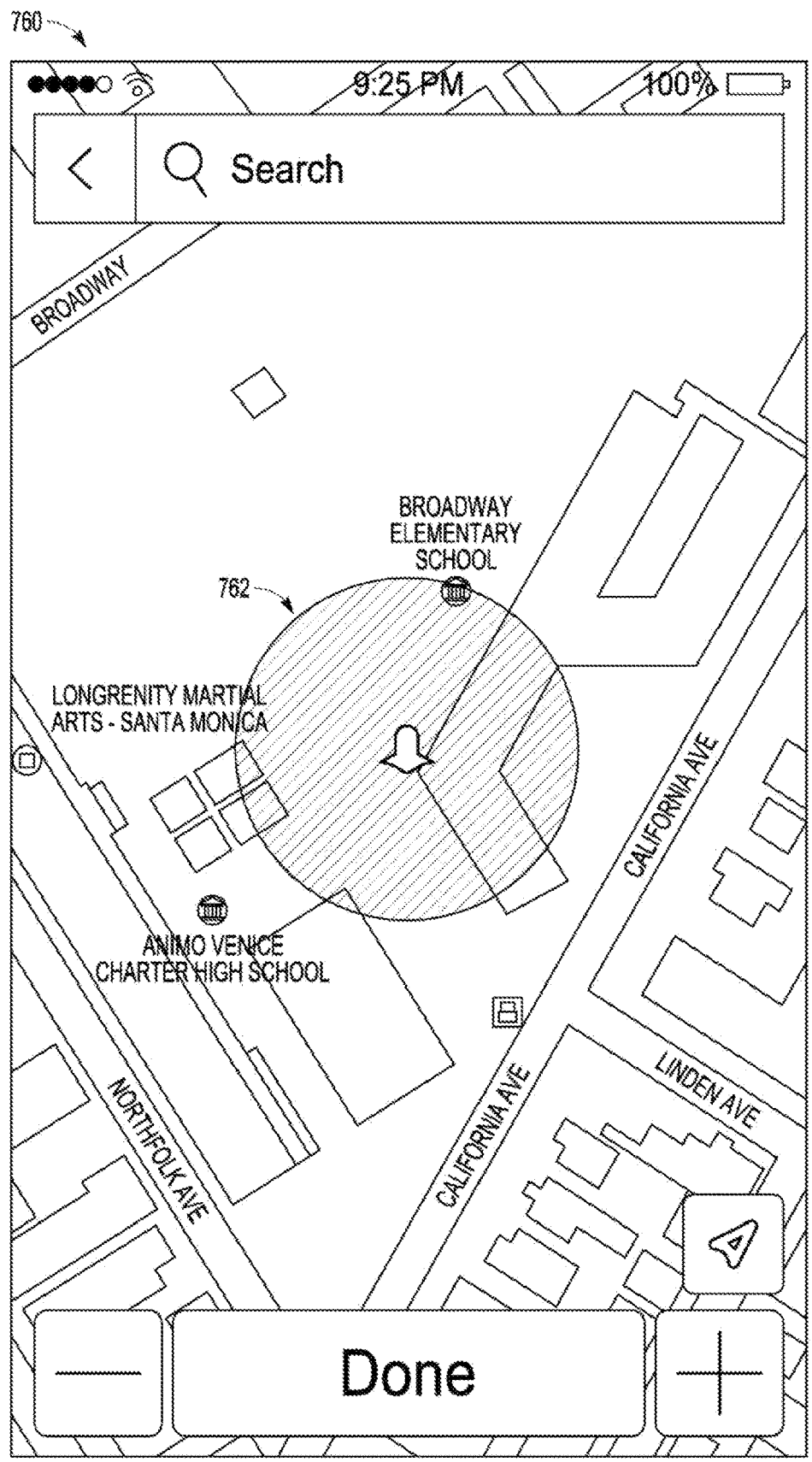
Figure 7H:
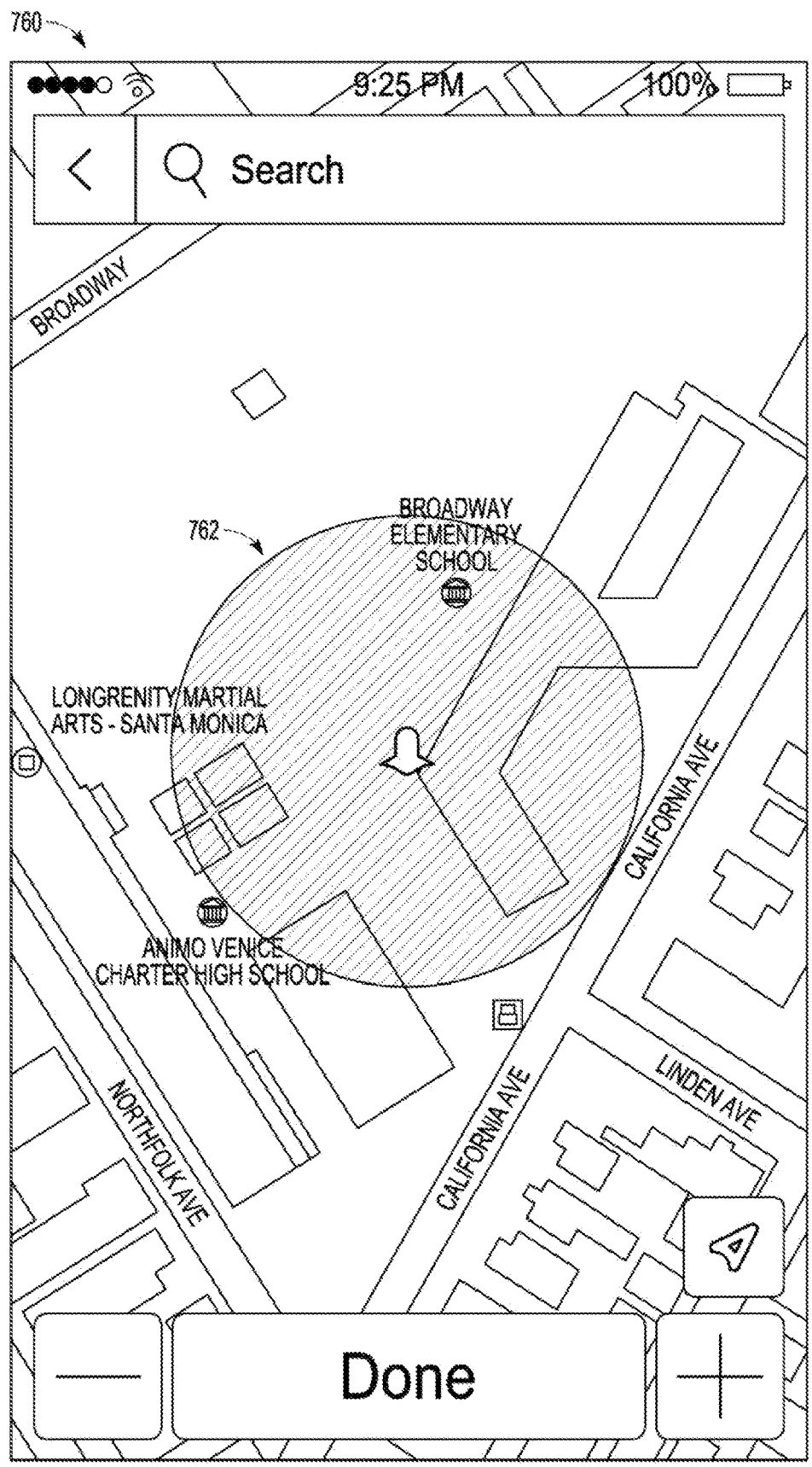

Another parameter may include setting a boundary or geofence to indicate the area in which users must be located to submit content messages for a media collection, or where users must be located to view a media collection. The application 114 may include a predetermined maximum geofence or boundary size. If the user 106 would like to increase the maximum boundary size, the user 106 may need to pay an additional fee to do so, as shown in interface 750 in FIG. 7E. In one example embodiment, the user 106 may set the geofence and expand or decrease the size of the geofence radius via an interface such as the one shown in the interface 760 in FIGS. 7F, 7G, and 7H. For example, the user 106 may resize the area 762 from smaller (e.g., FIG. 7F) to larger (e.g., 7G, 7H) and vice versa.

Returning to FIG. 7D, another parameter may be the length of the life of the media collection (e.g., the duration of the event, 6 hours, 24 hours, 1 day, 1 week, etc.). There may be an option presented to the user 106 to increase the length 748 of the life of the media collection from a predetermined amount of time (e.g., 6 hours, duration of the event, etc.). In one example embodiment, the user 106 may need to pay an additional fee if he wishes to increase the length of the story to a length longer than the predetermined amount of time.

The user 106 may also be able to specify one or more audience members for the media collection. An audience member may be a user 106 who has permission to view the media collection. The user 106 may also be able to specify a max audience size 749 for which to share the media collection. In one example embodiment, there may be a predetermined maximum size, and the user 106 may need to pay an additional fee to increase the audience size to greater than the predetermined maximum size. The audience may be either a user 106 located in a geofence associated with the media collection, or a user 106 in the public who follows the media collection. For example, the user 106 may specify whether the media collection is public or private. If the user 106 specifies that the media collection is public, then anyone may view the media collection. If the user 106 specifies that the media collection is private, then the audience is limited to a group or to users 106 within a specific geofence.

The user 106 may also be able to specify one or more contributors. A contributor may be a user 106 who has permission to post or submit content items or content messages to be included in the media collection. In one example embodiment, a contributor may need to be within the geofence associated with the media collection to post or submit content items or content messages to be included in the media collection. For example, a user 106 may only be given an option to send content messages to be included in the media collection if the user 106 is within the geofence for the media collection.

Once the user 106 enters the parameters of the media collection, he may submit the information to activate the media collection (e.g., via "Activate Media Collection" button 741) or may save the information (e.g., via "Save" button 743).

Figure 8A:
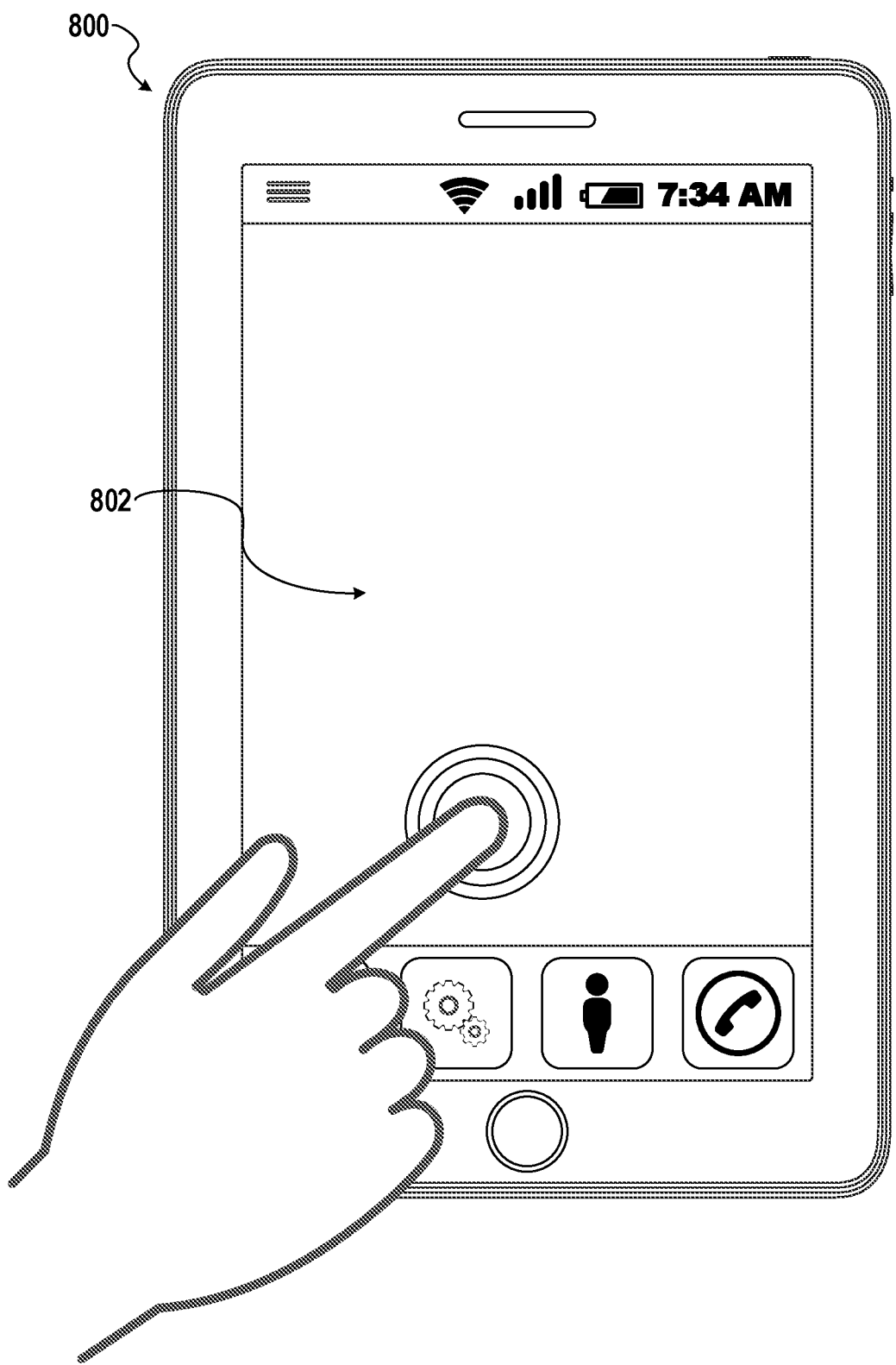
FIG. 8A is an illustration of a device with a display area for presenting content collections and advertising data with interaction elements in accordance with various embodiments.

FIG. 8A illustrates an example mobile device 800 executing a mobile operating system (e.g., IOS™, ANDROID™, WINDOWS® Phone, or other mobile operating systems), consistent with some embodiments. Aspects of presentation of advertising data along with interaction elements on mobile device 800 are discussed below in more detail with respect to FIGS. 8B-E. Mobile device 800 may implement software architecture described herein in certain embodiments. In one embodiment, the mobile device 800 includes a touchscreen operable to receive tactile data from a user, or other inputs such as motion sensors, cameras, etcetera. These inputs may be used to provide commands to control and manipulate interaction elements in accordance with embodiments described herein. The mobile device 800 of FIG. 8A may present content elements of a content collection in a display area 802. The content elements may be presented in order, with each element of a collection presented serially over time. Between certain content elements or at the end of the last content element of a collection, an advertising element may be presented. The advertising element may include interaction elements that are controllable or responsive to user inputs. In such systems, advertising presentation data may be presented in the display area 802 along with interaction elements as part of a streamed display of content collections with advertising described herein. The user may physically touch the mobile device 800, and in response to the touch, the mobile device 800 may determine tactile data such as touch location, touch force, or gesture motion. Updates to the interaction element presented in display area 802 may occur in response to the input, or the input may be processed as a command to skip the advertising element. In various example embodiments, the mobile device 800 displays a home screen operable to launch applications or otherwise manage various aspects of the mobile device 800. In some example embodiments, the home screen provides status information such as battery life, connectivity, or other hardware statuses. The user can activate user interface elements by touching an area occupied by a respective user interface element. In this manner, the user interacts with the applications of the mobile device 800. For example, touching the area occupied by a particular icon included in the home screen causes launching of an application corresponding to the particular icon.

In certain embodiments, content may be presented within the touchscreen of mobile device 800 operating as a client device 110 or operator device 130, and a touch input may be used to initiate a communication to a server system as part of a chat system involving embedded video and/or audio elements.

Many varieties of applications (also referred to as "apps") can be executing on the mobile device 800, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 800 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 800 includes a social messaging app such as SNAPCHAT® that, consistent with some embodiments, allows users to send public content to a server system (e.g., server system 120), and to receive messages from the server system such as SNAPCHAT and/or video content messages for display as part of chat communications described herein.

Further, as described herein, such an application may communicate with a server system 120 to receive content as part of a content collection, and advertising data to be presented between certain pieces of content. In various embodiments, interaction elements may be merged with advertising data in order to increase user involvement and engagement with the advertising data. The advertising presentation data set for output and display within display area 802 of device 800 may thus be merged and presented with interaction elements such as those described below.

Figure 8B:
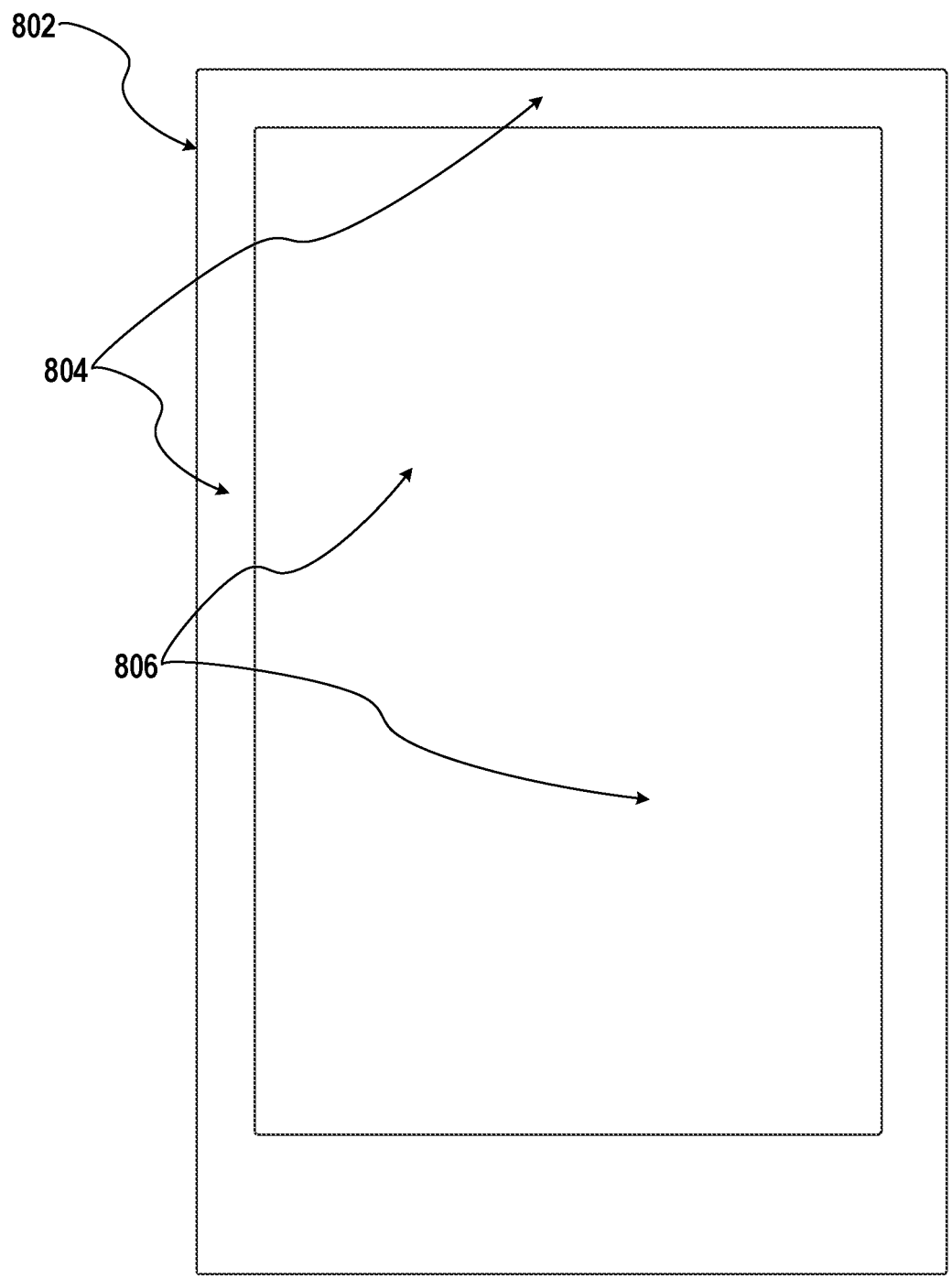
FIG. 8B illustrates aspects of interaction elements in accordance with some embodiments.

FIG. 8B then illustrates a simple embodiment whereby advertising data and interaction elements are displayed together. As part of merging advertising data and interaction elements, display area 802 is divided into an interaction area 804 and an advertising display area 806. Video and images for the advertising data are displayed in a limited advertising display area 806, while a separate interaction area 804 is used for interaction elements. Such an embodiment allows a simple inclusion of interaction elements with advertising data as part of an advertising element inserted between content elements. Additionally, such a separation allows interaction elements that move within the interaction area 804 to avoid obstructing key information from the advertising data. Touch inputs, motion sensor inputs, or any other such device inputs may move an interaction element (e.g., an image of a ball or any other such image or animated element that functions as an interactive responsive element) across the interaction area 804. Embodiments where the advertising and interaction areas are separate allow simple merging of these elements. While FIG. 8B shows a border interaction area 804 and a central advertising display area 806, various embodiments may divide display area 802 in any fashion. As described above, processing steps at a server system (e.g., the server system 120) or on a client device (e.g., the client device 110) may be used to merge the interaction elements and advertising data. In systems such as FIG. 8B, these processing steps may reconfigure the advertising data for display on a portion of the available display area, and prepare the interaction elements within the remaining portion of the display.

In other embodiments, instead of keeping the interaction elements and advertising data separate when the advertising element is displayed, the interaction elements may be overlaid on top of the advertising data, or merged into the advertising data in different ways. In some embodiments, the advertising data may identify areas of a display that the interaction elements are allowed to obstruct. In other embodiments, processing of the advertising data may automatically identify such areas by identifying text or key elements of an image (e.g., product images, talking faces, etc.), and block the interaction elements from obscuring those portions of the advertising data. In some embodiments, boundaries of such areas may be used as part of the user interaction with the interaction elements, where navigating the interaction elements around obstructed areas is part of the expected user engagement with the advertising elements. In still further embodiments, some portions of the advertising data are configured to respond to the interaction elements, such that additional information or a responsive change in the advertising data is triggered based on an interaction element being present or reaching a certain portion of the advertising data. For example, the advertising data may have two embedded video areas, with each video area playing associated video and audio when an interaction element is present in an associated triggering space. In another embodiment, an animation may be hidden within advertising data, and not triggered unless an interaction element moves to a trigger area within the display area 802.

Figure 8C:
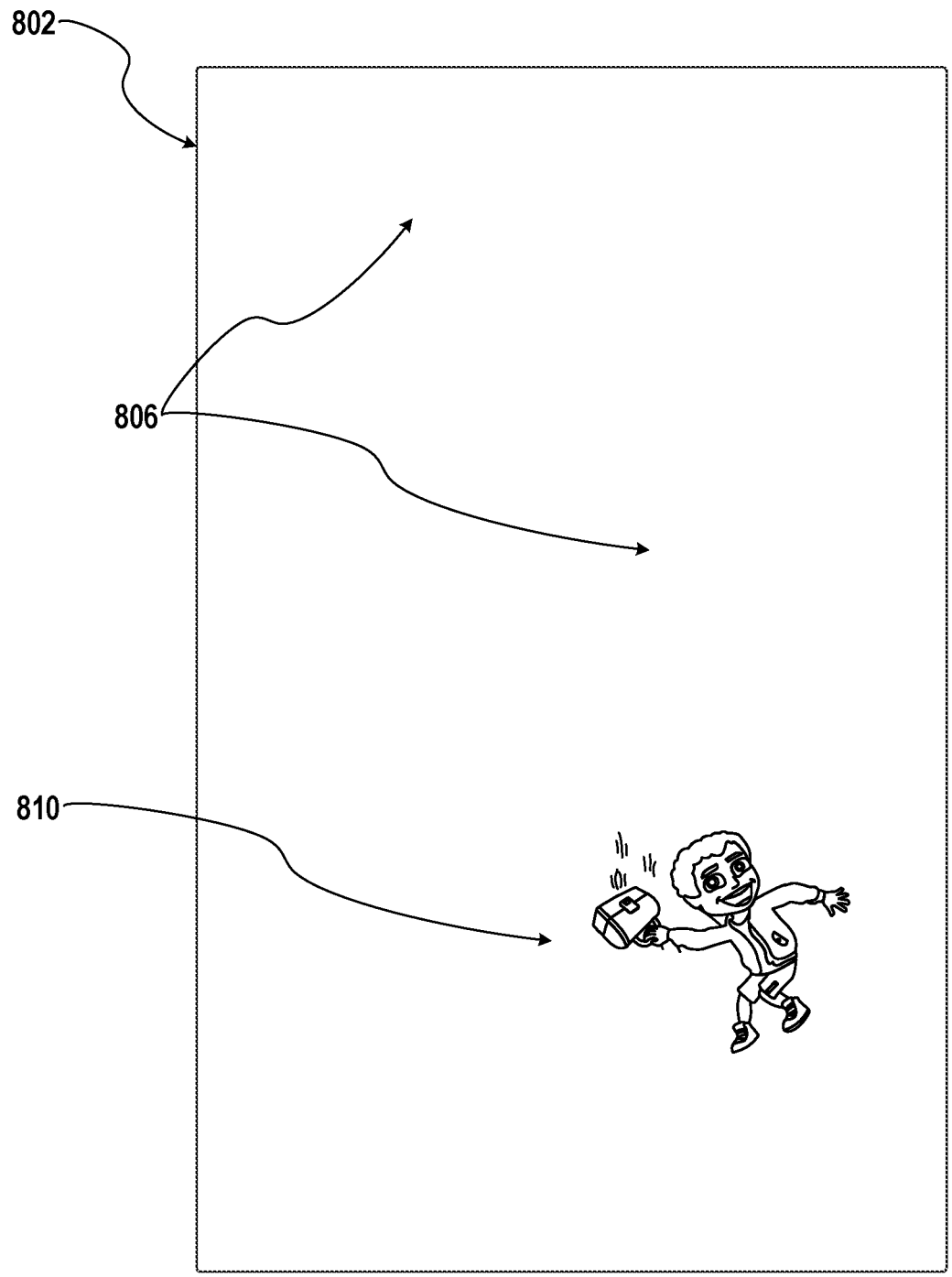
FIG. 8C illustrates aspects of interaction elements in accordance with some embodiments.

Further still, interaction elements may be customized in some embodiments using avatar animations or images customized by a user or associated with a user account. Advertising data and a placeholder interaction element and interaction element functionality may be identified by a server system, with the actual image provided by a custom avatar emoji, animation, or drawing present on a client device. In some embodiments, such images are associated with a user account, or available to an application operating on the client device via a second application that provides custom emojis or images. FIG. 8C illustrates a custom avatar image 810 that may be presented as an interaction element along with advertising data presented in advertising display area 806, which in FIG. 8C is the entire display area 802. In such an embodiment, interaction functionality may be defined by the advertising data and/or interaction data provided by the server system, with processing at the client device to add the image 810 to the advertising element prior to display on the client device. During presentation of advertising data, image 810 will respond to inputs at the client device to move according to the interaction functionality defined by the server system and implemented by the client device.

In other embodiments, advertising data is received at the client device, and the server system simply includes an interaction element flagging the advertising data as compatible with additional interaction functionality already present on the client device. The client device can then process any triggers associated with the advertising data or limits on movement of interaction elements, and present the advertising data with the interaction elements on the client device.

Figure 8D:
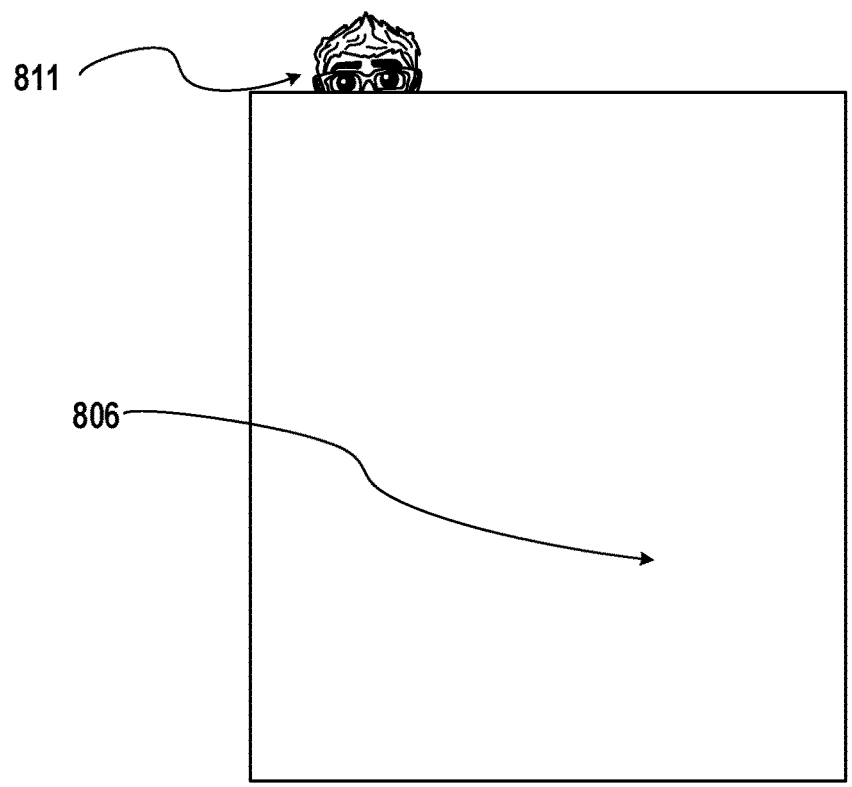
FIG. 8D illustrates aspects of interaction elements in accordance with some embodiments.

In various embodiments, different interaction elements may be present on the display at the same time in addition to advertising data. Some interaction elements may be directed towards a game (e.g., a maze, a target motion, a targeted interaction, etc., for the purpose of scoring points) or an interactive animation with no point scores or game goals. Other interaction elements may provide different information and interaction options. In FIG. 8D, advertising data may be presented in advertising display area 806 while avatar image 811 is controllable via user inputs. The image 811 may also provide additional information about previous user interactions with the advertising data or a particular set of interaction elements. This may include information about previous viewings of advertising data, previous game scores, cumulative game scores across multiple advertising presentations with different advertising data, cumulative games scores across multiple presentations of the same advertising data, scores across multiple games with different interactive elements, or any such information. Further, such information may also be provided for other users in a communication system.

Figure 8E:
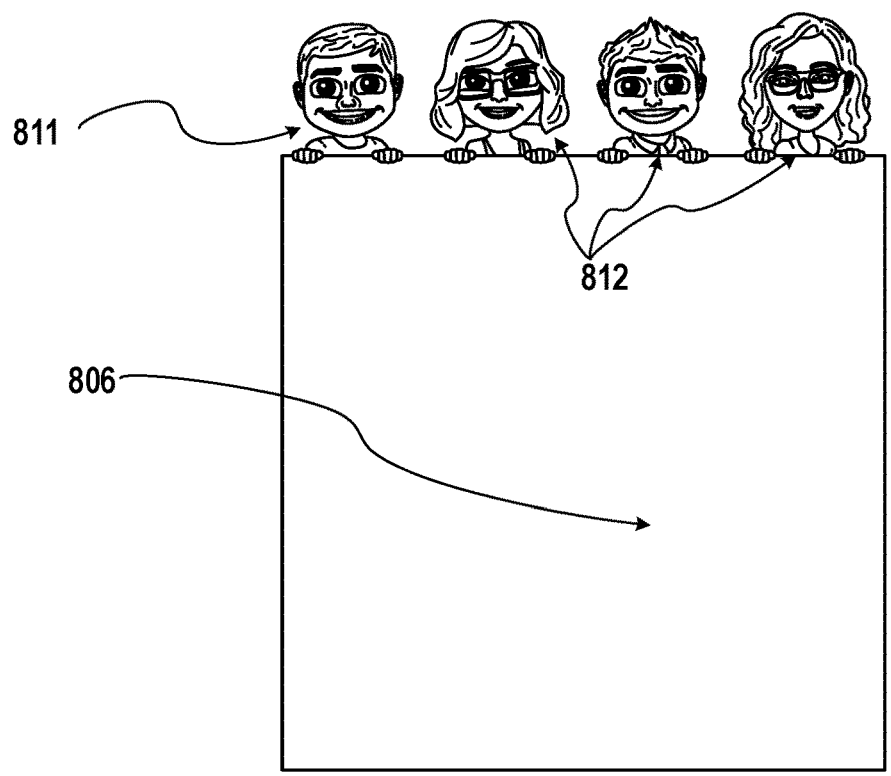
FIG. 8E illustrates aspects of interaction elements in accordance with some embodiments.

In FIG. 8E, avatar images 812 are displayed representing other users in addition to the avatar image 811 for the user associated with the client device presenting advertising data in advertising display area 806. In such an embodiment, users opting to share data may provide any of the information described above to other users. This may include information on how often each user has viewed various advertising data, or how different users have interacted with different interaction elements (e.g., as part of games, etc.) Some such embodiments may enable communications between users. When one user views advertising data, an interaction element may allow the user to provide text. Depending on users settings, other users in that user's social graph may then see the provided text when the other users view the advertising data.

In some embodiments, interaction elements enable user input to generate recordings of interactions that may then be shared with other users. For example, when a first user sees advertisement data for the first time, only the user's avatar image (e.g., image 811) may be present. When a different user associated with the first user views the image, both users' avatars may be present based on interaction elements provided by the server system. When the second user views the advertising data, inputs provided by the second user may generate interactions between the two avatars. Subsequent viewings of advertising data (e.g., either the same advertising data or different advertising data in different embodiments) allow the first user to see the interactions of the second user with the two avatar images. In various embodiments, any combination of interactions and presentations of recorded interactions may be provided to different users based on system configurations and user settings.

Such operations generate engagement with advertising data by allowing users to interact with the advertising data using interaction elements to increase engagement. In some embodiments, the client device 110 and/or server system 120 may generate a record of user interactions with advertising data. This may be as simple as recording a number of inputs associated with advertising data, or as complex as recording exact input details along with the resulting images. In some embodiments, other details, such as whether an ad skip command is received, data indicating that a user was viewing advertising data, or any other such device operation during presentation of advertising data, may be recorded by a device. Such data may be used to generate one or more engagement scores. Such scores may be generated both for individual advertising elements as well as for a device over interactions with multiple advertising elements. Such scores may be used to modify how often advertising elements are presented on a device in some embodiments, as described below.

In various embodiments, interaction elements or sets of interaction elements may be generated in different ways. In some embodiments, fixed sets of images or graphics are used for interaction elements. In some embodiments, user inputs or user photographs may be used to generate custom avatars for use as interaction elements for each user account or each client device, as described above. In some embodiments, additional information or user inputs, such as communication data regarding communications between one or more users, is used in determining a relationship between the users based on the communication data. Avatar characteristics for multiple users presented in an interaction element may be generated and used in advertising elements based on such identified relationships.

For customized avatars based on relationships between multiple users, a variety of communication data from a variety of sources may be inputs. Such communication data may be retrieved from another computing device (e.g., over a network). Communication data may include a history of electronic communications (such as emails, text messages, and the like) between a plurality of users. For example, consider two users, a first user and a second user, who exchange a series of text messages with each other using their respective mobile computing devices. The computing device of the first user may be adapted to store the messages in its memory for later retrieval, or to request the messages (or information regarding them) from another source.

The communication data may include metadata associated with one or more communications, such as the size of the communication, the date/time it was sent, one or more languages used in the communication, identifiers for the sender and/or recipient(s), information regarding the computing devices (e.g., the mobile devices of the sender or recipient or a messaging server) involved in transmitting or receiving the communication, and other information. In the case of identification information, any such identifier may be used, such as the user's full name or a username associated with the user. The user identifier may also be an identifier associated with the user's computing device, such as a Unique Device Identifier (UDID) or Identifier for Advertising (IDFA). The communication data may also include text, images, video, and other content within a communication. For example, the communication data may include terms used by users within one or more communications to address each other, such as "hi mom," "hey buddy," "how's my favorite nephew," and the like. Such terms (and other communication data) may be used to help identify a relationship between users based on their communications with each other as discussed below.

The system may request authorization from a user to analyze communication data associated with the user's communications. The authorization request may be presented to the user via the user's computing device and may allow the user to select the types of communication data the system may analyze as well as allow the user to entirely disable the system from analyzing the user's communication data altogether. In cases where the user grants the system access to analyze the user's communication data, the system can analyze the communication data to automatically determine a relationship between the user and other users with whom the user communicates.

Embodiments of the present disclosure can identify any number of different relationships between any number of users. Examples of such relationships may include family relationships, friendships, or romantic relationships, as well as other kinds of relationships. Embodiments of the disclosure may also identify other aspects of relationships between users, such as whether the users are work colleagues, classmates, roommates, and/or acquaintances. Analysis of communication data to identify relationships between users may also be supplemented with other information, such as data retrieved from social networking sites, as well as direct input from the user providing information on his/her relationships with various users.

Based on the relationship between different users, the system can generate characteristics for avatars that represent the different users and use such avatar characteristics to generate images containing the avatars of the users. As used herein, an "avatar" of a user is any visual representation of user. The avatar of a user may be based on images of the user in conjunction with the avatar characteristics identified from the user's relationships with other users. Alternatively or additionally, the user may select and customize characteristics of the user's avatar via the user's computing device. Such characteristics may include, for example, the user's bodily features (e.g., muscular, thin, etc.), facial features, clothing and accessories, text displayed in conjunction with the avatar, and images displayed in conjunction with the avatar.

Embodiments of the present disclosure may generate images containing any number of avatars. For example, an image containing a single avatar may be generated in some cases, while an image containing multiple user avatars may be generated in other cases. FIG. 8E illustrate exemplary images that include a first avatar representing a first user and a second avatar representing a second user according to various aspects of the disclosure. Such images may be displayed on the display screen of one or more computing devices as part of interaction data in an advertising element. In such embodiments, a user may control one avatar in such a way as to interact with another avatar. The mechanics of the other avatar may be managed by the local processors, or by networked communications from a server system or another client device. Embodiments of the present disclosure may include any number of user avatars in a variety of forms. For example, an avatar of a first user may be generated with the avatar of a second user on the shirt worn by the first user's avatar.

In some embodiments, the generation of images containing avatars may be performed in conjunction with displaying the avatars within a video game. In some cases, the images may be displayed in a single-person game (e.g., played alone by a first user on the first user's computing device) or in a multi-player game (e.g., the game is accessed by the computing device of a first user and the computing device of a second user) played over a network or other connection as interaction elements presented as part of an advertising element. During the game, various events may occur and the avatars of one or more users may be modified as a result. For example, an avatar who experiences an injury may be depicted with a black eye, while an avatar who finds an item in the game (e.g., a sword) can be modified to show the avatar carrying the item. In this manner, embodiments of the disclosure allow users to have their own customized avatars (which may be based on their own likenesses) appear in video games as well as in other contexts, such as text messages or other electronic communications. For certain embodiments, avatars associated with advertising interaction elements are available to a user only during selected advertising elements associated with interaction elements that support the particular avatar. Changes in the user's avatar associated with these interaction elements may be persistent over time as different compatible advertising elements are presented to a user. Similarly, changes to another user's avatar within compatible interaction elements may be shown to another user during the other user's viewing of compatible interaction elements.

Generation of the images containing user avatars may be based on an event. The event may affect one user (such as the user's birthday) or be common to multiple users. The interaction elements may thus reflect customization based on such triggers (e.g., a party hat or party items held by the avatar or around the avatar as part of the interaction element).

Generation of the images containing user avatars may be based on the locations of different users. For example, embodiments of the present disclosure may retrieve location information from the computing devices of two different users. In embodiments where a client computing device is performing the image generation, location information for the device can be retrieved from the device's global positioning system and location information for the device of another can be requested over a network.

The avatars of different users in different locations can be generated to reflect their respective locations. For example, the avatar of a first user whose mobile computing device indicates is in the tropics could be depicted standing in a bathing suit on a beach, while the avatar of a second user whose mobile device indicates is in an area with snow could be depicted wearing a jacket and shivering. Accordingly, the location information from a device associated with a user can be combined with information regarding the location and/or an event occurring at the location to generate the avatar and/or image. Such location-based information may include weather information, time of day, local customs (such as language and/or dress), and other information.

In some cases, the system can identify that two or more users are in a common location. In this context, a "common location" may be identified as being within any predetermined boundary, such as within the same building, the same city, the same two-block radius, the same state, etc. In such cases, the image can be generated to depict the avatars of multiple users based on the common location. As described above, the image containing multiple avatars may be generated based on information regarding the location as well as identifying an event taking place at the common location. Such events may include, for example, a sporting event, a business meeting, an educational event, a pre-arranged meeting between the user and another person (e.g., such as a lunch meeting), and other events.

In some embodiments, details of an event (e.g., competing scores associated with a particular set of interaction elements) can be identified by the system based on information from a combination of different sources, such as location information from each user's mobile computing device and information about the points collected as part of system operation. Additionally, related information from a social media website or a history of electronic communications between the first and second user can be utilized to automatically generate an image including the user's avatar and/or the avatars of other users. Such images may be presented as part of interaction elements or within an advertising element in different embodiments. Such operations may particularly be based on opt-in selections by all users to enable automated images as part of interaction elements.

In some embodiments, the system may modify various features of an avatar, as well as features of an image containing an avatar, based on location information and/or event information. For example, a similar image could be generated for other days of the week where the setting or background of the image displaying the name of the day of the week (e.g., Wednesday vs. Tuesday) can be modified. Likewise, either avatar can be modified based on various information. For example, the system may identify an event taking place at a client device location (e.g., a particular restaurant or festival) and generate an image of the first user standing next to the second user, where details associated with the location are included in the image. As above, the image can be generated based on content of communications between the users.

The system can modify avatars and images based on identified events and locations in any suitable manner. For example, avatars of users attending the same sporting event could be depicted in an image wearing the jersey of one of the teams playing at the event. Users attending a paintball event together could result in an image being generated showing avatars of the users holding paintguns and covered in paint. Users attending a mud obstacle race could result in an image being generated showing avatars of the users covered in mud. Furthermore, information from users' electronic communications between each other and/or social network posts can be used to identify an event attended by the users, and such information can be used to generate avatar attributes and images. Interaction elements associated with paintball (e.g. a paintball game on the client device) may be selected, with the interaction element avatars customized with the appropriate clothing.

In some embodiments, the system may generate a plurality of images containing one or more avatars and allow a user of the system to select which image(s) he/she wishes to include in an electronic communication. In some embodiments, the generation of such images may be based on the content of communications sent or received by the system, as well as on other communication data as discussed above. In one particular embodiment, a computing device operated by a first user receives an electronic communication from the computing device of a second user, where the communication contains an image that includes avatars representing the first and second users. In this example, the computing device of the first user is adapted to analyze the image in order to identify its content, then generate one or more response images and present the response image(s) to the first user (e.g., via the display screen of the user's computing device) for selection by the user. The selected image(s) are then included in an electronic communication that can be transmitted to the computing device of the second user.

As with other images described above, the response image may further be generated based on other information, such as the text content of communications between the first and second users, the history of communications between the users, and information from sources outside the communications, such as data gathered from social network sites. In this manner, the system can not only generate initial images that are pertinent and useful to users in communicating with others, but can also generate response images that are contextually congruent to the communications between different users.

Figure 9A:
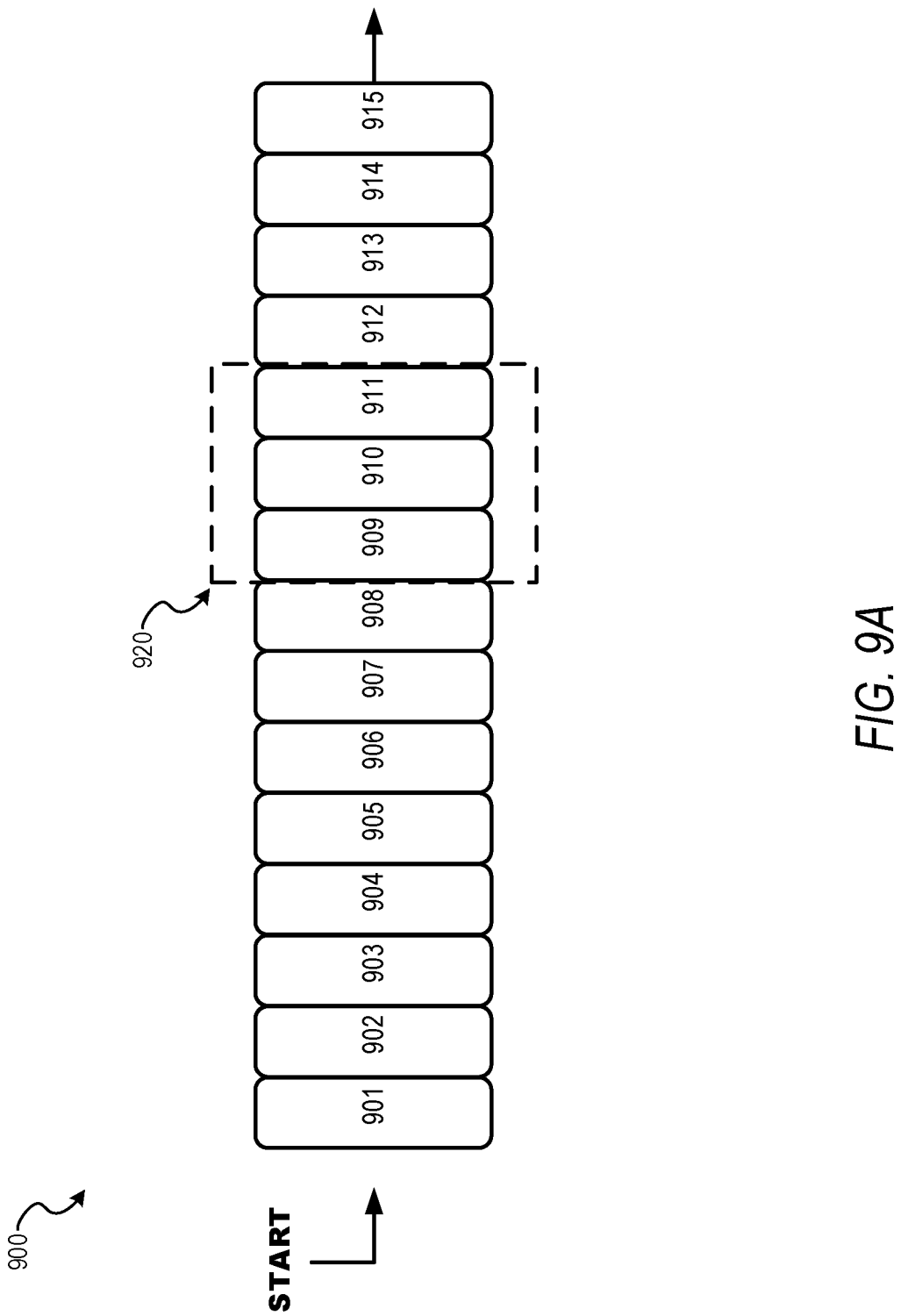
FIG. 9A illustrates a presentation order for content elements of a media collection in accordance with some example embodiments.
Figure 9B:
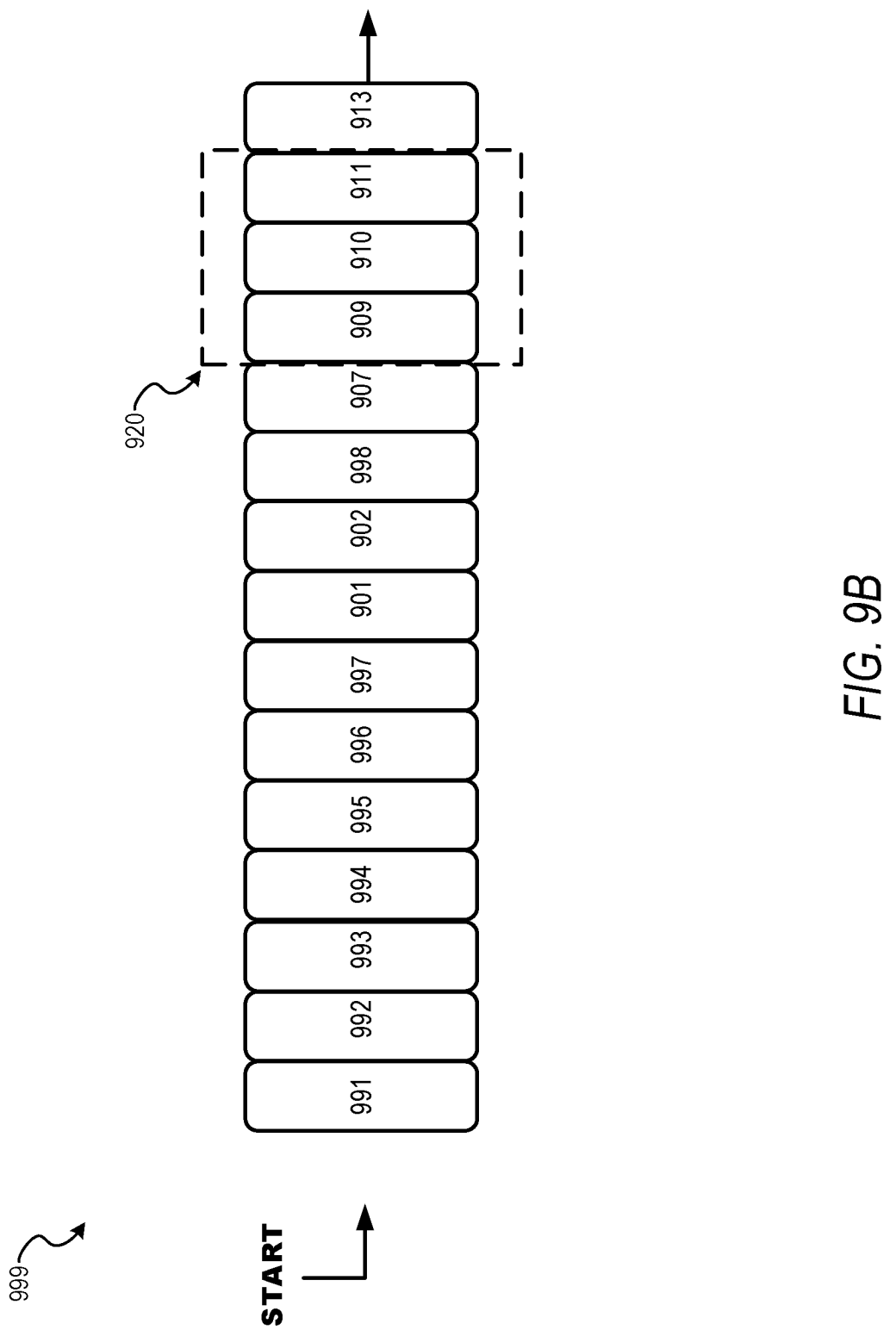
FIG. 9B illustrates a presentation order for content elements of a media collection in accordance with some example embodiments.

FIG. 9A illustrates a presentation order 900 for content elements 901-915 of a media collection in accordance with some example embodiments. FIG. 9B illustrates a second presentation order 999 for content elements of the same media collection presented in FIG. 9A in accordance with some example embodiments. In some embodiments, a first device requesting a media collection will receive the content in presentation order 900, and a second client device requesting the same media collection may receive the media collection with presentation order 999, which includes content elements included in the media collection after the media collection content is sent to the first device. In some embodiments, the first device may receive the same content, with new content elements streamed as they are received.

Figure 10A:
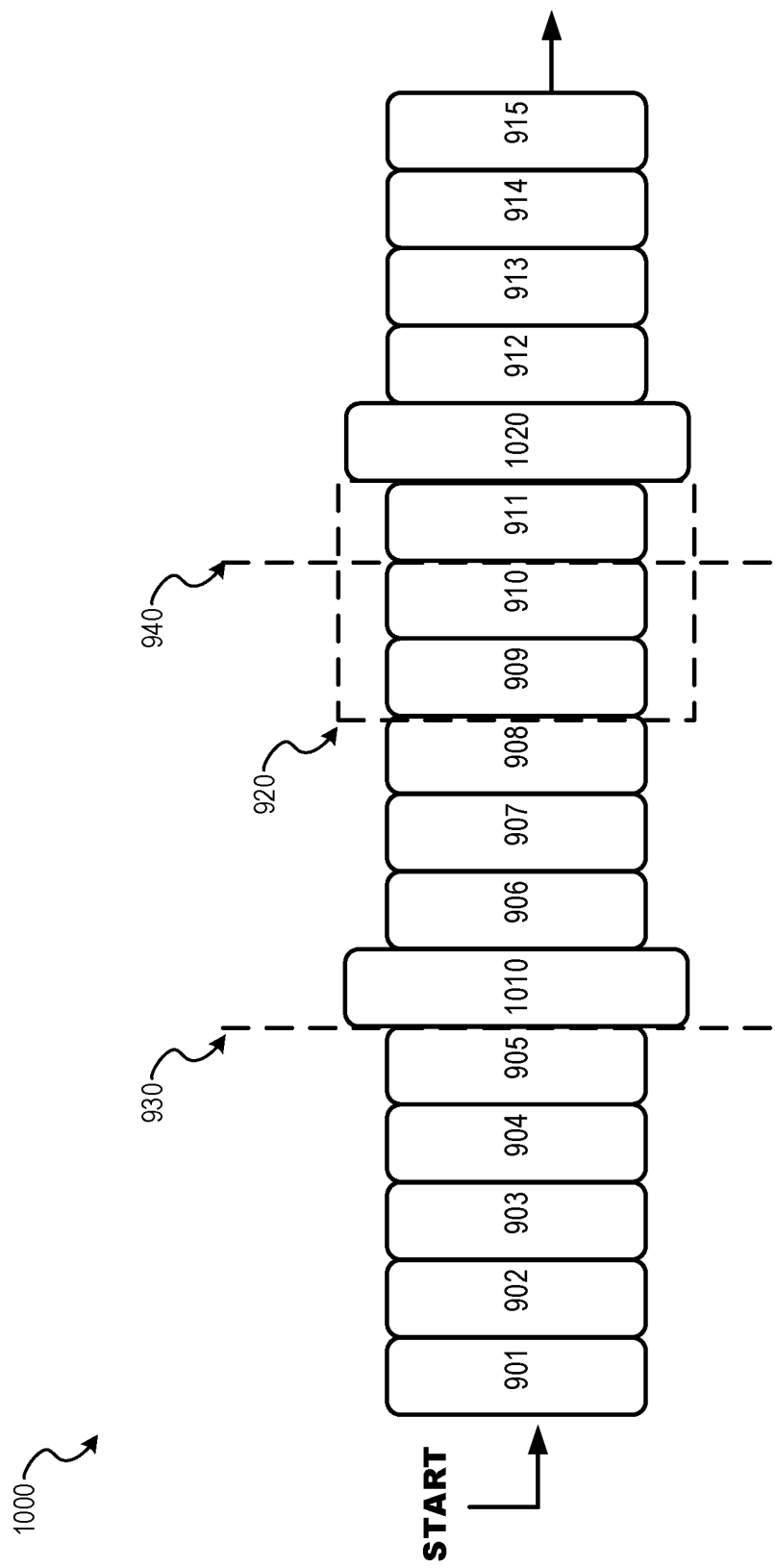
FIG. 10A illustrates an adjusted presentation order for content elements with advertising elements automatically inserted into the adjusted presentation order in accordance with some example embodiments.

FIG. 10A illustrates an adjusted presentation order 1000 for content elements 901-915 with advertising elements 1010 and 1020 automatically inserted into the adjusted presentation order 1000 in accordance with some example embodiments. As described above, client devices 110 may communicate content messages to a server system 120, and a content processing server 124 may sort these received messages to associate the messages and the content of the messages with media collections. In addition to simply identifying an association of content messages with media collections, as described above, various aspects of the content may be analyzed to determine a presentation order 900.

A presentation order determines the order in which content elements are displayed on a client device 110 when the media collection is selected from server system 120. In the example presentation order 900, content elements 901-915 are set by presentation order to be displayed in ascending order. In some embodiments, a user may select an interface option to navigate through the presentation order by skipping some or all display time for some presentation elements, but absent a user input, each content element of the media collection including content elements 901-915 displays for an associated display time before the next content element is automatically presented. In some embodiments, the presentation order 900 is merely based on time, with all content elements selected to be included in the media collection displayed in a time-based presentation order 900. In other embodiments, content scores or operator 108 curation are used to determine presentation order 900.

Over time, as new content messages are received, the presentation order 900 for the media collection of FIG. 9A may be updated to presentation order 999 of FIG. 9B for the same media collection with newly added content. Automatic updates or an alert-initiated curation update may be used to adjust presentation order 900 to presentation order 999, which includes new content elements 991-997, along with previously included content elements 901, 902, 909-911, and 913.

Both presentation order 900 and presentation order 999 include continuous presentation group 920, which includes content elements 909, 910, and 911. As discussed above, continuous presentation group 920 may be generated by a selection of an operator 108 using an operator device 130 to select content elements 909, 910, and 911 to prevent these content elements from being interrupted by an advertising element. As the position of continuous presentation group 920 shifts within the media collection, the impact on advertising element placement stays the same. In some embodiments, the composition of a particular continuous presentation group may change. For example, continuous presentation group 920 could have another content element added between or adjacent to any of content elements 909-911, or could have any content element removed. In the absence of an adjustment from the system to change the association of continuous presentation group 920 or to remove member elements of continuous presentation group 920 from the media collection, the elements of continuous presentation group 920 remain together and are not interrupted by automatic insertion of advertising elements.

FIG. 10A then illustrates an adjusted presentation order 1000 associated with the presentation order 900 of content elements 901-915 of FIG. 9A. In adjusted presentation order 1000, advertising elements are inserted into presentation order 900 periodically. In the example of FIG. 10A, every 5 content elements, an advertising element is inserted, so that advertising insertion point 930 and advertising insertion point 940 are set as positions for advertising element placement of advertising elements 1010 and 1020. Because advertising insertion point 940 occurs within continuous presentation group 920, the placement of advertising element 1020 is adjusted to avoid interfering with the continuous display of content elements 909-911.

Additionally, engagement data may be used to determine whether or not advertising elements include interaction elements. For example, if engagement data determines that a particular user account tends not to provide inputs to control interaction elements during presentation of advertising data, the system may adjust how often such advertising elements are sent to a client device associated with the user. This may increase the number of advertising elements without interaction elements that are sent to client devices associated with that user account. This may also increase the frequency of advertising elements, particularly if skip ad inputs are received for advertising elements with interaction elements. By contrast, if a user interacts extensively with certain interaction elements, those interaction elements may be provided more frequently if the server system has the option of providing different types of interaction elements. Further still, the interaction data may impact the frequency of any advertising elements being inserted within content collections for a user account. How often the insertions occur may vary between embodiments. In some embodiments, a user may prefer to receive advertising elements more frequently in order to access interaction elements that are not otherwise available (e.g., to increase interaction element game scores or for other such reasons). In some such embodiments, user settings may allow a user to select whether or not to accept reduced frequency of advertising elements as a reward or as feedback for a threshold level of interactions with certain interaction elements. In other embodiments, the insertion of advertising data is responsive to engagement scores in a way that is not adjustable by a user. Additionally, adjustments to advertising element frequency based on overall viewing time or other such elements described below may further be modified based on engagement with interaction elements to increase or decrease advertising element frequency in different embodiments.

Figure 10B:
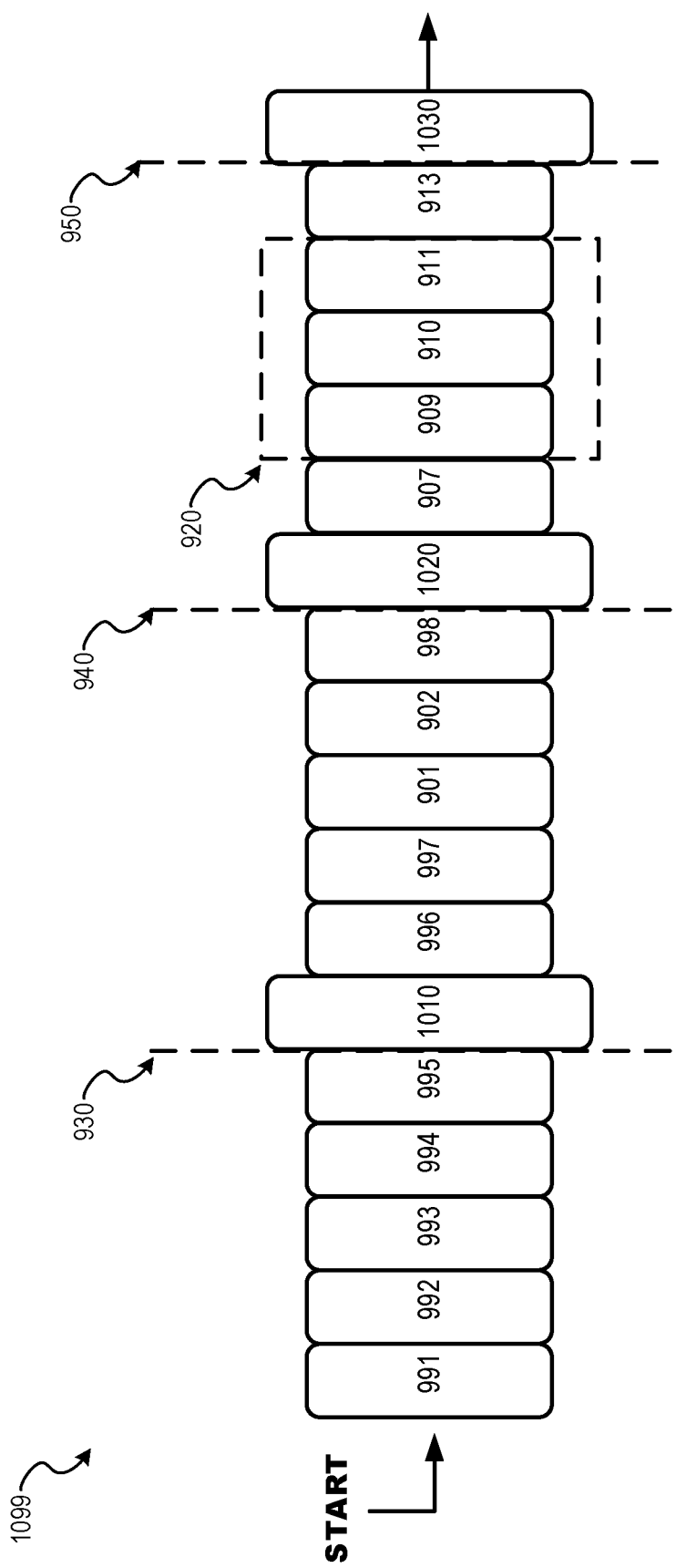
FIG. 10B illustrates an adjusted presentation order for content elements with advertising elements automatically inserted into the adjusted presentation order in accordance with some example embodiments.

FIG. 10B illustrates an adjusted presentation order 1099 corresponding to presentation order 999 of FIG. 9B. In FIG. 10B, the position of continuous presentation group 920 has shifted to a position where no advertising insertion point 930, 940, 950 falls within continuous presentation group 920, and so advertising elements 1010, 1020, and 1030 are placed at the periodic position determined by the system rule for advertising placement.

In other embodiments, any number of continuous presentation groups may be presented within a media collection, and a media collection may have any number of content elements as well as multiple rules for advertising element placement. In some embodiments, multiple advertising elements are placed together at advertising insertion points. In some embodiments, a combination of a number of content elements as well as a minimum time between a most recent advertising element display are used to determine a next advertisement insertion point.

FIGS. 9A-B and 10A-B are described above as associated with a single media collection. In some embodiments, autoforwarding between media collections results in the continuous display of content elements, until a client device 110 input terminates display of content and autoforwarding between content collections. In some such embodiments, advertising elements are inserted between content collections, as well as periodically between content elements of a content collection.

In addition, as described above, continuous presentation group 920 may be generated by operator 108 selection. In other embodiments, however, continuous presentation groups may be automatically generated by content processing server 124. In such embodiments, an analysis tool described herein may be used to associate particular content elements with a continuous presentation group. For example, content elements showing the same object from multiple views, or the same object or position over time, may be automatically associated to generate a continuous presentation group. In some embodiments, content including text or drawings related to another content element may be associated within a continuous presentation group. In other embodiments, any other such operations for associating content elements into continuous presentation groups may be used.

In addition to spacing advertising elements based on a number of content elements, other system rules may be used for spacing advertising elements. Some embodiments particularly provide benefits by enabling a regular advertising experience for a user within a content collection where many different content elements with a short duration may be presented as part of one or more media collections. By tracking both the presentation order of content and adjusted presentation orders with advertising elements included, a standard user experience may be generated automatically by a server system 120. In contrast with, for example, a television environment or news story environment where a scripted video or audio content with a scheduled expected content display time is used with advertising between content, the environment with client devices 110 communicating large numbers of content messages which are updated regularly is an environment where a user experience may vary based on automatically selected content. In some embodiments, advertisement placement points may occur between dozens of content elements that are only a few seconds long. In some embodiments hundreds of content elements are displayed between advertising elements.

Figure 11:
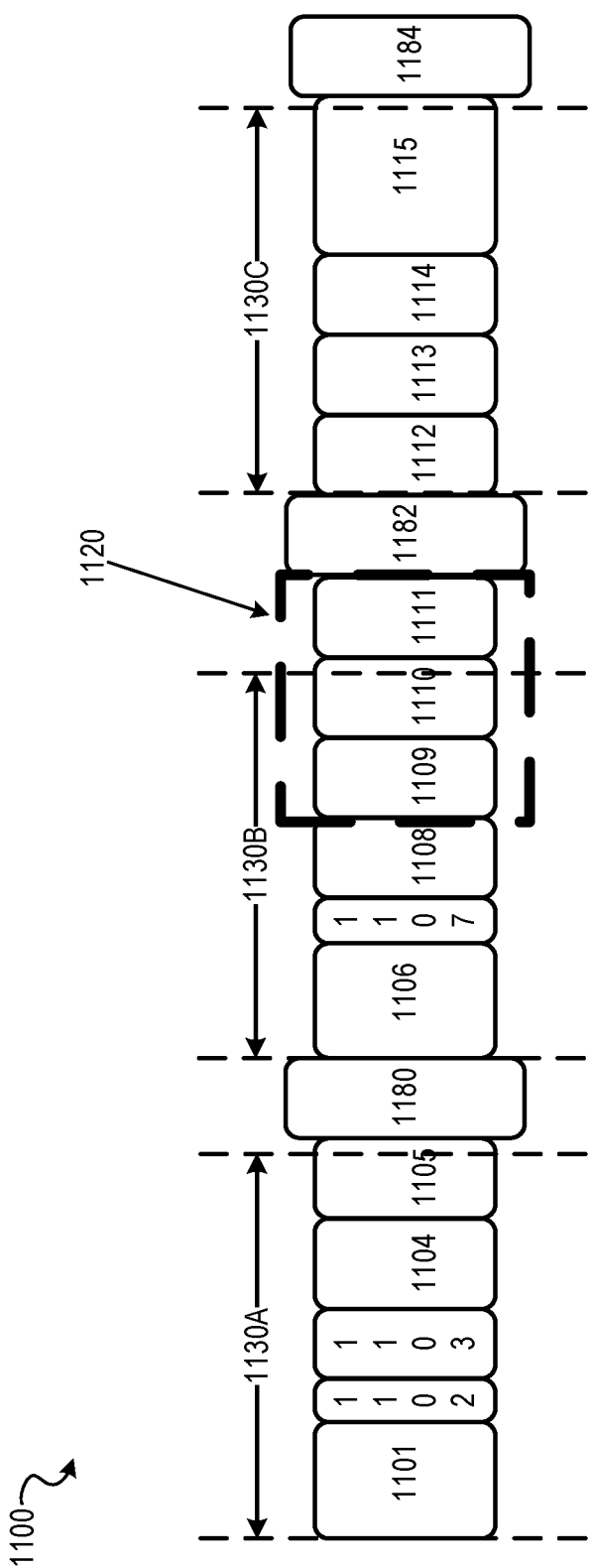
FIG. 11 illustrates an adjusted presentation order for content elements with advertising elements automatically inserted in accordance with some example embodiments.

FIG. 11 illustrates an adjusted presentation order 1100 for content elements 1101-1115 with advertising elements 1180, 1182, and 1184 automatically inserted. As illustrated in FIG. 11, the display time of content elements 1101-1115 may vary. This variation may be due to a selection by a user of a client device generating the content elements for the original content message, or may be due to a client device that is displaying the media collection receiving an input at a user interface to skip to a next element. In the embodiment of FIG. 11, advertising elements such as advertising elements 1180, 1182, and 1184 are inserted based on engagement scores and display times for content, illustrated by content display thresholds 1130A-1130C.

In the embodiment of FIG. 11, display of media content in presentation order 1100 begins with content element 1101, and proceeds through the display of content element 1105. During display of content element 1105, a first content display threshold 1130A is met, and so at least a first advertising element 1180 follows content element 1105. Following display of advertising element 1180, a counter associated with content display threshold 1130B may begin. Content display threshold 1130B is met during display of content element 1110, but content element 1110 is part of continuous display group 1120, and therefore the next advertising element 1182 is delayed until after content element 1111, which is the final content element of continuous display group 1120. Presentation order 1100 then continues with display of content elements 1112-1115 until threshold 1130C is met, and advertising element 1184 then follows. The display presented on the content device may then continue with additional elements associated with the content or media collection.

In some embodiments, a single content collection may continue presenting new content and advertising elements indefinitely, when new content messages provide content elements for the media collection faster than the content elements are displayed. In other embodiments, content collections are closed, and do not have content added over time. In such embodiments, display of content elements for a particular media collection may end. In such embodiments, a server system may automatically select a next content collection, and automatically begin sending content elements for the next content collection, along with inserted advertising elements, to the device. This may continue indefinitely until a device receives a command to terminate media collection display, or the device loses network access to the server system. In such autoforward systems, the timing for advertising elements may reset at the end of each content collection, with or without one or more advertising elements at the end of the content collection, before content elements for the new content collection begin display.

Additionally, as described above, some display orders may be responsive to user inputs at a client device. In such embodiments, an initial display order may be communicated from a server system to the client device, and the client device may adjust the presentation order in response to user inputs received at the device (e.g., inputs to skip to a next element). For example, in the embodiment of FIG. 11, an expected presentation order different from the one shown may be received at a client device from a server system, and the client device may track the display timing against the display threshold 1130 to determine when to display advertising elements. In such embodiments, the client device may make such determinations in conjunction with received information about continuous display groups, rather than the decision being made at the server device(s).

Figure 12:
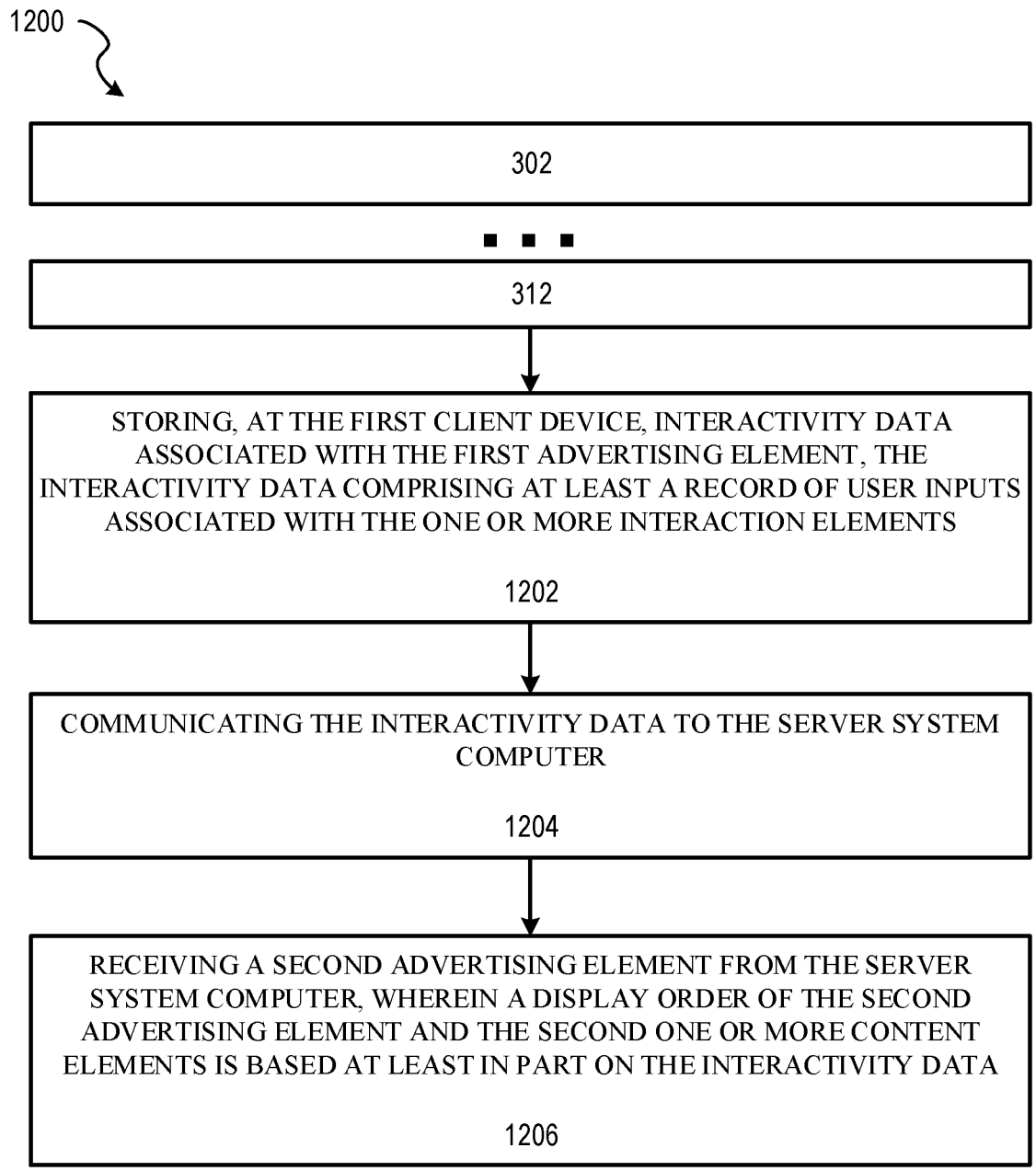
FIG. 12 illustrates a method for communicating content elements with interactive advertising in accordance with some embodiments.

FIG. 12 illustrates a method 1200 for communicating content elements with interactive advertising in accordance with some embodiments. In various embodiments, method 1200 may be implemented on a client device such as client device 110. Corresponding operations may be performed by a server system 120, a content processing server 124, or using any device or combination of devices described herein. In some embodiments, method 1200 is represented by a non-transitory computer-readable medium comprising instructions that, when executed by one or more processors, cause a device to perform method 1200.

In method 1200, after a client device as performed operations 302-312 described above in conjunction with FIG. 3A, interaction data is recorded and used to modify the placement of a subsequent advertising element. Thus, as part of operation 1202, following presentation of advertising data with an interaction element in previous operations, interactivity data associated with the displayed advertising element is recorded at the client device. This includes a record of user inputs associated with interaction elements. As described above, this may be as simple as a number of interactions, or may include detailed recordings of the interactions and interaction results. In operation 1204, the interactivity data (e.g., engagement data) is communicated to a server system. Then, in operation 1206, the server system that is providing content collection data sends a second advertising element, where the display order is selected based on the interactivity data. Such a method may be repeated, with subsequent interactions cumulatively being used to determine not only the content of the advertising element (e.g., including which interaction elements, if any, are present), but also the placement of the advertising element within one or more content collections.

In some embodiments, a server computer receives requests for a media/content collection from client devices, and the server computer sends the content elements and advertising elements to the client devices using the adjusted presentation order. In embodiments where a "live" content collection is updated over time, the adjusted presentation order may be updated automatically or in response to curated operator inputs to further adjust the presentation order as described above. Different client devices requesting the same media collection may thus have the media collection presented with different content elements, advertising elements, and presentation orders depending on the timing of the request. Similarly, depending on interactivity feedback, different users may receive advertising elements with different interaction elements. Also, the same user viewing the same collection at a different time may receive different elements as the collection is adjusted over time.

Further, as mentioned above, in some embodiments, determining advertising element placement comprises periodically inserting an advertising element between content elements following a set number of content elements. This may be performed automatically by modules of a server computer. In some embodiments, this automated advertising placement is combined with curated ad placement, or is adjusted by various rules including identified continuous presentation groups. For automatic placement, a threshold time period may be used to periodically insert advertising elements between content elements. In some embodiments, a threshold engagement score may be associated with a certain time between advertising elements. Such an engagement score may, for example, be based on a number of user inputs and a total advertisement display time. In other embodiments, a counter may place advertising elements following threshold numbers of content elements (e.g., following a set number of photos, video clips, or other discrete content elements from content messages), with adjustments based on user inputs associated with interaction elements. In other embodiments, a combination of content elements and timing may be used. In some embodiments, for example, a table may be used to match timing and numbers of elements, such that a timing threshold changes slightly as the number of content elements in a row presented increases. In other embodiments, various other combinations of thresholds may be used to determine placement of advertising elements in a presentation order.

In FIGS. 10A, 10B, and 11, the advertising element is shown following completion of a content element after a threshold has been met. In some embodiments, an advertising element may be placed before a threshold is met. For example, in some embodiments where a long continuous presentation group is present, and a threshold falls near the beginning of the group, the system or displaying device places an advertisement element before the continuous presentation group. In some embodiments, a device may determine if a threshold is expected during the first half of a content element or group, and essentially "round" to the beginning or end, depending on system settings and where the threshold falls within the content. In other embodiments, other methods for determining exact placement of advertising elements are used.

In various embodiments described above, an initial or baseline presentation order may be generated and have advertising elements inserted based on display and/or interaction thresholds that assume that content elements and advertising elements are displayed for a full time associated with each element. This full time for each element is a full runtime for any video clips, and a display time associated with images that may be set when the image is captured, by the server system automatically, by a curator or operator 108, or using any other selection process. Some embodiments, as mentioned above, allow users viewing media collections to navigate through the display order, including skipping to a next content element, or skipping to a next advertising element. In embodiments where media collections are made up of content elements having associated display times that are similar to or shorter than the display times of advertising elements, automatic balancing presents a technical problem not present in other media environments, where longer pieces of content with interspersed advertising (e.g., 10-15 minute content segments separated by 3-5 minute advertising segments) are highly curated and broadcast without individual customization and limited opportunity for the broadcaster to know if certain content is skipped. Embodiments described herein, where content elements received from client devices are used to generate media collections with advertising elements in a display order customized for individual users provides benefits for efficiency, user feedback, and an enhanced user experience customized by automatic feedback from user selections.

For example, in some embodiments, when an advertising element begins displaying, an interface allowing a user to select to end the advertising element display may be presented. In some embodiments, a minimum display time may be used. For example, an advertising element with a full display time of 20 seconds may have a minimum display time of 2 seconds, after which the rest of the advertising element may be skipped. In such embodiments, the use of simple thresholds may not provide desirable balance between content elements and advertising elements. Some embodiments may thus track actual display time associated with content elements compared with actual display time for advertising elements, and dynamically adjust presentation order for an individual user account or device based on the actual display time on the device, rather than expected display times determined at the server system. Some such embodiments use a target ratio of advertising display time to content display time to determine a presentation order. Some embodiments may use a window of acceptable advertising to content ratios. Some embodiments may use a combination of minimum content elements or continuous content display times coupled with target content to advertising ratio. Various embodiments may use other such metrics to generate and adjust a presentation order to balance display of content elements and advertising elements.

Figure 13:
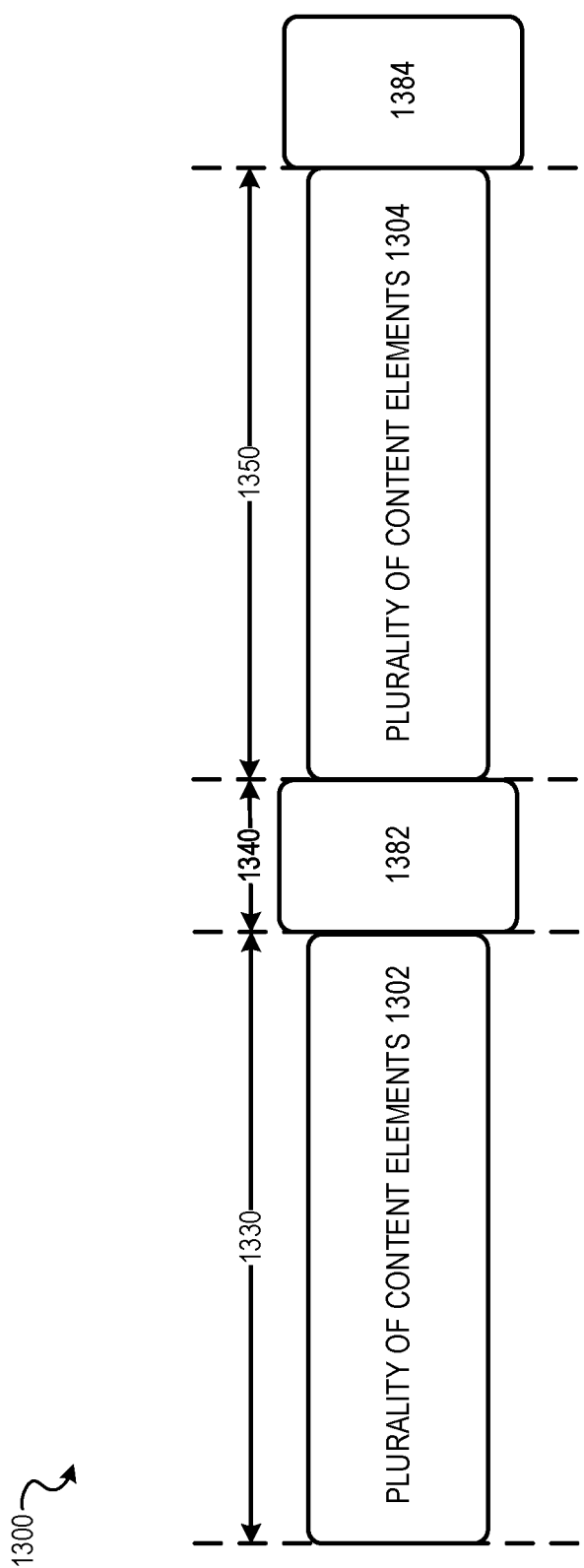
FIG. 13 illustrates a presentation order for a media collection in accordance with some example embodiments.

FIG. 13 illustrates an example presentation order 1300, with a plurality of content elements 1302 followed by an advertising element 1382, followed by a second plurality of content elements 1304, followed by a second advertising element 1384. For the purpose of illustration, the representative advertising element 1382 is associated with a full display time 1340. In some embodiments, when the media collection associated with presentation order 1300 begins displaying content of the plurality of content elements 1302, the device displaying the media collection begins tracking display times. After advertising element 1382 finishes, the device will have an advertising display time to content element display time ratio, which is display time 1340 divided by display time 1330. This ratio may be compared with a target ratio, and the number of content elements scheduled for the plurality of content elements 1304 can be adjusted to influence the target ratio. Similarly, a display time associated with advertising element 1384 may be adjusted based on the actual ratio compared with the target ratio, or additional advertising elements may be scheduled following advertising element 1384.

Some embodiments may have additional guidelines or system settings for presentation orders. For example, a minimum display time between groups of advertising elements may be used, a minimum initial content display time may be used, a minimum number of sequential content elements may be used, or any other such presentation order limits or thresholds may be used, in some embodiments, in addition to a target ratio of advertising display time to content display time.

Some embodiments, for example, are structured with a target content display time followed by a target advertising display time as a target display unit. After a media collection is selected for display at a device, the initial display unit such as the plurality of content elements 1302 and advertising element 1382 may be structured so that the target ratio of content display to advertising display is met if no user inputs to skip content are received. Without such user inputs, a server scheduled presentation order is maintained within the system settings and at the target advertising to content ratio.

Figure 14:
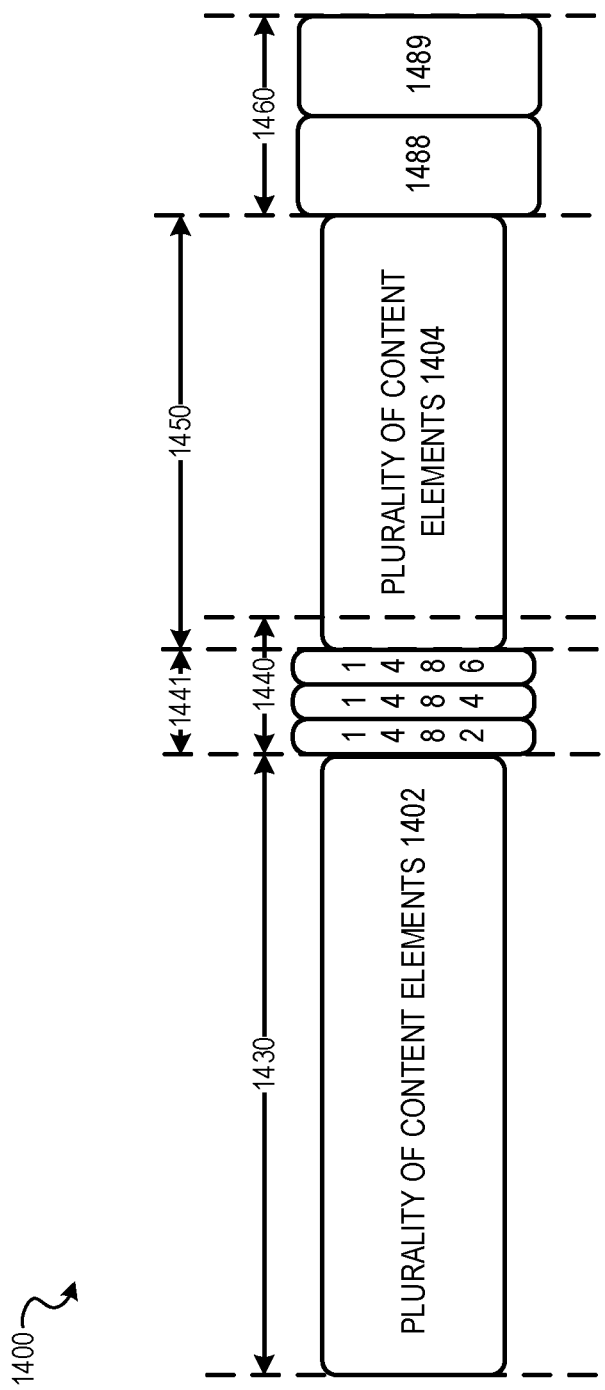
FIG. 14 illustrates a presentation order for a media collection in accordance with some example embodiments.

In FIG. 14, however, after the initial display of the plurality of content elements 1402 for content display time 1430, user inputs to skip portions of advertising elements 1482, 1484, and 1486 are received. In the embodiment of FIG. 14, a minimum advertising display time 1441 is present, and so the presentation order is adjusted to presentation order 1400 from a previous presentation order which targeted presentation of advertising element 1482 for a full advertisement time of 1440. Because of the received input to skip the remaining content of advertising element 1482, the presentation order 1400 is adjusted to include advertising element 1484. Similarly, when advertising element 1484 is skipped, advertising element 1486 is added. Due to a maximum continuous number of advertising elements in the embodiment of FIG. 14, following the input to skip presentation of advertising element 1486, display of the plurality of content elements 1404 begins with an actual ratio of advertising display to content display (e.g., time 1441 divided by time 1430) lower than the target ratio which was associated with display time 1440 following display time 1430. Based on the actual ratio of advertising display to content display being lower than the target following display of a portion of advertising element 1486, the number of content elements associated with the plurality of content elements 1404 may be reduced to shorten the content display time between display of advertising elements 1486 and 1488. Similarly, advertising element 1489 may be added to presentation order 1400, so that the display unit of content and advertising during display times 1450 and 1460 bring the overall ratio of advertising display to content display back to the target ratio. In various embodiments, the target ratios may be adjusted based on interaction data or engagement scores associated with interaction elements. Further, different interactions may be weighted differently, with interactions involving multiple users provided a greater weight than interactions within a local game on a single client device.

Various embodiments thus operate with the following limits: a minimum and/or maximum number of sequential content elements, a minimum and/or maximum continuous content display time, a minimum and/or maximum number of sequential advertising elements, a minimum and/or maximum continuous advertising display time, a minimum display time for an individual content element or advertising element, a minimum and/or maximum ratio of content display time to advertising display time since the beginning of display for a media collection, a minimum and/or maximum ratio of content display time to advertising display time for each content and advertising display unit, a minimum and/or maximum ratio of content display time to advertising display time during display of multiple content collections (e.g., during autoforward operation), or any other such operational limits. Any such limits may be adjusted based on an interaction history or engagement scores for a device or user account. Different embodiments may operate with combinations of any or all such limitations, using a combination of automatic system adjustments or operator curated adjustments to presentation order of content elements and advertising elements to achieve the targets.

Figure 15:
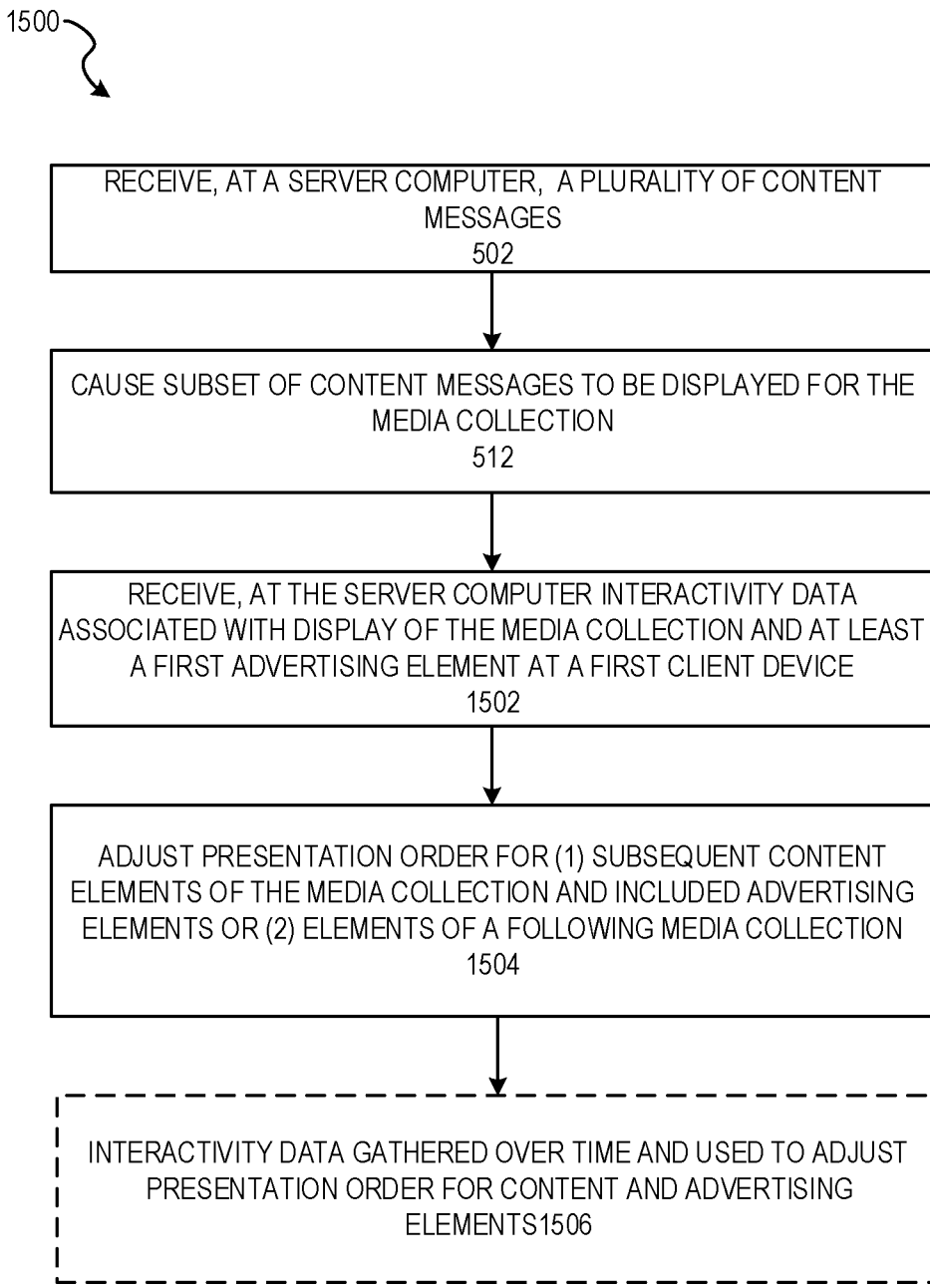
FIG. 15 illustrates a method for communicating content elements with interactive advertising in accordance with some embodiments.

FIG. 15 then describes an example method 1500 for determining a presentation order in accordance with some embodiments. Method 1500 begins with operations 502 and 512, similar to the operations described above for method 500. In method 1500, following display of content messages, at operation 1502 a server computer receives display time data associated with display of the media collection and at a first client device. For example, this operation 1502 may, in some embodiments, involve receiving data for times 1330 and 1340 as well as interactivity data for advertising elements following display of the plurality of content elements 1302 and advertising element 1382 in the embodiment of FIG. 13. Similarly, this could involve receiving a communication with data for times 1430 and 1441, as well as a separate communication for times 1450 and 1460 in the embodiment of FIG. 14. In operation 1504, this information is used to adjust the following presentation order. In some embodiments, this involves adjusting the order of content elements and advertising elements for the same media collection that continues to be displayed on the client device that provided the display time data. In some embodiments, this involves adjusting a presentation order for a subsequent media collection to be displayed on the first client device that provided the display time data. In operation 1506, display times and engagement with interaction elements are then tracked over time as media collections are presented on a user device to influence advertising display time to content display time ratios. In some embodiments, this tracking may be performed for a user account in a communication system that uses multiple devices, such that the target ratio may be set for all viewing from multiple devices associated with the account. As described above, in addition to targeting advertising to content display ratios, the display time data may be used to meet other content and advertising targets for a system as well.

Figure 16:
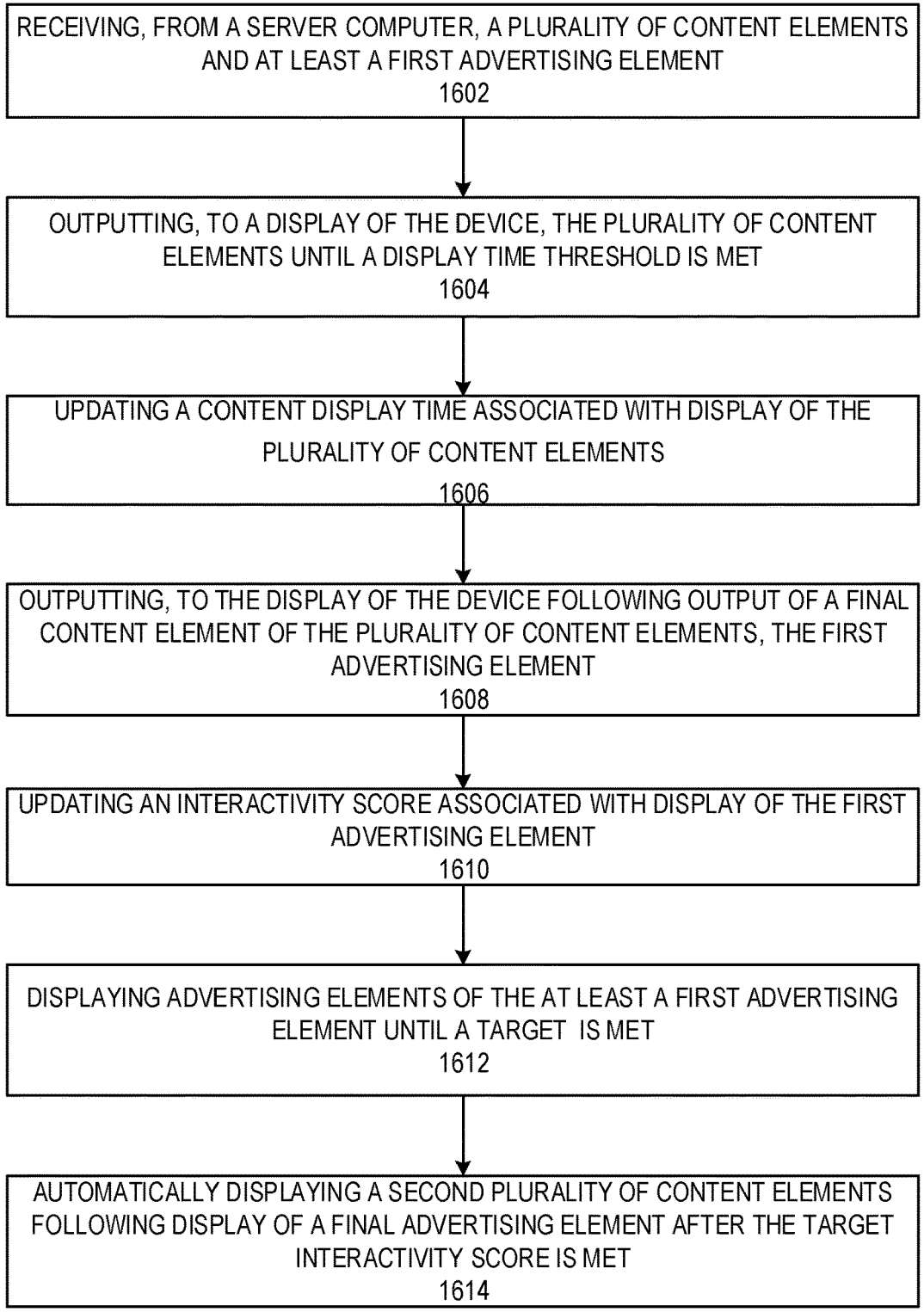
FIG. 16 illustrates a method for communicating content elements with interactive advertising in accordance with some embodiments.

FIG. 16 describes an additional embodiment of a method for setting a presentation order. Method 1600 of FIG. 16 describes a method performed by a client device. In various other embodiments, similar or corresponding operations are performed by a server computer, either to enable the described operations at the client device (e.g., the client device 110), or to enable similar operations at a server computer in accordance with the function of the various different embodiments. Additionally, various embodiments may perform similar operations in varying order, including repetition of some or all described operations, or inclusion of additional operations between the described operations.

Method 1600 begins with operation 1602 involving the client device receiving, from a server computer, a plurality of content elements and at least a first advertising element. The client device outputs the plurality of content elements to a display of the device until a display time threshold is met in operation 1604. In some such embodiments, the plurality of content elements are associated with a presentation order from the server computer, and the advertising element is received from the server computer, but not scheduled within the presentation order. After the display time threshold is met in operation 1604, operations 1606 and 1608 occur in any order, or simultaneously. In operation 1606, the client device updates a content display time associated with display of the plurality of content elements, and in operation 1608, the client device displays the first advertising element following display of a final content element of the plurality of content elements. In other words, after the threshold for display of content is met, the device finishes displaying the current content element, either until a display time associated with the content element finishes, or a user input terminating display of the content element occurs. Following this, an advertisement element is displayed along with associated interaction elements.

After the first advertising element finishes displaying as part of operation 1608, then in operation 1610, the client device updates an interactivity score associated with display of the first advertising element. Based on the interactivity score and any other metrics (e.g., advertising display time, advertising to content ratios, etc.), the client device determines if advertising targets are met in operation 1612. If the target is not yet met (e.g., if an interaction score is not sufficiently high and an actual ratio of advertising to content is below a target), then the device follows the first advertising element with a second advertising element. The second advertising element may or may not include interaction elements. As described above, some embodiments may select subsequent advertising elements based on a history of how a user account is associated with certain advertising elements or interaction elements. The device continues displaying advertising elements until the target is met in operation 1612. As described above, in some embodiments, a maximum number of sequential advertising elements may be included as a limit in some embodiments. For example, one embodiment may have a maximum number of four sequential advertising elements. After four advertising elements are initiated sequentially, such an embodiment will display a content element after the fourth advertising element even if the target ratio is not met. In other embodiments, other limits may be used.

In the embodiment of method 1600, after the target is met in operation 1612, then in operation 1614, a second plurality of content elements is displayed following display of the final advertising element. In various embodiments, display of a content element or an advertising element is not terminated because a target is met, and the device may update the actual ratio during display of an advertising element or only between elements. For example, in some embodiments, a user may interact with an advertising element to select a long-form advertisement, a link to additional advertising content, or other such interactions that extend an expected display time for the advertising element. In some embodiments, this allows the actual ratio of advertising display to far exceed a minimum target ratio. In some embodiments, maximum advertising to content ratios may also be used, such that the second plurality of content elements is extended until the ratio of advertising to content falls below the maximum ration. In other embodiments, such ratios may only apply to a certain number of recent display units, or to a single display unit (e.g., a combination of a set of continuous content elements followed by one or more continuous advertising elements). Similarly, interaction scores may only influence subsequent advertisement placement for a limited amount of time, or up to certain time or element presentation limits.

Various additional embodiments may operate in a variety of ways, or in combination with other embodiments described herein. For example, in some embodiments, each content element of the plurality of content elements of a media collection or content collection is associated with an individual display time. This may be, for example, a maximum display time of five seconds, ten seconds, 15 seconds, one minute, or any such time limit. Similarly, minimum display times such as one second or three seconds may be implemented before a user may skip a content or advertising element. In some embodiments, interaction elements may have different times based on a previous user interaction, or based on system settings. In some embodiments, content elements may have individual display time limits, but presentation of advertising data may not have a display time limit. In other embodiments, a display time limit may be present for advertising data, but may be overridden or canceled based on a user input. Such an input may be directly associated with control of an interaction element, or may be independent of control of an interaction element.

Some embodiments may operate according to method 1600, with additional operations following. For example, in some embodiments, additional operations include receiving, at an input of the device, a user selection terminating display of the first advertising element prior to a complete display of the first advertising element, and in response to the input, selecting the target ratio as a minimum target ratio. The client device then adjusts a display order associated with the second plurality of content elements to reduce a time from an end of the first advertising element to a beginning of a second advertising element.

Similarly, some further embodiments involve operations of displaying the second advertising elements for a full display time and displaying a second plurality of advertising elements comprising the second advertising element until a full target ratio of advertising display time to content display time is met, wherein the full target ratio is larger than the minimum target ratio, and with adjustments to targets based on interactivity data.

An additional embodiment involves receiving, at an input of the device, a user selection interacting with the first advertising element prior to a complete display of the first advertising element. Then, in response to the input, the client device extends a display time associated with the first advertising element and adjusts a display order associated with the second plurality of content elements to increase a time from an end of the first advertising element to a beginning of a second advertising element.

Additional such operations or combinations of operations should be apparent from the various descriptions provided herein.

FIG. 17 is a block diagram 1700 illustrating architecture of software 1702, which can be installed on any one or more of the devices described above. For example, in various embodiments, client device(s) 110, operator device(s) 130, server system 120, web server 122, and content processing server 124, may be implemented using some or all of the elements of software architecture 1702. FIG. 17 is merely a non-limiting example of a software architecture 1702, and it will be appreciated that many other architectures can be implemented to facilitate the functionality described herein. In various embodiments, the software architecture 1702 is implemented by hardware such as machine 1800 of FIG. 18 that includes processors 1810, memory 1830, and I/O components 1850. In this example architecture, the software architecture 1702 can be conceptualized as a stack of layers where each layer may provide a particular functionality. For example, the software architecture 1702 includes layers such as an operating system 1704, libraries 1706, frameworks 1708, and applications 1710. Operationally, the applications 1710 invoke application programming interface (API) calls 1712 through the software stack and receive messages 1714 in response to the API calls 1712, consistent with some embodiments.

In various implementations, the operating system 1704 manages hardware resources and provides common services. The operating system 1704 includes, for example, a kernel 1720, services 1722, and drivers 1724. The kernel 1720 acts as an abstraction layer between the hardware and the other software layers, consistent with some embodiments. For example, the kernel 1720 provides memory management, processor management (e.g., scheduling), component management, networking, and security settings, among other functionality. The services 1722 can provide other common services for the other software layers. The drivers 1724 are responsible for controlling or interfacing with the underlying hardware, according to some embodiments. For instance, the drivers 1724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1706 provide a low-level common infrastructure utilized by the applications 1710. The libraries 1706 can include system libraries 1730 (e.g., C standard library) that can provide functions such as memory allocation functions, string manipulation functions, mathematic functions, and the like. In addition, the libraries 1706 can include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1706 can also include a wide variety of other libraries 1734 to provide many other APIs to the applications 1710.

The frameworks 1708 provide a high-level common infrastructure that can be utilized by the applications 1710, according to some embodiments. For example, the frameworks 1708 provide various graphic user interface (GUI) functions, high-level resource management, high-level location services, and so forth. The frameworks 1708 can provide a broad spectrum of other APIs that can be utilized by the applications 1710, some of which may be specific to a particular operating system 1704 or platform.

In an example embodiment, the applications 1710 include a home application 1750, a contacts application 1752, a browser application 1754, a book reader application 1756, a location application 1758, a media application 1760, a messaging application 1762, a game application 1764, and a broad assortment of other applications such as a third-party application 1766. According to some embodiments, the applications 1710 are programs that execute functions defined in the programs. Various programming languages can be employed to create one or more of the applications 1710, structured in a variety of manners, such as object-oriented programming languages (e.g., Objective-C, Java, or C++) or procedural programming languages (e.g., C or assembly language). In a specific example, the third-party application 1766 (e.g., an application 1710 developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1766 can invoke the API calls 1712 provided by the operating system 1704 to facilitate functionality described herein.

Some embodiments may particularly include a curation application 1767. In certain embodiments, this may be a stand-alone application that operates to manage communications with a server system such as server system 120. In other embodiments, this functionality may be integrated with another application such as a media application 1760 or another such application. Curation application 1767 may manage collection of content using a camera device of machine 1800, communication with a server system via I/O components 1850, and receipt and storage of received media collections in memory 1830. Presentation of content and user inputs associated with content may be managed by curation application 1767 using different frameworks 1708, library 1706 elements, or operating system 1704 elements operating on a machine 1800.

FIG. 18 is a block diagram illustrating components of a machine 1800, according to some embodiments, able to read instructions from a machine-readable medium (e.g., a machine-readable storage medium) and perform any one or more of the methodologies discussed herein. Specifically, FIG. 18 shows a diagrammatic representation of the machine 1800 in the example form of a computer system, within which instructions 1816 (e.g., software, a program, an application 1710, an applet, an app, or other executable code) for causing the machine 1800 to perform any one or more of the methodologies discussed herein can be executed. In alternative embodiments, the machine 1800 operates as a standalone device or can be coupled (e.g., networked) to other machines. In a networked deployment, the machine 1800 may operate in the capacity of a server 122, 124 or a device 110, 130 in a server-client network environment, or as a peer machine in a peer-to-peer (or distributed) network environment. The machine 1800 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines 1800 that individually or jointly execute the instructions 1816 to perform any one or more of the methodologies discussed herein.

In various embodiments, the machine 1800 comprises processors 1810, memory 1830, and I/O components 1850, which can be configured to communicate with each other via a bus 1802. In an example embodiment, the processors 1810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1812 and a processor 1814 that may execute the instructions 1816. The term "processor" is intended to include multi-core processors 1810 that may comprise two or more independent processors 1812, 1814 (also referred to as "cores") that can execute instructions 1816 contemporaneously. Although FIG. 18 shows multiple processors 1810, the machine 1800 may include a single processor 1810 with a single core, a single processor 1810 with multiple cores (e.g., a multi-core processor 1810), multiple processors 1812, 1814 with a single core, multiple processors 1812, 1814 with multiples cores, or any combination thereof.

The memory 1830 comprises a main memory 1832, a static memory 1834, and a storage unit 1836 accessible to the processors 1810 via the bus 1802, according to some embodiments. The storage unit 1836 can include a machine-readable medium 1838 on which are stored the instructions 1816 embodying any one or more of the methodologies or functions described herein. The instructions 1816 can also reside, completely or at least partially, within the main memory 1832, within the static memory 1834, within at least one of the processors 1810 (e.g., within the processor's cache memory), or any suitable combination thereof, during execution thereof by the machine 1800. Accordingly, in various embodiments, the main memory 1832, the static memory 1834, and the processors 1810 are considered machine-readable media 1838.

As used herein, the term "memory" refers to a machine-readable medium 1838 able to store data temporarily or permanently and may be taken to include, but not be limited to, random-access memory (RAM), read-only memory (ROM), buffer memory, flash memory, and cache memory. While the machine-readable medium 1838 is shown, in an example embodiment, to be a single medium, the term "machine-readable medium" should be taken to include a single medium or multiple media (e.g., a centralized or distributed database, or associated caches and servers) able to store the instructions 1816. The term "machine-readable medium" shall also be taken to include any medium, or combination of multiple media, that is capable of storing instructions (e.g., instructions 1816) for execution by a machine (e.g., machine 1800), such that the instructions 1816, when executed by one or more processors of the machine 1800 (e.g., processors 1810), cause the machine 1800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1850 include a wide variety of components to receive input, provide output, produce output, transmit information, exchange information, capture measurements, and so on. In general, it will be appreciated that the I/O components 1850 can include many other components that are not shown in FIG. 18. The I/O components 1850 are grouped according to functionality merely for simplifying the following discussion, and the grouping is in no way limiting. In various example embodiments, the I/O components 1850 include output components 1852 and input components 1854. The output components 1852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touchscreen that provides location and force of touches or touch gestures, or other tactile input components), audio input components (e.g., a microphone), and the like.

In some further example embodiments, the I/O components 1850 include biometric components 1856, motion components 1858, environmental components 1860, or position components 1862, among a wide array of other components. For example, the biometric components 1856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1858 include acceleration sensor components (e.g., accelerometer), gravitation sensor components, rotation sensor components (e.g., gyroscope), and so forth. The environmental components 1860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1850 may include communication components 1864 operable to couple the machine 1800 to a network 1880 or devices 1870 via a coupling 1882 and a coupling 1872, respectively. For example, the communication components 1864 include a network interface component or another suitable device to interface with the network 1880. In further examples, communication components 1864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1870 may be another machine 1800 or any of a wide variety of peripheral devices (e.g., a peripheral device coupled via a Universal Serial Bus (USB)).

Moreover, in some embodiments, the communication components 1864 detect identifiers or include components operable to detect identifiers. For example, the communication components 1864 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1864, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1880 or a portion of the network 1880 may include a wireless or cellular network, and the coupling 1880 may be a Code Division Multiple Access (CDMA) connection, a Global System for Mobile communications (GSM) connection, or another type of cellular or wireless coupling. In this example, the coupling 1882 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1816 are transmitted or received over the network 1880 using a transmission medium via a network interface device (e.g., a network interface component included in the communication components 1864) and utilizing any one of a number of well-known transfer protocols (e.g., Hypertext Transfer Protocol (HTTP)). Similarly, in other example embodiments, the instructions 1816 are transmitted or received using a transmission medium via the coupling 1872 (e.g., a peer-to-peer coupling) to the devices 1870. The term "transmission medium" shall be taken to include any intangible medium that is capable of storing, encoding, or carrying the instructions 1816 for execution by the machine 1800, and includes digital or analog communications signals or other intangible media to facilitate communication of such software.

Furthermore, the machine-readable medium 1838 is non-transitory (in other words, not having any transitory signals) in that it does not embody a propagating signal. However, labeling the machine-readable medium 1838 "non-transitory" should not be construed to mean that the medium is incapable of movement; the medium 1838 should be considered as being transportable from one physical location to another. Additionally, since the machine-readable medium 1838 is tangible, the medium 1838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, by a server system, a plurality of content messages from a plurality of content sources, the plurality of content messages corresponding to a media collection and each content message comprising an associated content element;
causing, by the server system, first content elements of a first number of the plurality of content messages to be displayed for the media collection;
receiving, by the server system, first display time data indicating a first amount of time that the first content elements are displayed;
receiving, by the server system, second display time data indicating a second amount of time that at least one first advertising element is displayed, the at least one first advertising element being displayed after the first content elements;
determining, by the server system, an absence of user inputs to skip content during display of the first content elements and the at least one first advertising element;
determining, by the server system, an advertising display time to a content element display time ratio based on the first amount of time, the second amount of time, and the absence of the user inputs to skip content during display of the first content elements and the at least one first advertising element;
analyzing, by the server system, the first display time data, the second display time data, and the advertising display time to content display time ratio with respect to a target ratio to a determine a modified presentation order for second content elements and for at least one second advertising element; and
causing, by the server system, the second content elements and the at least one second advertising element to be displayed for the media collection, wherein the at least one second advertising element is displayed at least a minimum display time after the at least one first advertising element.

2. The method of claim 1, wherein the at least one first advertising element includes a plurality of first advertising elements; and
the method comprises:
receiving user input to skip an initial first advertising element of the plurality of first advertising elements;
determining that a minimum advertising display time has not been satisfied; and
causing a subsequent first advertising element of the plurality of first advertising elements to be displayed after the initial first advertising element.

3. The method of claim 2, comprising:
receiving additional user input to skip the subsequent first advertising element
determining that the minimum advertising display time has not been satisfied;
determining that a maximum continuous number of advertising elements has been reached; and
causing a second content element of the second content elements to be displayed.

4. The method of claim 1, comprising:
determining that the ratio of advertising display time to content display time for the first content elements and the at least one first advertising element is less than a target ratio; and
determining that the modified presentation order includes a reduced number of the second content elements.

5. The method of claim 1, wherein the first content display elements are displayed for at least a minimum content display time.

6. The method of claim 1, wherein the first content display elements include at least a minimum number of content display elements that are displayed sequentially.

7. The method of claim 1, wherein the first number of content messages are a first subset of the plurality of content messages and the second number of content messages are a second subset of the plurality of content messages and the second content elements are to be displayed for the media collection.

8. The method of claim 1, wherein the second content elements are to be displayed with respect to a subsequent media collection.

9. The method of claim 1, further comprising tracking display times of one or more media collections that include one or more content elements and one or more advertising elements with respect to an account of a user of a messaging system, the one or more content elements corresponding to one or more content messages.

10. The method of claim 9, wherein the display times are tracked across a plurality of computing devices associated with the account of the user and a target ratio of advertising display time to content display time is based on the display times tracked across the plurality of computing devices.

11. A system comprising:
one or more processors; and
memory storing computer-readable instructions that, when executed by the one or more processors, cause the system to perform operations comprising:
receiving a plurality of content messages from a plurality of content sources, the plurality of content messages corresponding to a media collection and each content message comprising an associated content element;
causing first content elements of a first number of the plurality of content messages to be displayed for the media collection;
receiving first display time data indicating a first amount of time that the first content elements are displayed;
receiving second display time data indicating a second amount of time that at least one first advertising element is displayed, the at least one first advertising element being displayed after the first content elements;
analyzing the first display time data and the second display time data to determine that a ratio of advertising display time to content display time for the first content elements and the at least one first advertising element is less than a target ratio;

determining a modified presentation order for second content elements and for at least one second advertising element;
determining that a minimum advertising display time has not been satisfied;
determining that a maximum continuous number of advertising elements has been reached; and
causing the second content elements and the at least one second advertising element to be displayed for the media collection.

12. The system of claim 11, wherein:
the at least one first advertising element includes a plurality of first advertising elements; and
the memory stores computer-readable instructions that, when executed by the one or more processors, cause the system to perform additional operations comprising:
receiving user input to skip an initial first advertising element of the plurality of first advertising elements; and
displaying a subsequent first advertising element of the plurality of first advertising elements after the initial first advertising element.

13. The system of claim 12, wherein the memory stores computer-readable instructions that, when executed by the one or more processors, cause the system to perform additional operations comprising:
receiving additional user input to skip the subsequent first advertising element.

14. The system of claim 11, wherein the memory stores computer-readable instructions that, when executed by the one or more processors, cause the system to perform additional operations comprising:
determining that the modified presentation order includes a reduced number of the second content elements.

15. The system of claim 11, wherein the memory stores computer-readable instructions that, when executed by the one or more processors, cause the system to perform additional operations comprising:
determining that the modified presentation order includes adding an advertising element to the at least one second advertising element.

16. The system of claim 11, wherein the memory stores computer-readable instructions that, when executed by the one or more processors, cause the system to perform additional operations comprising:
receiving interactivity data associated with display of the media collection and the at least one first advertising element, the interactivity data indicates a number of interactions by one or more users of a client application with one or more interaction elements of the at least one first advertising element.

17. The system of claim 16, wherein the target ratio of advertising display time to content display time is based on the interactivity data.

18. One or more non-transitory computer-readable media including instructions that, when executed by one or more processors, cause the one or more processors to:
receive a plurality of content messages from a plurality of content sources, the plurality of content messages corresponding to a media collection and each content message comprising an associated content element;
cause first content elements of a first number of the plurality of content messages to be displayed for the media collection;
receive first display time data indicating a first amount of time that the first content elements are displayed;
receive second display time data indicating a second amount of time that at least one first advertising element is displayed, the at least one first advertising element being displayed after the first content elements;
determine an absence of user inputs to skip content during display of the first content elements and the at least one first advertising element;
determine an advertising display time to a content element display time ratio based on the first amount of time, the second amount of time, and the absence of the user inputs to skip content during display of the first content elements and the at least one first advertising element;
analyze the first display time data, the second display time data, and the advertising display time to content display time ratio with respect to a target ratio to a determine a modified presentation order for second content elements and for at least one second advertising element; and
cause the second content elements and the at least one second advertising element to be displayed for the media collection, wherein the at least one second advertising element is displayed at least a minimum display time after the at least one first advertising element.

19. The one or more non-transitory computer-readable media of claim 18, further comprising additional instructions that, when executed by one or more processors, cause the one or more processors to:
determine that the ratio of advertising display time to content display time for the first content elements and the at least one first advertising element is less than a target ratio; and
determine that the modified presentation order includes adding an advertising element to the at least one second advertising element.

20. The one or more non-transitory computer-readable media of claim 18, further comprising additional instructions that, when executed by one or more processors, cause the one or more processors to:
receive interactivity data associated with display of the media collection and the at least one first advertising element, the interactivity data indicates a number of interactions by one or more users of a client application with one or more interaction elements of the at least one first advertising element; and
determine the target ratio of content display time to advertising display time based on the interactivity data.

* * * * *